US012002334B2

(12) United States Patent
Bland et al.

(10) Patent No.: US 12,002,334 B2
(45) Date of Patent: *Jun. 4, 2024

(54) GAMING MACHINE, CONTROL METHOD FOR MACHINE, AND PROGRAM FOR GAMING MACHINE

(71) Applicant: Konami Gaming, Inc., Las Vegas, NV (US)

(72) Inventors: Adam Bland, Las Vegas, NV (US); Yuji Ono, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,194

(22) Filed: Mar. 10, 2023

(65) Prior Publication Data

US 2023/0290230 A1 Sep. 14, 2023

Related U.S. Application Data

(63) Continuation of application No. 16/152,747, filed on Oct. 5, 2018, now Pat. No. 11,640,750.

(51) Int. Cl.

*G07F 17/32* (2006.01)
*G07F 17/34* (2006.01)

(52) U.S. Cl.

CPC .......... *G07F 17/34* (2013.01); *G07F 17/3213* (2013.01)

(58) Field of Classification Search

CPC ...................................................... G07F 17/32
See application file for complete search history.

(56) References Cited

U.S. PATENT DOCUMENTS

2005/0176498 A1 8/2005 Nguyen
2016/0086422 A1 3/2016 Keilwert et al.
2016/0171814 A1 6/2016 Froy, Jr. et al.

*Primary Examiner* — Omkar A Deodhar

(74) *Attorney, Agent, or Firm* — Howard & Howard Attorneys PLLC

(57) ABSTRACT

A gaming machine is described herein. The gaming machine includes a game control unit programmed to display a game screen including a primary game area a plurality of primary game reels and a bonus feature event area including a plurality of bonus prize cells. Each bonus prize cell is configured to display a randomly selected bonus prize, and is operable as one of an active bonus prize cell and an inactive bonus prize cell. Each bonus prize cell is associated with a wager amount value. The game control unit initiates an instance of the game by receiving a wager being placed on the game by the player, selecting bonus prize cells having associated wager amount values equal to or less than the wager amount of the received wager, and operating the selected bonus prize cells as active bonus prize cells.

20 Claims, 48 Drawing Sheets

FIG. 10
308
24
64
SUPREME
$5,000
MAXI
$5,000
$5,000
MEGA
+5¢ Higher Bet +5¢
More Prizes
MINI
MINI
MINI
150 credits
+5¢ Higher Bet +5¢
More Prizes
MINI
MINI
100 credits
+5¢ Higher Bet +5¢
More Prizes
MAJOR
MINI
50 credits
RISING
STACKS
WILD
WIN
15000

110

| Reel Strip Layout | 120 | 122 | 124 | 126 | 128 |
|---|---|---|---|---|---|
| Stop Position | 1st reel | 2nd reel | 3rd reel | 4th reel | 5th reel |
| 0 | PIC-d | PIC-c | PIC-a | PIC-b | PIC-c |
| 1 | Q | K | J | PIC-b | PIC-a |
| 2 | 9 | Special | A | Special | Special |
| 3 | Special | 10 | A | A | Special |
| 4 | Q | PIC-a | Special | PIC-d | Special |
| 5 | K | PIC-a | Special | 10 | Special |
| 6 | PIC-c | PIC-a | Special | PIC-d | Special |
| 7 | J | K | Special | 9 | Special |
| 8 | J | Q | 10 | Q | Special |
| 9 | Special | WILD | J | Special | A |
| 10 | Q | WILD | PIC-d | Special | PIC-b |
| 11 | PIC-a | A | PIC-d | PIC-b | J |
| 12 | A | K | PIC-d | 10 | WILD |
| 13 | A | A | A | PIC-c | K |
| | | | Special | PIC-c | 9 |
| 37 | 10 | J | | | |
| 38 | PIC-c | J | 10 | PIC-c | K |
| 39 | J | PIC-b | 10 | WILD | PIC-b |
| 40 | Special | PIC-b | Special | PIC-b | |
| 41 | PIC-b | K | 9 | PIC-b | |
| 42 | K | K | 9 | 9 | |
| 43 | J | WILD | 9 | A | |
| 44 | PIC-a | 9 | Special | A | |
| 45 | A | 9 | J | 10 | |
| 46 | K | 9 | J | Special | |
| 47 | A | Special | PIC-b | PIC-a | |
| 48 | PIC-b | PIC-a | K | PIC-a | |
| 49 | Q | PIC-a | PIC-a | | |
| 50 | PIC-d | 10 | Q | | |
| 51 | WILD | 10 | 9 | | |
| 52 | 10 | PIC-d | PIC-c | | |
| 53 | K | PIC-d | K | | |
| 54 | PIC-c | PIC-d | PIC-c | | |
| 55 | PIC-c | 10 | Q | | |
| 56 | 9 | J | K | | |
| 57 | 9 | J | K | | |

114 116 118 130 134 134 134

FIG. 13

170

174 176 178 180

| Bonus Feature Reel Strip Layout | | | | |
|---|---|---|---|---|
| Stop Position | REEL A | REEL B | REEL C | REEL D |
| 0 | PRIZE | PRIZE | PRIZE | PRIZE |
| 1 | PRIZE | PRIZE | MAXI | MAXI |
| 2 | PRIZE | MAXI | PRIZE | PRIZE |
| 3 | PRIZE | PRIZE | PRIZE | PRIZE |
| 4 | MAXI | MAXI | MEGA | MEGA |
| 5 | PRIZE | PRIZE | PRIZE | PRIZE |
| 6 | PRIZE | MEGA | PRIZE | PRIZE |
| 7 | PRIZE | PRIZE | MAXI | SUPREME |
| 8 | PRIZE | PRIZE | | |
| 9 | MEGA | MEGA | | |
| 10 | PRIZE | PRIZE | | |

130 182 186 188 192

FIG. 14

197

| Bonus Feature Reel Strip Layout | | |
|---|---|---|
| Stop Position | REEL A | REEL B |
| 0 | 2X | 2X |
| 1 | 2X | 2X |
| 2 | 2X | 2X |
| 3 | 3X | 3X |
| 4 | 3X | 3X |
| 5 | 3X | 3X |
| 6 | 3X | 3X |
| 7 | 3X | 5x |
| 8 | 5X | 5X |
| 9 | 5X | 10x |
| 10 | 10X | PRIZE |

130

FIG. 15

172

| REEL A WEIGHTS: | | | |
|---|---|---|---|
| Prizes | Values | Weight | Relative Weight |
| 100prize | $100 | 2 | 0% |
| 20prize | $20 | 5 | 1% |
| 15prize | $15 | 21 | 4% |
| 10prize | $10 | 62 | 12% |

FIG. 16A

172

| REEL B WEIGHTS: | | | |
|---|---|---|---|
| Prizes | Values | Weight | Relative Weight |
| 100prize | $100 | 20 | 4% |
| 20prize | $20 | 20 | 4% |
| 15prize | $15 | 20 | 4% |
| 10prize | $10 | 60 | 12% |

FIG. 16B

172

| REEL C WEIGHTS: | | | |
|---|---|---|---|
| Prizes | Values | Weight | Relative Weight |
| 100prize | $100 | 300 | 4% |
| 20prize | $20 | 1000 | 13% |
| 15prize | $15 | 2560 | 32% |
| 10prize | $10 | 4000 | 50% |

FIG. 16C

172

| REEL D WEIGHTS: | | | |
|---|---|---|---|
| Prizes | Values | Weight | Relative Weight |
| 100prize | $100 | 220 | 3% |
| 20prize | $20 | 2000 | 25% |
| 15prize | $15 | 2560 | 32% |
| 10prize | $10 | 3000 | 38% |

FIG. 16D

163

| Prize Cell Selection Logic Table | | | | | | | | | | |
|---|---|---|---|---|---|---|---|---|---|---|
| | | Wager Amount, Credits | | | | | | | | |
| | | 50 Credits | | | 100 Credits | | | 150 Credits | | |
| | Bet Denomination, $/Credit | $0.01 | $0.02 | $0.05 | $0.01 | $0.02 | $0.05 | $0.01 | $0.02 | $0.05 |
| Prize Reel Group 1 | Reel 1 | ACTIVE | ACTIVE | ACTIVE | ACTIVE | ACTIVE | ACTIVE | ACTIVE | ACTIVE | ACTIVE |
| | Reel 2 | INACTIVE | ACTIVE | ACTIVE | INACTIVE | ACTIVE | ACTIVE | INACTIVE | ACTIVE | ACTIVE |
| | Reel 3 | INACTIVE | INACTIVE | ACTIVE | INACTIVE | INACTIVE | ACTIVE | INACTIVE | INACTIVE | ACTIVE |
| | Reel 4 | INACTIVE | INACTIVE | ACTIVE | INACTIVE | INACTIVE | ACTIVE | INACTIVE | INACTIVE | ACTIVE |
| | Reel 5 | INACTIVE | INACTIVE | ACTIVE | INACTIVE | INACTIVE | ACTIVE | INACTIVE | INACTIVE | ACTIVE |
| Prize Reel Group 2 | Reel 1 | INACTIVE | INACTIVE | INACTIVE | ACTIVE | ACTIVE | ACTIVE | ACTIVE | ACTIVE | ACTIVE |
| | Reel 2 | INACTIVE | INACTIVE | INACTIVE | INACTIVE | ACTIVE | ACTIVE | INACTIVE | ACTIVE | ACTIVE |
| | Reel 3 | INACTIVE | INACTIVE | INACTIVE | INACTIVE | INACTIVE | ACTIVE | INACTIVE | INACTIVE | ACTIVE |
| | Reel 4 | INACTIVE | INACTIVE | INACTIVE | INACTIVE | INACTIVE | ACTIVE | INACTIVE | INACTIVE | ACTIVE |
| | Reel 5 | INACTIVE | INACTIVE | INACTIVE | INACTIVE | INACTIVE | ACTIVE | INACTIVE | INACTIVE | ACTIVE |
| Prize Reel Group 3 | Reel 1 | INACTIVE | INACTIVE | INACTIVE | INACTIVE | INACTIVE | INACTIVE | ACTIVE | ACTIVE | ACTIVE |
| | Reel 2 | INACTIVE | INACTIVE | INACTIVE | INACTIVE | INACTIVE | INACTIVE | INACTIVE | ACTIVE | ACTIVE |
| | Reel 3 | INACTIVE | INACTIVE | INACTIVE | INACTIVE | INACTIVE | INACTIVE | INACTIVE | INACTIVE | ACTIVE |
| | Reel 4 | INACTIVE | INACTIVE | INACTIVE | INACTIVE | INACTIVE | INACTIVE | INACTIVE | INACTIVE | ACTIVE |
| | Reel 5 | INACTIVE | INACTIVE | INACTIVE | INACTIVE | INACTIVE | INACTIVE | INACTIVE | INACTIVE | ACTIVE |

164

140

142

FIG. 17

112
132
| GAME SYMBOL | IMAGE FILE | IMAGE |
|---|---|---|
| Wild | [WILD] | 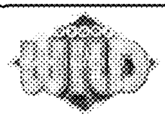 |
| PIC-a | [DICE] | 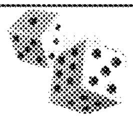 |
| PIC-b | [CLOVER] | 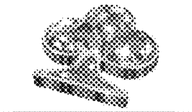 |
| PIC-c | [CHIPS] |  |
| PIC-d | [CARDS] | 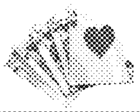 |
| A | [ACE] | 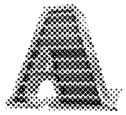 |
| K | [KING] |  |
| Q | [QUEEN] | 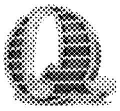 |
| J | [JACK] | 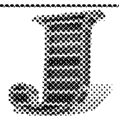 |
| 10 | [TEN] | 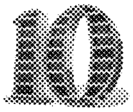 |
| 9 | [NINE] |  |
| Scatter | [GEM] |  |
| Special | [RISE] |  |
94 (Wild row), 94 (PIC-b row), 134 (Special row)
FIG. 18

184
142
| PRIZE SYMBOL | IMAGE FILE | IMAGE |
|---|---|---|
| 10prize | [PRIZE 10] | 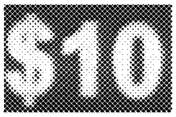 |
| 15prize | [PRIZE 15] | 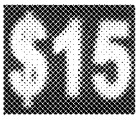 |
| 20prize | [PRIZE 20] | 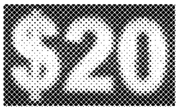 |
| 100prize | [PRIZE 100] | 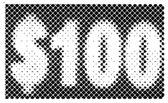 |
| MEGAprogressive | [MEGA] | 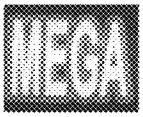 190 |
| MAXIprogressive | [MAXI] |  190 |
| SUPREMEprogressive | [SUPREME] | 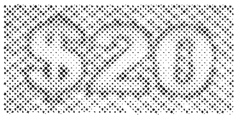 194 |
FIG. 19

191

| PRIMARY GAME SYMBOL CELL SELECTION WEIGHT TABLE | | | |
|---|---|---|---|
| Reel Expansion PG | Reel 3 | Reel 4 | Reel 5 |
| 0 | 0 | 0 | 0 |
| 1 | 200 (20.79%) | 100 (12.25%) | 40 (3.49%) |
| 2 | 750 (77.96%) | 200 (24.51%) | 200 (17.44%) |
| 3 | 12 (1.25%) | 500 (61.27%) | 200 (17.44%) |
| 4 | 0 | 16 (1.96%) | 288 (25.11%) |
| 5 | 0 | 0 | 400 (34.87%) |
| 6 | 0 | 0 | 19 (1.66%) |
| 7 | 0 | 0 | 0 |
| Total | 962 (100%) | 816 (100%) | 1147 (100%) |
| Average | 1.80 | 2.53 | 3.75 |

191

| FREE GAME SYMBOL CELL SELECTION WEIGHT TABLE | | | |
|---|---|---|---|
| Reel Expansion FG | Reel 3 | Reel 4 | Reel 5 |
| 0 | 0 | 0 | 0 |
| 1 | 200 (98.04%) | 25 (27.84%) | 500 (3.48%) |
| 2 | 4 (1.96%) | 60 (68.97%) | 2500 (17.42%) |
| 3 | 0 | 2 (2.30%) | 6500 (45.28%) |
| 4 | 0 | 0 | 4499 (31.34%) |
| 5 | 0 | 0 | 355 (2.47%) |
| 6 | 0 | 0 | 0 |
| 7 | 0 | 0 | 0 |
| Total | 204 (100%) | 87 (100%) | 14354 (100%) |
| Average | 1.02 | 1.74 | 3.12 |

FIG. 20

195

130

| Stop Position | Random Number Range |
|---|---|
| 1 | 1-50 |
| 2 | 51-100 |
| 3 | 101-150 |
| 4 | 151-200 |
| 5 | 201-250 |
| 6 | 251-300 |
| 7 | 301-350 |
| 8 | 351-400 |
| 9 | 401-450 |
| 10 | 451-500 |
| 11 | 501-550 |
| 12 | 551-600 |
| 13 | 601-650 |
| 14 | 651-700 |
| 15 | 701-750 |
| 16 | 751-800 |
| 17 | 801-850 |
| 18 | 851-900 |
| 19 | 901-950 |
| 20 | 951-1000 |

FIG. 21

199

| PAY TABLE | | | | | |
|---|---|---|---|---|---|
| LEFT TO RIGHT ON ADJACENT POSITIONS | | | 1 BET LEVEL | | |
| SYMBOL NAME | 1 SYMBOL | 2 SYMBOLS | 3 SYMBOLS | 4 SYMBOLS | 5 SYMBOLS |
| WILD | | | | | |
| DICE | | | 50 | 200 | 400 |
| CLOVER | | | 25 | 50 | 100 |
| CHIPS | | | 25 | 50 | 100 |
| CARDS | | | 25 | 50 | 100 |
| A | | | 10 | 20 | 30 |
| K | | | 10 | 20 | 30 |
| Q | | | 5 | 10 | 20 |
| J | | | 5 | 10 | 20 |
| 10 | | | 5 | 10 | 20 |
| 9 | | | 5 | 10 | 20 |

FIG. 23

GAMING MACHINE, CONTROL METHOD FOR MACHINE, AND PROGRAM FOR GAMING MACHINE

CROSS-REFERENCE TO RELATED APPLICATION

This application is a continuation of U.S. patent application Ser. No. 16/152,747, filed Oct. 5, 2018, the disclosure of which is hereby incorporated by reference in its entirety.

TECHNICAL FIELD

The present invention relates to a gaming machine, a control method for a gaming machine, and a program for a gaming machine.

BACKGROUND ART

A gaming machine represented by a slot machine is highly popular among casino customers as a device that provides gaming that is easy to enjoy, and recent statistics report that sales from gaming machines account for the majority of casino earnings. Initial slot machines were simple devices, wherein an inserted coin is received, a configured reel rotates and stops mechanically according to a handle operation, and a win or a loss is determined by a combination of symbols stopped on a single pay line. However, recent gaming machines, such as mechanical slot machines driven by a highly accurate physical reel via a computer controlled stepping motor, video slot machines that display a virtual reel on a display connected to a computer, and various gaming machines that apply similar technology to other casino games are quickly advancing. For the manufacturers that develop these gaming machines, an important theme is to provide an attractive game that strongly attracts casino customers as players, and improves the functionality of the gaming machine.

SUMMARY OF INVENTION

In one aspect of the present invention, a gaming machine is provided. The gaming machine includes a display unit configured to display game screens including computer-generated images, a memory device storing a game execution program including computer instructions for generating a game using computer-generated graphics, and a game control unit including a processor programmed to execute the game execution program to display a game screen on the display unit including a primary game area and a bonus feature event area. The processor displays the primary game area including a grid and a plurality of primary game reels being displayed within the grid. The grid includes a plurality of cells arranged in a plurality of reel columns. Each primary game reel is displayed within a corresponding reel column. The processor displays the bonus feature event area including a plurality of bonus prize cells. Each bonus prize cell is configured to display a randomly selected bonus prize. Each bonus prize cell is operable as one of an active bonus prize cell and an inactive bonus prize cell. Each bonus prize cell is associated with a wager amount value. The processor initiates an instance of the game by receiving a signal from the operation unit indicating a wager being placed on the game by the player, determining a wager amount of the received wager, selecting bonus prize cells having associated wager amount values equal to or less than the wager amount of the received wager, and operating the selected bonus prize cells as active bonus prize cells. The processor spins and stops the primary game reels to display an outcome of the primary game, detects a bonus event trigger condition occurring in the outcome of the primary game, and initiates a bonus feature event upon detecting the bonus event trigger condition. The processor initiates the bonus feature event by identifying a plurality of active bonus prize cells associated with the bonus event trigger condition, randomly selecting a bonus prize for each active bonus prize cell associated with the trigger condition, displaying each randomly selected bonus prize in a corresponding active bonus prize cell, and providing a bonus feature award based on a value associated with each randomly selected bonus prize.

In another aspect of the present invention, one or more non-transitory computer-readable storage media, having computer-executable instructions embodied thereon is provided. When executed by a processor, the computer-executable instructions cause the processor to display a game screen including a primary game area and a bonus feature event area. The processor displays the primary game area including a grid and a plurality of primary game reels being displayed within the grid. The grid includes a plurality of cells arranged in a plurality of reel columns. Each primary game reel is displayed within a corresponding reel column. The processor displays the bonus feature event area including a plurality of bonus prize cells. Each bonus prize cell is configured to display a randomly selected bonus prize. Each bonus prize cell is operable as one of an active bonus prize cell and an inactive bonus prize cell. Each bonus prize cell is associated with a wager amount value. The processor initiates an instance of the game by receiving a signal indicating a wager being placed on the game by the player, determining a wager amount of the received wager, selecting bonus prize cells having associated wager amount values equal to or less than the wager amount of the received wager, and operating the selected bonus prize cells as active bonus prize cells. The processor spins and stops the primary game reels to display an outcome of the primary game, detects a bonus event trigger condition occurring in the outcome of the primary game, and initiates a bonus feature event upon detecting the bonus event trigger condition. The processor initiates the bonus feature event by identifying a plurality of active bonus prize cells associated with the bonus event trigger condition, randomly selecting a bonus prize for each active bonus prize cell associated with the trigger condition, displaying each randomly selected bonus prize in a corresponding active bonus prize cell, and providing a bonus feature award based on a value associated with each randomly selected bonus prize.

In still another aspect of the present invention, a mobile computing device is provided. The mobile computing device includes a touch display unit, a memory device, and a processor. The touch display unit is configured to display game screens including computer generated images, a memory device storing a game execution program including computer instructions for generating a game using computer-generated images, and a processor for executing the game execution program to display a game screen including a primary game area and a bonus feature event area. The processor displays the primary game area including a grid and a plurality of primary game reels being displayed within the grid. The grid includes a plurality of cells arranged in a plurality of reel columns. Each primary game reel is displayed within a corresponding reel column. The processor displays the bonus feature event area including a plurality of bonus prize cells. Each bonus prize cell is configured to display a randomly selected bonus prize. Each bonus prize cell is operable as one of an active bonus prize cell and an inactive bonus prize cell. Each bonus prize cell is associated with a wager amount value. The processor initiates an instance of the game by receiving a signal indicating a wager being placed on the game by the player, determining a wager amount of the received wager, selecting bonus prize cells having associated wager amount values equal to or less than the wager amount of the received wager, and operating the selected bonus prize cells as active bonus prize cells. The processor spins and stops the primary game reels to display an outcome of the primary game, detects a bonus event trigger condition occurring in the outcome of the primary game, and initiates a bonus feature event upon detecting the bonus event trigger condition. The processor initiates the bonus feature event by identifying a plurality of active bonus prize cells associated with the bonus event trigger condition, randomly selecting a bonus prize for each active bonus prize cell associated with the trigger condition, displaying each randomly selected bonus prize in a corresponding active bonus prize cell, and providing a bonus feature award based on a value associated with each randomly selected bonus prize.

BRIEF DESCRIPTION OF DRAWINGS

FIG. 13 is an illustration of exemplary reel strip data file for use in generating virtual reels shown in FIG. 4 with symbol arrangements showing the order of symbols displayed on the display area of the game illustrated in FIGS. 3A-3B, according to an embodiment of the present invention.

FIGS. 14-15 are illustrations of an exemplary bonus feature reel strip data files for use in generating bonus feature reels shown in FIGS. 3A-3B with symbol arrangements showing the order of prize symbols, according to an embodiment of the present invention.

FIGS. 16A-16D are illustrations of a prize symbol weight tables that may be used in selecting prize symbols used with the bonus feature reels shown in FIGS. 3A-3B.

FIG. 17 is an illustration of a prize cell selection logic table that may be used to execute the game shown in FIGS. 3A-3B, according to an embodiment of the present invention.

FIG. 18 is an illustration of a symbol image data file that may be used to execute the game shown in FIGS. 3A-3B, according to an embodiment of the present invention.

FIG. 19 is an illustrations of prize symbol image data file that may be used to execute the game shown in FIGS. 3A-3B, according to an embodiment of the present invention.

FIG. 20 is an illustration of symbol cell selection weight tables that may be used to execute the game shown in FIGS. 3A-3B, according to an embodiment of the present invention.

FIG. 21 is an illustration of a reel stop position data file that may be used to execute the game shown in FIGS. 3A-3B, according to an embodiment of the present invention.

FIG. 23 is an illustration showing one example of a paytable data file that may be used with the game illustrated in FIGS. 3A-3B.

Corresponding reference characters indicate corresponding parts throughout the drawings.

DETAILED DESCRIPTION OF EMBODIMENTS

Figure 1A:
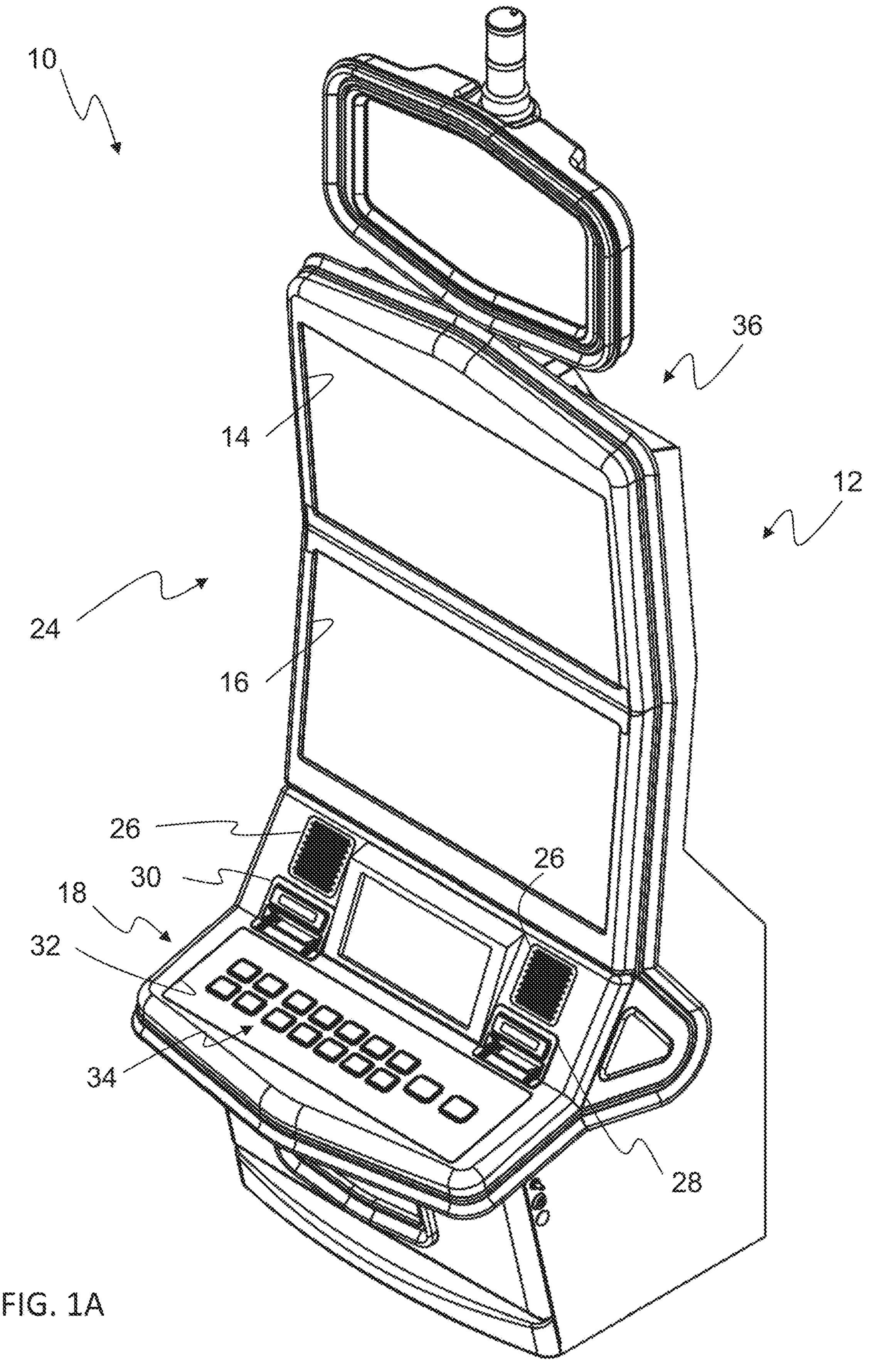
FIG. 1A is a perspective view of the gaming machine, according to the first embodiment.

A gaming machine, according to an embodiment of the present invention, referencing the attached figures is described in detail below. Further, duplicated descriptions will be omitted for identical attached symbols in identical or corresponding parts in each figure.

With reference to the drawings, and in operation, the present invention is directed towards a gaming machine, a control method for a gaming machine, and a program for a gaming machine and/or mobile computing device that provides a game to a player.

The present invention improves the functionality of existing gaming machines by providing a game execution program including computer instructions executed by a processor to operate a game that includes a primary game including a plurality of virtual reels and a bonus feature event that includes a plurality of independent reels. The virtual reels include a plurality of game symbols that are used to determine a winning outcome of the game. In addition, the virtual reels are displayed in a grid that includes a plurality of modifiable cells that are operated between a hidden mode that obscures underlying game symbols and a reveal mode that displays underlying game symbols. The modifiable cells are operated between the hidden mode and the reveal mode base on triggering conditions occurring during the primary game. In addition, the bonus feature event includes a plurality of bonus prize cells that are used to display the independent reels. The bonus prize cells are configured to operate as active prize cells that are used to display randomly selected bonus prizes and as inactive prize cells that do not display bonus prizes that may be awarded to the player. In addition, each bonus prize cell is associated with a wager amount value and/or a bet denomination value, and is operated as an active prize cell or an inactive prize cell based on the wager amount and denomination value of a wager placed by a player.

The game execution program improves the ability of existing game machines to vary the volatility of game outcomes by using random numbers and trigger conditions to operate modifiable cells between hidden and reveal modes, and operating bonus prize cells as active prize cells or inactive prize cells based on the wager amount and bet denomination of a wager. Thus, increasing the flexibility of providing bonus awards to players during the bonus feature event, and increasing the player's interest in playing the game. In addition, the present invention improves existing gaming machines by providing reel strip layout files that allow for varied arrangements of symbols, thus reducing the amount of computing resources required to render the virtual reels for display.

The gaming machine according to the present embodiment, receives a predetermined game value from the player, generates a game result, and provides a payout to the player according to the game result and one or more pay tables. FIGS. 1A-1D are perspective views and a front view, respectively, of a gaming machine 10, according to the present embodiment. As shown in FIGS. 1A-1D, this gaming machine 10 provides a cabinet 12 providing an upper display 14, a lower display 16, and a control panel 18 and may also house a player tracking or ranking unit 20. The cabinet 12 also houses a game control unit 22 (see FIG. 2) that controls each part (see below). The control unit 22 also implements a random number generator (RNG) that is used during operation of the game. Each configuration is described below.

The upper display 14 and the lower display 16 may be flat panel display devices, such as both liquid crystal display devices and organic EL display devices and the like, and by controlling via each control unit 22, the display area mentioned below functions as a display unit 24 provided to the player. As shown in FIGS. 1C and 1D, the gaming machine 10 may include a unitary display unit 24 that operates as both the upper and lower displays 14, 16.

Speakers 26 are provided on the left and right of the cabinet 12, and by controlling via the control unit 22, sound is provided to the player. On the control panel 18, a bill/ticket identification device 28, a printer device 30, and an operation unit 32 are provided.

The player tracking unit 20 may be housed on the center of the front surface of the cabinet 12 below the lower display 16. The player tracking unit 20 has a card reader that recognizes a player identification card, a display that presents data to the player, and a keypad that receives input by the player. This type of player tracking unit 20 reads information recorded on the player identification card inserted by the player into the card reader, and displays the information and/or information acquired by communicating with the external system on the display, by cooperatively operating with the control unit 22 mentioned below or an external system. Further, input from the player is received by the keypad, the display is changed according to the input, and communication with the external system is carried out as necessary.

The bill/ticket identification device 28 is disposed on the control panel 18 in a state where the insertion opening that a bill/ticket is inserted into is exposed, an identification part that identifies a bill/ticket by various sensors on the inside of the insertion opening is provided, and a bill/ticket storage part is provided on the outgoing side of the identification part. The bill/ticket identification device 28, receives and identifies bills/tickets (including vouchers and coupons) that are the game value as a game executing value, and notifies the control unit 22 mentioned below.

The printer device 30 is disposed on the control panel 18 in a state where the ticket output opening that a ticket is output from is exposed, a printing part that prints predetermined information on a printing paper on the inside of the ticket output opening is provided, and a housing part that houses the printing paper inside the paper inlet side of the printing part is provided. The printer device 30, under the control of the control unit 22 mentioned below, prints information on paper and outputs a ticket according to credit payout processing from the gaming machine 10. The output ticket can use the payout credit as game play by being inserted into the bill/ticket identification device 28 of another gaming machine, or, can be exchanged for cash by a kiosk terminal inside of the casino or a casino cage.

The operation unit 32 receives the operation of the player. The operation unit 32 includes a group of buttons 34 that receives various instructions from the player on the gaming machine 10. The operation unit 32, for example, may include a spin button and a group of setting buttons. The spin button receives an instruction to start (start rotating the reel) an instance of the game. The group of setting buttons 34 includes a group of bet buttons, a denomination button, a group of line-designation buttons, a max bet button, and a payout button and the like. The group of bet buttons receives an instruction operation regarding the bet amount of credits (bet number) from the player. The group of line-designation buttons receive an instruction operation that designate a pay line subjected to a line judgment below from the player. The max bet button receives an instruction operation regarding the bet of the maximum amount of credits that can be bet at one time from the player. The payout button receives an instruction operation instructing a credit payout accumulated in the gaming machine 10. As shown in FIGS. 1C and 1D, in one embodiment, the operation unit 32 may include a touchscreen panel display that displays the graphic computer images of the group of buttons 32 and performs functions similar to the group of buttons 32 including transmitting player selections to the control unit 22. The gaming machine 10 also includes illumination devices 36 that provides decorative lighting to the gaming machine 10.

Figure 1B:
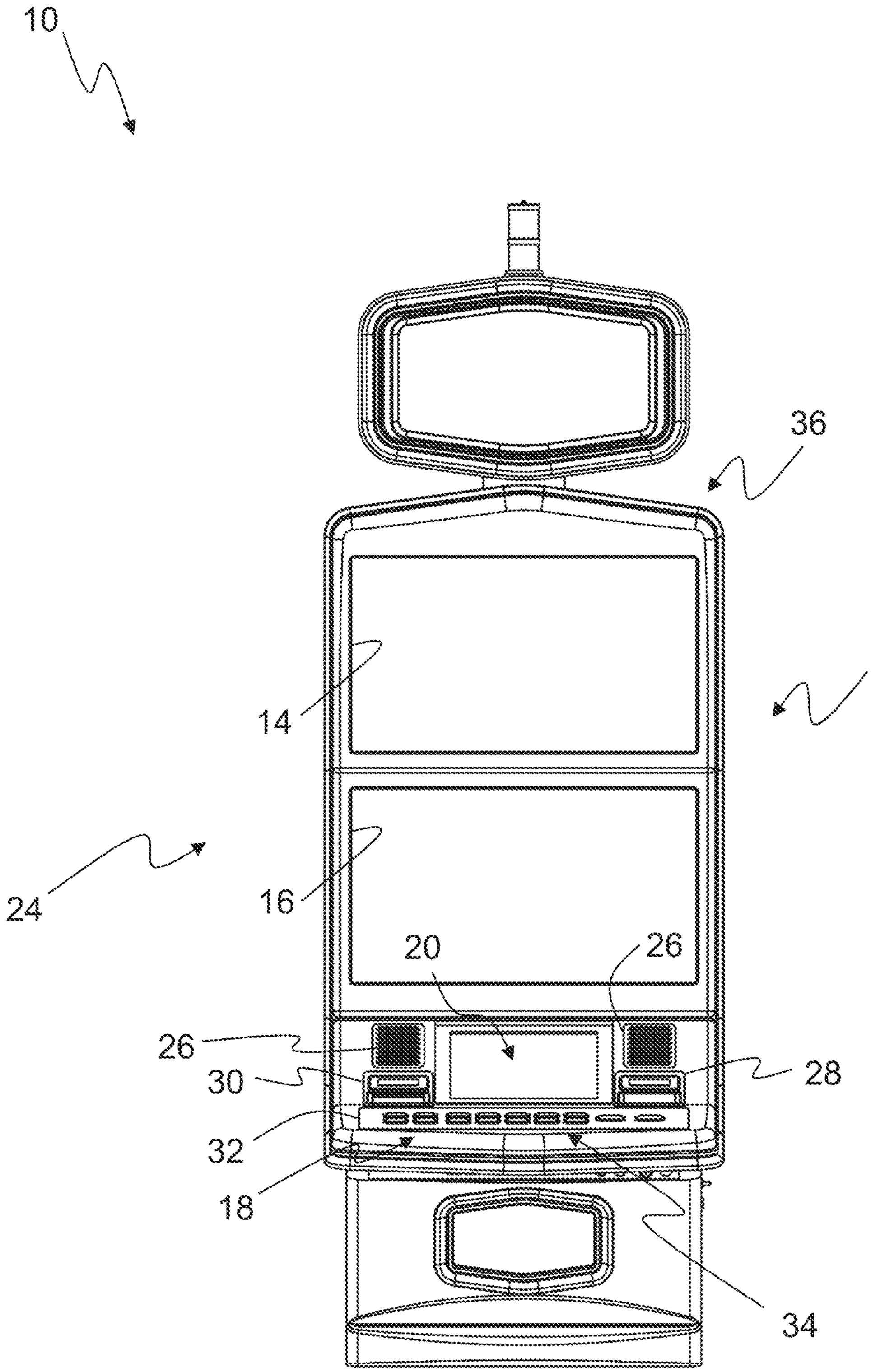
FIG. 1B is a front view of the gaming machine of FIG. 1A.
Figure 1C:
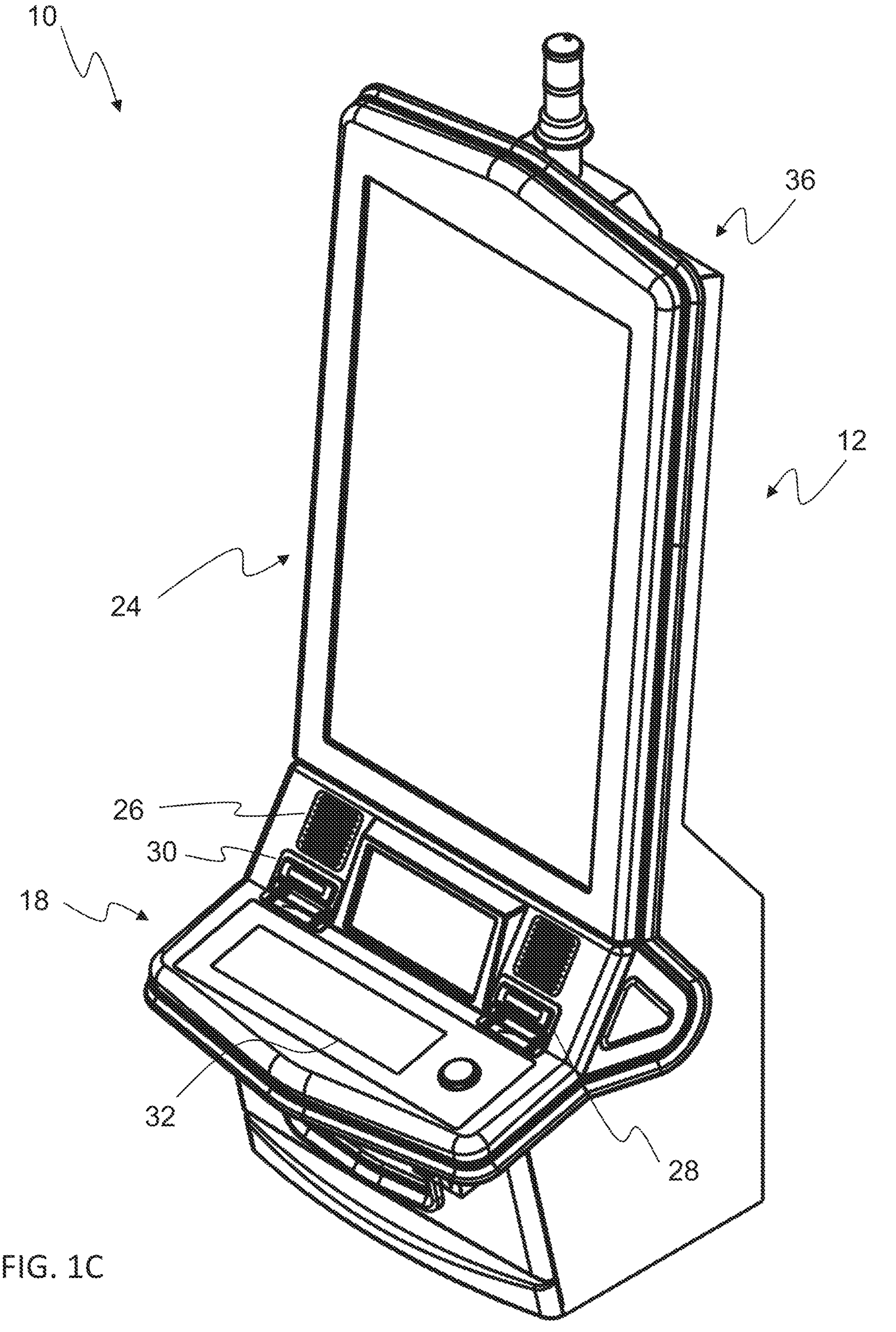
FIG. 1C is another perspective view of the gaming machine shown in FIG. 1A including a unitary display screen and operation unit with touchscreen panel.
Figure 1D:
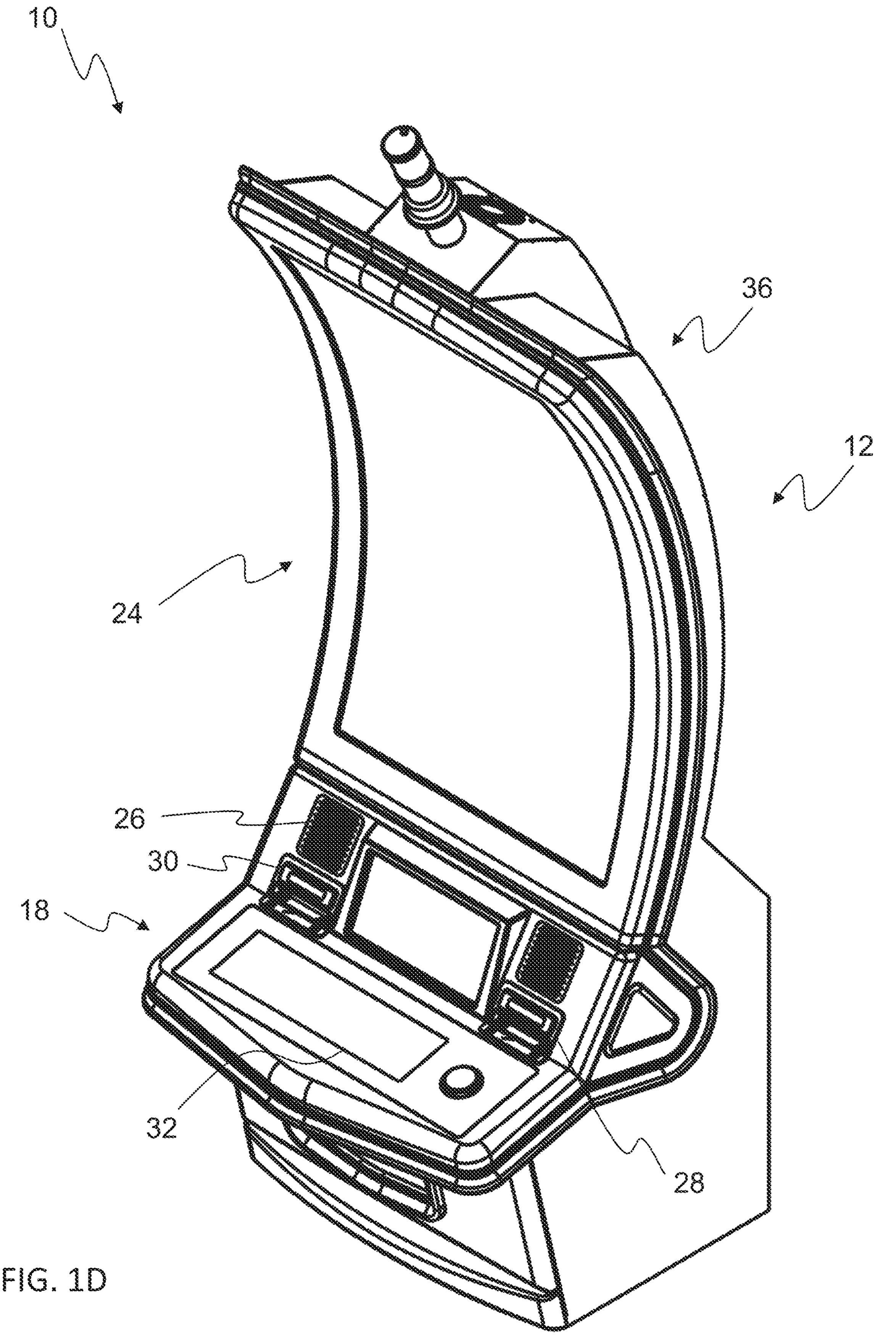
FIG. 1D is another perspective view of the gaming machine shown in FIG. 1A including a curved unitary display screen and operation unit with touchscreen panel.

In one embodiment, referring to FIGS. 1A and 1B, the control panel 18 includes a plurality of user input devices that may include an acceptor device which accepts media associated with a monetary value to establish a credit balance, a validator configured to identify the physical media, a cash-out button actuatable to cause an initiation of a payout associated with the credit balance. The acceptor device may include a touchscreen display associated with the display unit 24 and/or the player tracking unit 20, the paper money/ticket identification device 28, the operation unit 32, the player tracking unit 20, a coin slot, a ticket in ticket out (TITO) system, a bill acceptor, and/or any suitable device that enables the gaming machine 10 to receive media associated with a monetary value and establish a credit balance for use in playing the gaming machine 10. In one embodiment, the acceptor device may be configured to receive physical media such as, for example, a coin, a medal, a ticket, a card, a bill, currency, and/or any suitable physical media that enables the gaming machine 10 to function as described herein. The acceptor device may also be configured to accept virtual media such as, for example, a player tracking account, a virtual credit balance, reward points, gaming credits, bonus points, and/or any suitable virtual media that enables the gaming machine 10 to function as described herein.

For example, in one embodiment, the coin slot may include an opening that is configured to receive coins and/or tokens deposited by the player into the gaming machine 10. The control unit 22 converts a value of the coins and/or tokens to a corresponding amount of gaming credits that are used by the player to wager on games played on the gaming machine 10. The bill acceptor may include an input and output device that is configured to accept a bill, a ticket, and/or a cash card into the bill acceptor to enable an amount of gaming credits associated with a monetary value of the bills, ticket, and/or cash card to be credited to the gaming machine 10. In one embodiment, the bill acceptor also includes a printer (not shown) that is configured to dispense a printed voucher ticket that includes information indicative of an amount of credits and/or money paid out to the player by the gaming machine 10 during a gaming session. The voucher ticket may be used at other gaming devices, or redeemed for cash, and/or other items as part of a casino cashless system.

Figure 2:
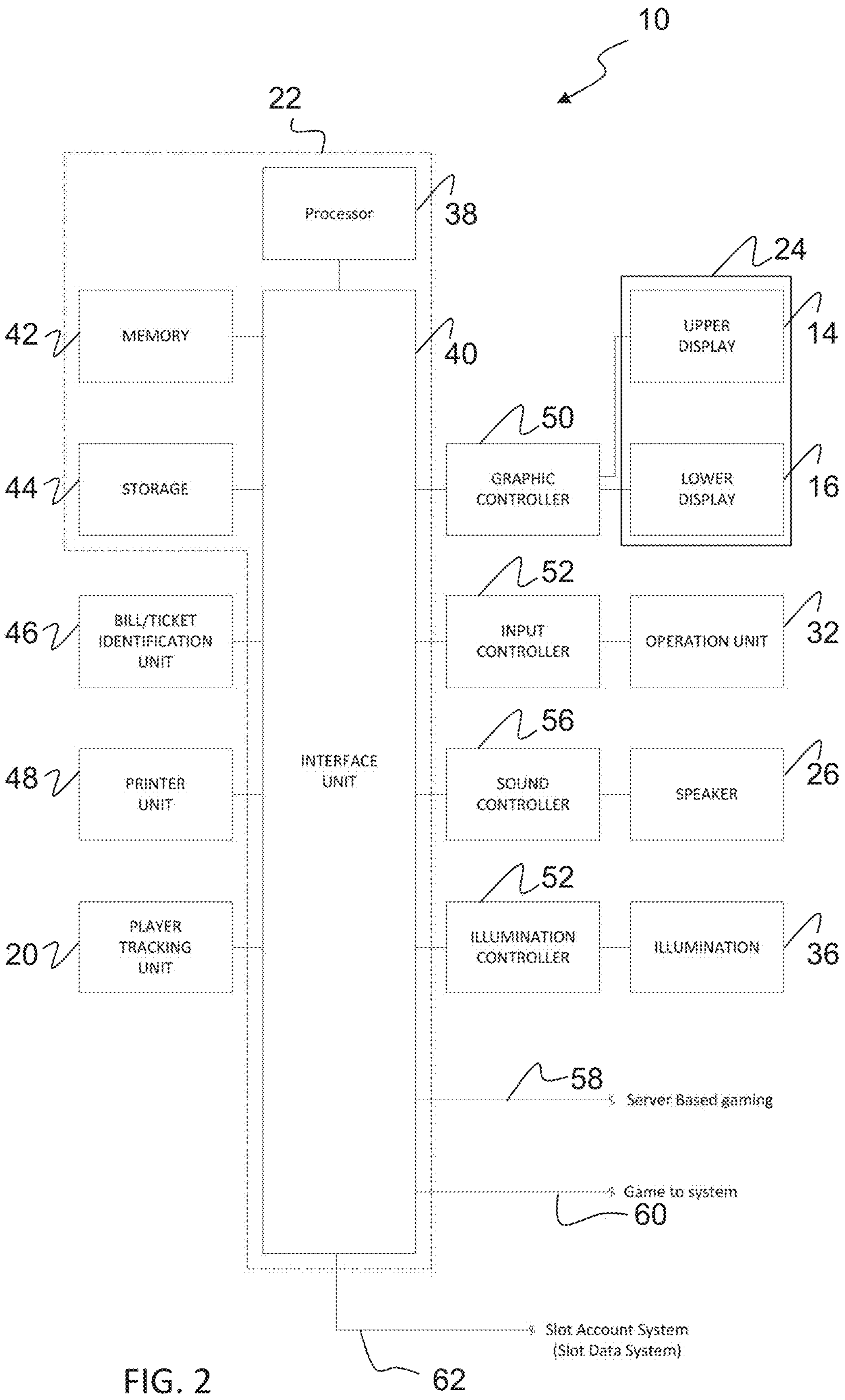
FIG. 2 is a functional block diagram of the gaming machine in FIGS. 1A-1D.

With reference to FIGS. 1A, 1B, and 2, further on the inside of cabinet 12, a control board equipped with a central processing unit 38 (abbreviated as CPU below) including a processor that configures the control unit 22, an interface unit (or part) 40, a memory device including a memory 42 and a storage 44, and the like are incorporated. The control board is configured so that communication is possible through the interface unit 40 and each of the components equipped on the cabinet 12, controls the operation of each part by executing the program recorded in the memory 42 or the storage 44 of the CPU 38, and provides a game to the player. The function of the CPU 38 is to execute and display the game on the displays 14, 16 of the gaming machine 10.

FIG. 2 shows a functional block diagram of the gaming machine 10, according to the present embodiment. The gaming machine 10 provides the control unit 22. The control unit 22 is configured as the interface unit 40 including a chip set providing communication functions of the CPU 38, a memory bus connected to a CPU 38, various expanding buses, serial interfaces, USB interfaces, Ethernet (registered trademark) interfaces and the like, and a computer unit where the CPU 38 provides the addressable memory 42 and the storage 44 through the interface unit 40. The memory 42 can be configured to include RAM that is a volatile storage medium, ROM that is a nonvolatile storage medium, and EEPROM that is a rewritable nonvolatile storage medium. The storage 44 provides the control unit 22 as an external storage device function, can use reading devices such as a memory card that is a removable storage medium, and a magneto optical disk and the like, and can use hard disks.

On the interface unit 40, in addition to the CPU 38, the memory 42, and the storage 44, a bill/ticket identification unit controller 46, a printer unit controller 48, the player tracking unit 20, a graphic controller 50, an input controller 52, and a sound controller 54 are connected. That is, the control unit 22 is connected to the operation unit 32 through the input controller 52, and connected to the upper display 14 and/or the lower display 16 through the graphic controller 50. Further, when illumination devices 36 that provides decorative lighting to the gaming machine 10 is provided, the illumination is controlled under the control of the control unit 22 on the interface unit 40, and an illumination controller 56 that controls the illumination devices 36 to provide a decorative lighting effect may be connected.

The control unit 22, which includes memory 42 and storage 44, controls each part by executing a program stored in the memory 42 and the storage 44, and provides a game to the player. Here, for example, the memory 42 and storage 44 may be configured to store a program and data of an operating system and subsystem that provide the basic functions of the control unit 22 to the EEPROM of the memory 42, and stores a program and data of an application that provides a game to the storage 44. According to such a configuration, it can be easy to change or update a game by replacing the storage 44. Further, the control unit 22 may be a multiprocessor configuration that has a plurality of CPUs.

Each block connected to the control unit 22 is described below. The bill/ticket identification unit controller 46 operates the bill/ticket identification device 28 to receive bills/tickets in the insertion opening, and notifies the control unit 22 of identifying information corresponding to the assortment of bills or the payout processing of credits. The bill/ticket identification unit controller 46 notifies the information to the control unit 22, and the control unit 22 increases the usable credit amount inside of the game according to the notified content. The printer unit controller 48 corresponds to the printer device 30, and under the control of the control unit 22 that receives an operation of the payout button of the group of setting buttons 34, information corresponding to the credit payout processing from the gaming machine 10 is printed and output on a printed ticket.

The player ranking (or tracking unit) unit 20 cooperatively operates with the control unit 22, and sends and receives information and the like of the player from the casino management system. The graphic controller 50 controls the display unit 24 including the upper display 14 and the lower display 16, under the control of the control unit 22, and displays a display image that includes various graphic data. The sound controller 54 drives the speakers 26 under the control of the control unit 22, and provides various sounds such as an announcement, sound effects, BGM and the like.

Further, the interface unit 40, has various communication interfaces for communicating with the exterior of the gaming machine 10, for example the interface unit 40 can communicate with an external network by Ethernet 58, 60, and a serial interface 62. In the present embodiment, one example shows when there is communication between a well-known server side gaming network (Server Based Gaming of FIG. 2), a G2S network (Game to System of FIG. 2), and a slot information system (Slot Data System of FIG. 2), respectively.

Figure 3A:
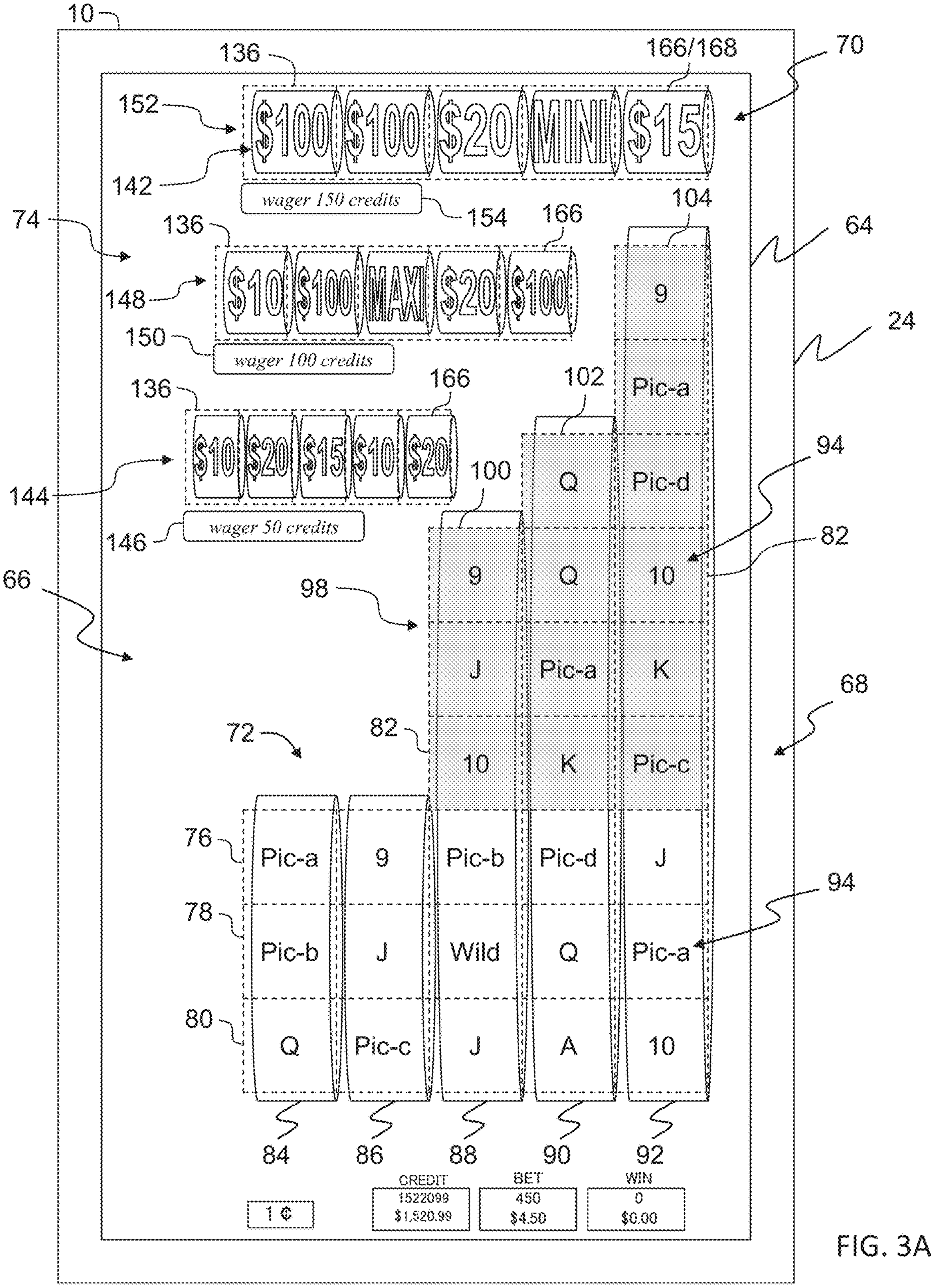
FIGS. 3A-3B are illustrations of a game displayed on a display area of the gaming machine in FIGS. 1A-2, according to an embodiment of the present invention.
Figure 3B:
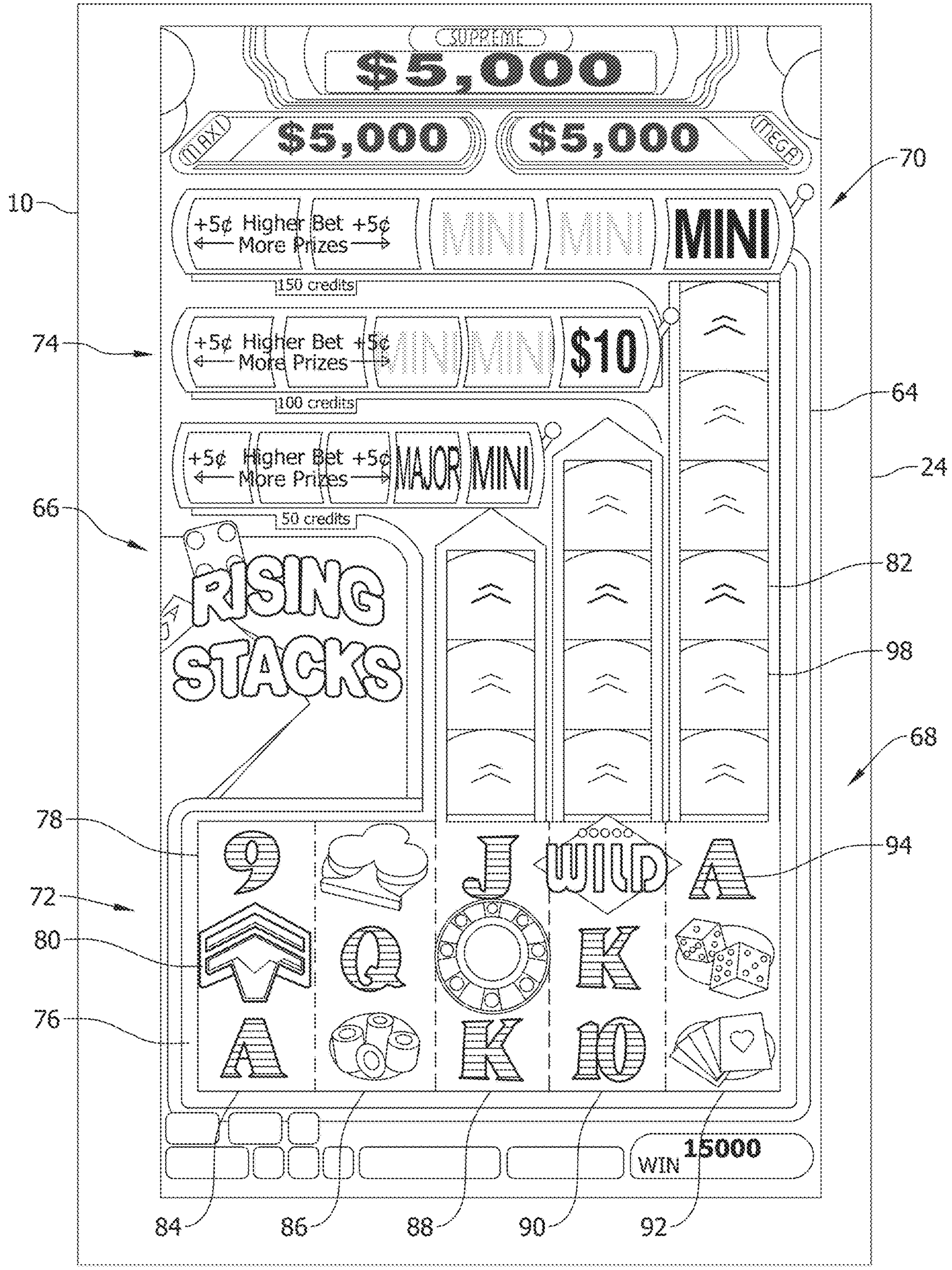

FIGS. 3A-3B schematically shows a display area 64 provided by the gaming machine 10. Such a display area 64 is displayed on the display unit 24 (the upper display 14 and/or the lower display 16) by the control unit 22 executing a predetermined program.

In one aspect of the present invention, the control unit 22 executes a game execution program to provide a game 66 that includes a primary game 68 and a bonus feature event 70 (shown in FIGS. 29-37F). The control unit 22 displays a game screen within the display area 64 that includes a primary game area 72 displaying the primary game 68 and a bonus feature event area 74 displaying the bonus feature event 70. In the illustrated embodiment, the primary game 68 and the bonus feature event 70 are displayed on the upper display 14 and the lower display 16. The upper display 14 may also be used to display animations and/or game identifying information during the game and/or during an attract mode. Further, the lower display 16 may also display a decorative area, and an area that displays credit amount, bet number, and a credit amount obtained by winning (WIN number) and the like. In another embodiment, the display unit 24 includes a single display that displays the primary game 68 and the bonus feature event 70.

Figure 4:
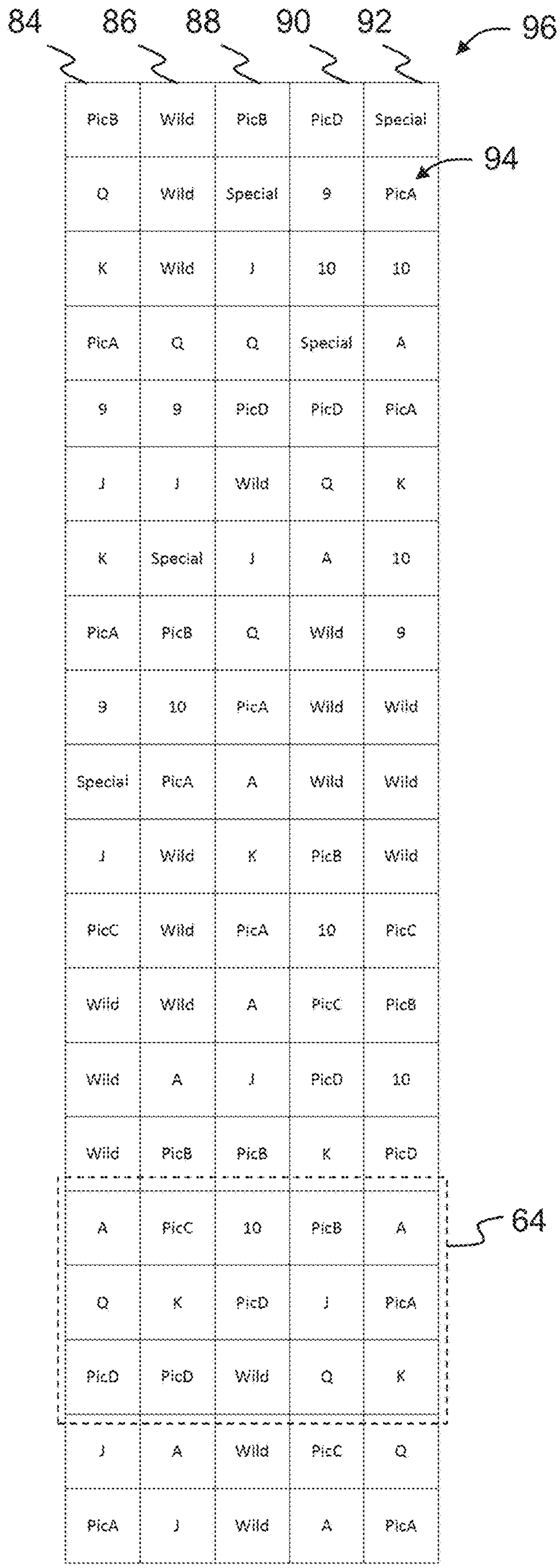
FIG. 4 is an illustration of virtual reels that may be used with the game shown in FIGS. 3A-3B, according to an embodiment of the present invention.

In the illustrated embodiment, the primary game 68 includes a video slot game using a plurality of virtual reels (shown in FIGS. 3A-4). The video slot game utilizes a grid 76 in the display area 64. By using such a display area, the gaming machine 10 of the present embodiment operates as a slot machine that pays a payout according to a winning combination of symbols displayed on the display area 64.

The display unit 24 displays a plurality of game symbols in the grid 76. The grid 76 includes a plurality of cells 78 arranged in a plurality of rows (r) and columns (c). In the illustrated embodiment, the grid 76 is displayed with a plurality of primary cells 80 and a plurality of modifiable cells 82. The primary cells 80 are configured stop positions of symbols being displayed on the plurality of virtual reels. On each of the plurality of primary cells 80 of the display area 64, one symbol is stopped and displayed.

In the illustrated embodiment, the grid 76 is displayed with fifteen primary game cells 80 arranged in three rows and five columns, and the control unit 22 generates five primary game reels including a $1^{st}$ reel 84, a $2^{nd}$ reel 86, a $3^{rd}$ reel 88, a $4^{th}$ reel 90, and a $5^{th}$ reel 92 for use in displaying the primary game 68. On each primary cell 80 of the grid 76, as shown in FIGS. 3A and 3B, a game symbol 94 is displayed based on the symbol arrangement of virtual reels including primary game reels 84, 86, 88, 90, 92 (also shown in FIG. 4) configured as a virtual reel set 96. That is, the primary cells 80 of the grid 76 correspond to the primary game reels 84 to 92, by column, and the game symbols 94 disposed on predetermined parts of each primary game reels 84 to 92 are displayed. In the illustrated embodiment, each of the primary game reels 84 to 92 displays multiple symbols within a corresponding column with the virtual reel in a stopped position. For example, as shown in FIGS. 3A and 3B, when stopped, each primary game reel 84 to 92 displays 3 game symbols within each corresponding column. Furthermore, by moving (scrolling or spinning) each game symbol 94 by column based on the symbol arrangement of the primary game reels 84 to 92, the game symbols 94 displayed in the cells 78 of the grid 76 change, and by stopping the movement (scrolling or spinning) by columns, the game symbols 94 are stopped. Here, the primary game reels 84 to 92 are data where the control unit 22 uses a program having the memory 42 or the storage 44, and data showing the symbol arrangement (i.e., the order of symbols on each reel strip) regulated by each cell column. Further, the virtual reel set 96 is a general term for such primary game reels 84 to 92. In the display area 64, a plurality of pay lines are arranged in the grid 76. Each pay line includes a group of cells 78 that is used when winning is determined, and extends from the column on the right end to the column of the left end. The game symbols 94 being displayed in the group of cells 78 that constitute a pay line are evaluated to determine a win.

In the illustrated embodiment, the grid 76 includes a plurality of bonus reel columns 98 that are associated with a subset of primary game reels 84 to 92. For example, as shown in FIG. 3A, in one embodiment, the plurality of bonus reel columns 98 includes a first bonus reel column 100 that is associated with the $3^{rd}$ reel 88, a second bonus reel column 102 that is associated with the $4^{th}$ reel 90, and a third bonus reel column 104 that is associated with the $5^{th}$ reel 92. Each bonus reel column 98 includes a plurality of modifiable cells 82. Each modifiable cell 82 is configured to be operated in a hidden mode 106 (shown in FIGS. 34A-35D) and in a reveal mode 108 (shown in FIGS. 34A-35D). When operating in the hidden mode 106, the modifiable cell 82 is displayed to obscure the underlying game symbols 94 of the corresponding primary game reel, such that the underlying game symbol 94 is not visible on the game screen 64. In one embodiment, the modifiable cell 82 may operate in the hidden mode 106 to partially obscure the underlying game symbol 94 such that a portion of the game symbol and/or an outline of the game symbol 94 may be visible on the game screen 64. In addition, when operating in the hidden mode 106, the modifiable cell 82 may display an image of a door, curtain, other game symbol, other game images, a shading, a pattern, an opaque shading, and/or any suitable additional visual enhancement to notify the player that the underlying game symbol 94 is not included in the outcome of the primary game 68.

When operating in the reveal mode 108, the modifiable cell 82 is displayed to reveal the underlying game symbols 94 of the corresponding primary game reel 84-92, such that the underlying game symbols 94 are visible on the game screen 64. For example, as shown in FIGS. 34A-35D, when operating in the reveal mode 108, as the corresponding primary game reel 84-92 is spinning, the moving game symbols 94 are visible though the modifiable cell 82, and as the primary game reel 84-92 is moved to a stopped position, a corresponding game symbol 94 is visible through the modifiable cell 82. In addition, in one embodiment, a modifiable cell 82 operating in the reveal mode 108 may also form an additional pay line that may be used to determine a winning combination of game symbols 94 in the outcome of the primary game 68.

During a play of the primary game 68, the control unit 22 initially operates each modifiable cell 82 in the hidden mode 106 obscuring the underlying game symbol 94 from view. As the primary game 68 progresses, the control unit 22 may initiate a reel expansion feature that transitions one or more modifiable cells 82 from the hidden mode 106 to the reveal mode 108 upon detecting a reveal trigger condition during the primary game 68. For example, in one embodiment, the reveal trigger condition may include the appearance of one or more predefined symbols in the grid 76 with one or more primary game reels 84 to 92 in a stopped position. In addition, upon detecting the reveal trigger condition, the control unit 22 may be programmed to initiate the reel expansion feature by randomly selecting a number of modifiable cells 82, and operate the randomly selected modifiable cells 82 from the hidden mode 106 to the reveal mode 108.

In the illustrated embodiment, each bonus reel column 98 include a different number of modifiable cells 82. For example, as shown in FIG. 3A, the first bonus reel column 100 includes 3 modifiable cells 82, the second bonus reel column 102 includes 4 modifiable cells 82, and the third bonus reel column 104 includes 6 modifiable cells 82. In other embodiments, the first, second, and third bonus reel columns 100, 102, 104 may include different numbers of modifiable cells 82, and/or one or more bonus reel columns 98 may include the same number of modifiable cells 82.

The control unit 22 generates each primary game reel 84 to 92, in the examples of FIGS. 3A and 3B using a reel strip data file 110 and a game symbol image data file 112 stored in memory 42 and/or storage 44 (shown in FIGS. 13 and 18). The reel strip data file 110 includes a reel designation 114 associated with each primary game reel 84 to 92 and sequential symbol position logic cells 116 associated with each reel designation 114. Each symbol position logic cell 116 is associated with a symbol position 118 and includes instructions for rendering the primary game reels with a plurality of game symbols. The reel strip data file 110 includes information associated with a plurality of reel strips 120, 122, 124, 126, 128 that correspond to each primary game reel 84 to 92, and are used to generate primary game reels 84 to 92. Each reel strip 120, 122, 124, 126, 128 includes a number of symbol positions 118 configured to be populated by game symbols 94 that are selected from the game symbol image data file 112 stored in memory 42 and/or storage (shown in FIG. 18). The reel strips 120-128 also include reel stop positions 130 associated with each symbol position 118. The symbol positions 118 and the corresponding game symbols 94 are arranged in an order defined by each reel strip 120, 122, 124, 126, 128. In addition, one or more reel strips 120, 122, 124, 126, 128 includes a different number of symbol positions 118.

In the illustrated embodiment, each symbol position 118 includes indicators for displaying a predefined game symbol 94 selected from a set of game symbols 94 included in a game symbol image data file 112. For example, for each play of the game, the symbol positions 118 have an associated predefined game symbol 94 from a symbol set 132. The game symbol image data file 112 includes the details of game symbols 94 populating the symbol positions 118 and includes varieties of game symbols 94. This symbol set 132 includes card symbols ("9", "10", "J", "Q", "K", and "A") that imitate playing cards as regular symbols, and picture symbols ("PicA", "PicB", "PicC", and "PicD") that show a pattern. Further, this symbol set 132 includes a wild symbol ("Wild") that is substituted as another symbol when a win combination is determined and a special symbol 134 ("Special") that may be used to determine if a game feature is to be provided. Each of these symbols have a different rank from each other regarding their value when winning, their rank gradually raises in this order: "9", "10", "J", "Q", "K", "A", "PicE", "PicD", "PicC", "PicB", "PicA". A combination of symbols that includes high-ranking symbols when winning, can obtain a larger winning payout compared to a combination of low-ranking symbols when winning.

During the primary game 68, the special symbol 134 may serve as the reveal trigger condition that initiates the operation of one or more modifiable cells 82 to the reveal mode 108. For example, in one embodiment, the control unit 22 may be programmed to initiate a transition of one or more modifiable cells 82 from the hidden mode 106 to the reveal mode 108 upon detecting the appearance of one or more special symbols 134 in the grid 76 with one or more primary game reels 84 to 92 in a stopped position.

It should be noted that in one aspect of the present invention, one or more dynamic virtual reel strips may be utilized. Using dynamic virtual reel strips, the symbols and/or symbol positions and/or sequence of symbol positions and/or length or size and/or any aspect of a virtual reel strip may change from one spin or play to the next. For example, a dynamic virtual reel strip may include variable symbol positions that include instructions to display randomly selected game symbols for each play of the primary game. The variable symbol positions may be in the form of one or more stacks, i.e., adjacent symbol positions. In one embodiment, the location and/or size of the stacks may change from one spin to the next, either randomly and/or in a predetermined pattern. In addition, a virtual reel strip associated with a column of cells may be dynamically changed from one spin or play to another spin or play. This, may occur randomly, every spin or play and/or in a predetermined pattern.

Figure 38A:
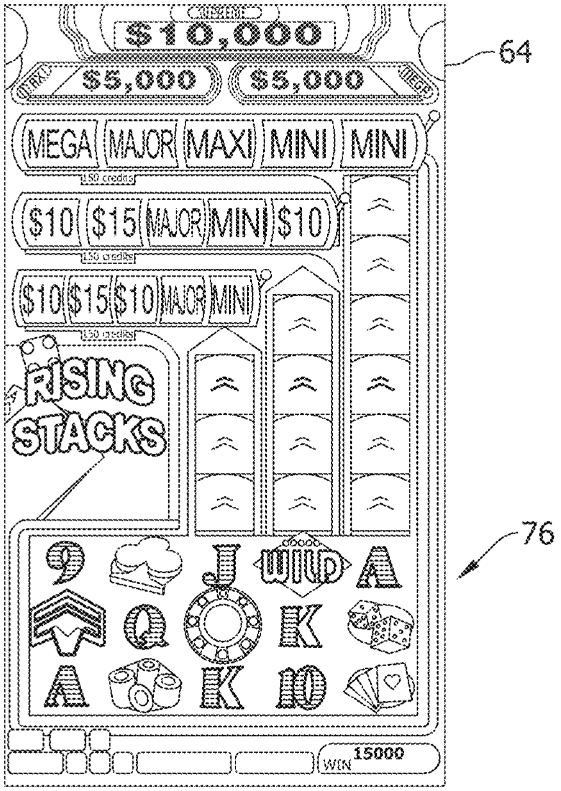
FIGS. 38A-38B are additional illustrations of the game shown in FIGS. 3A-3B, according to various embodiments of the present invention.
Figure 38B:
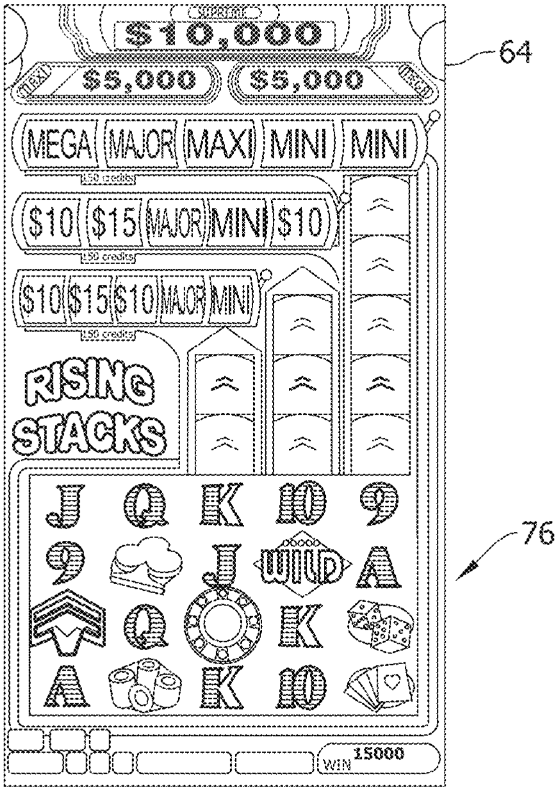

It should be noted that in the illustrated embodiment, each column of the grid 76 has a corresponding reel. When the reel stops, a symbol from the respective reel appears in each one of the cells of the respective column of the grid 76. One or more of the reels 84 to 92 may be identical or all of the reels 84 to 92 may be different. In the next several embodiments, the present invention will be described with respect to a 3×5 grid of primary game cells 80, however, it should be noted that the present invention is not limited to a grid with any specific size and/or shape. For example, in one embodiment, the control unit 22 may be programmed to display the primary game cells 80 in a 3×5 grid 76 during a base game, as shown in FIG. 38A, and display the primary game cells 80 in a 4×5 grid 76 during free games, as shown in FIG. 38B.

Referring to FIGS. 29-37F, in the illustrated embodiment, the bonus feature event 70 includes a plurality of bonus prize cells 136. Each bonus prize cell 136 is configured to display a randomly selected bonus prize during the bonus feature event 70. In addition, each bonus prize cell 136 is associated with a corresponding bonus reel column 98. Each bonus prize cell 136 is operable as an active bonus prize cell 138 and an inactive bonus prize cell 140 (shown in FIGS. 30A-33B). An active bonus prize cell 138 displays a bonus prize symbol 142 that is associated with a bonus prize may be awarded during the bonus feature event 70 such that the bonus prize symbol 142 is visible on the game screen 64. When operated as an active bonus prize cell 138, the underlying bonus prize symbol 142 is visible during the primary game 68 and the bonus feature event 70. An inactive bonus prize cell 140 obscures an underlying bonus prize symbol 142 to indicate that the corresponding bonus prize is not available to be awarded during the bonus feature event 70. For example, as shown in FIGS. 30A-33B, in one embodiment, during the bonus feature event 70, each bonus prize cell 136 being operated as an active bonus prize cell 138 is configured to display a bonus prize symbol 142 that is awarded to the player, and each bonus prize cell 136 being operated as an inactive bonus prize cell 140 is configured to obscure and/or hide an underlying bonus prize symbol 142 to indicate the corresponding bonus prize is not available for award. In the illustrated embodiment, each bonus prize symbol 142 is associated with a bonus prize that may be awarded during the bonus feature event. The bonus prize may include, but is not limited to including, a monetary prize amount, a progressive prize, a credit prize, a credit prize multiplier, a number of free spins, and/or any suitable bonus award.

In the illustrated embodiment, the control unit 22 is programmed to associate each bonus prize cell 136 with a wager amount value associated with the primary game 68.

For example, as shown in FIGS. 3A and 3B. the control unit 22 may display one or more minimum wager bonus prize cells 144 having an associated wager amount value equal to a minimum wager amount 146 that may be bet on the primary game 68, one or more medium wager bonus prize cells 148 having an associated wager amount value equal to a medium wager amount 150 that may be bet on the primary game 68, and one or more maximum wager bonus prize cells 152 having an associated wager amount value equal to a maximum wager amount 154 that may be bet on the primary game 68. In the example illustrated in FIGS. 3A and 3B, the minimum, medium, and maximum wager amounts 146, 150, 154 are 50 credits, 100 credits, and 150 credits, however, the minimum, medium, and maximum wager amounts 146, 150, 154 are not limited to the credit amounts shown, and may include any suitable amount of credits that may be bet on the primary game 68.

The control unit 22 may also associate one or more groups of bonus prize cells 136 to one or more wager amounts. For example, as shown in FIG. 3A, the control unit 22 may be programmed to display a first group 144 of bonus prize cells 136 having an associated wager amount value equal to a minimum wager amount 146. The control unit 22 may also display a second group 148 of bonus prize cells 136 having an associated wager amount value equal to the medium wager amount 150, and display a third group 152 of bonus prize cells 136 having an associated wager amount value equal to the maximum wager amount 154.

Figure 29:
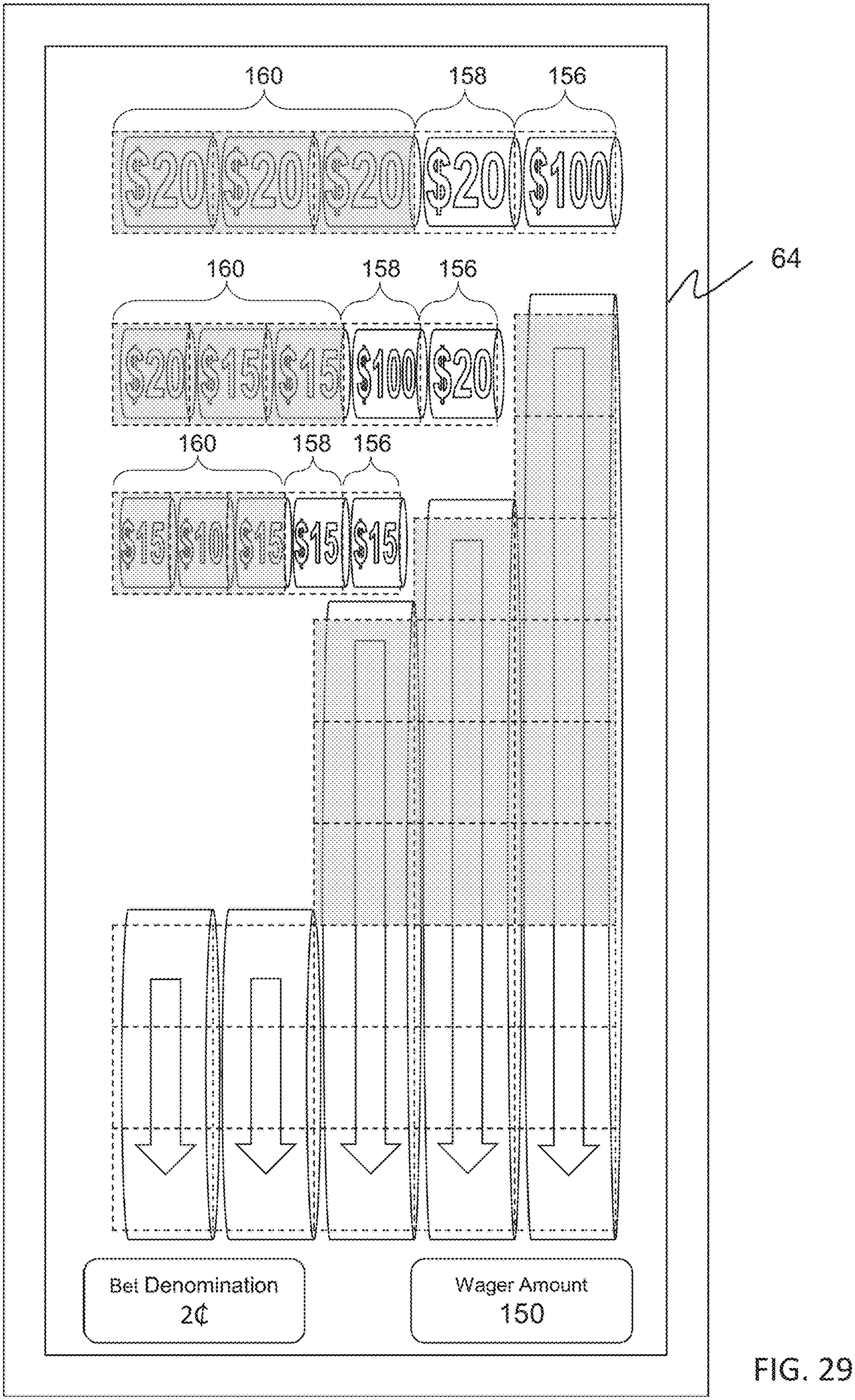
Figure 30A:
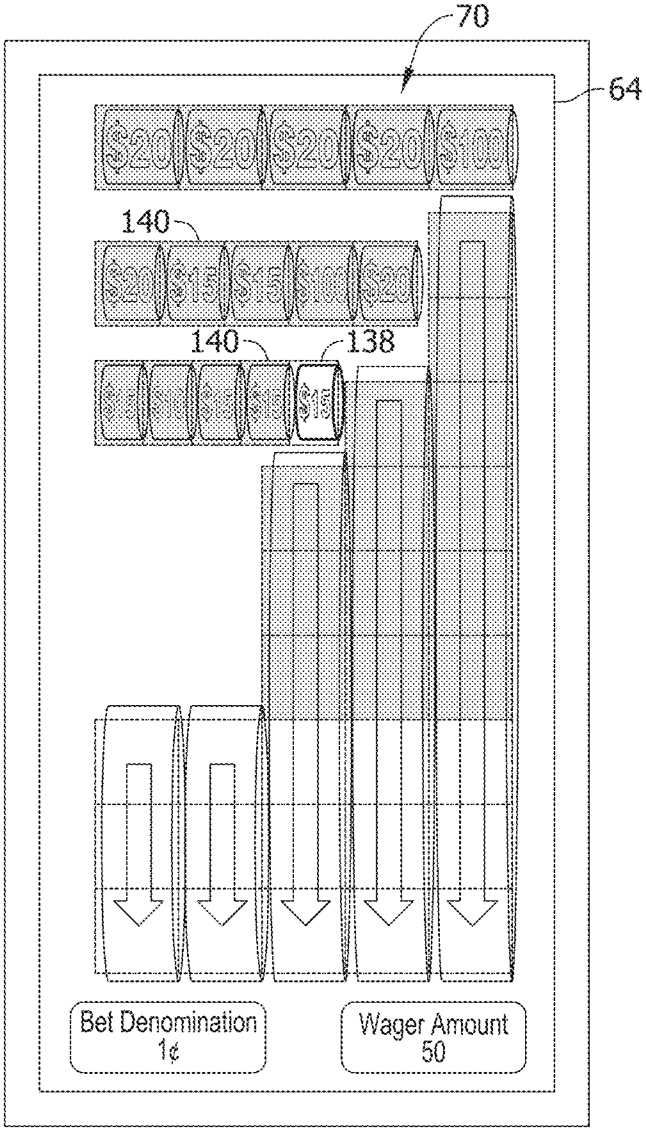
Figure 30B:
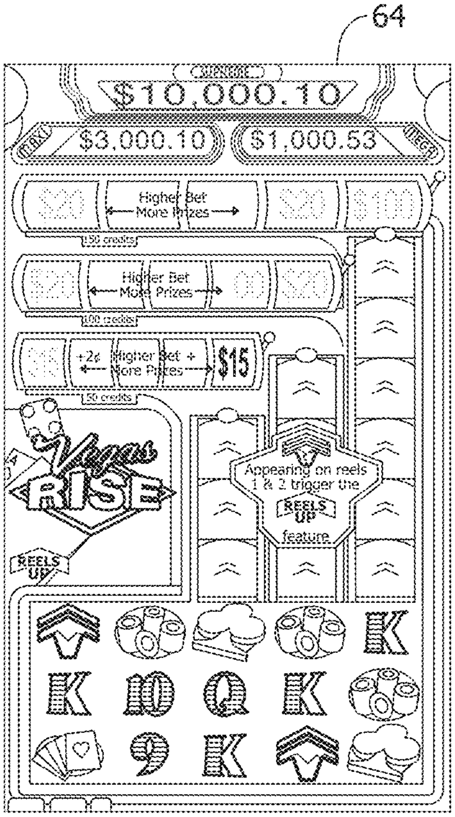
Figure 32A:
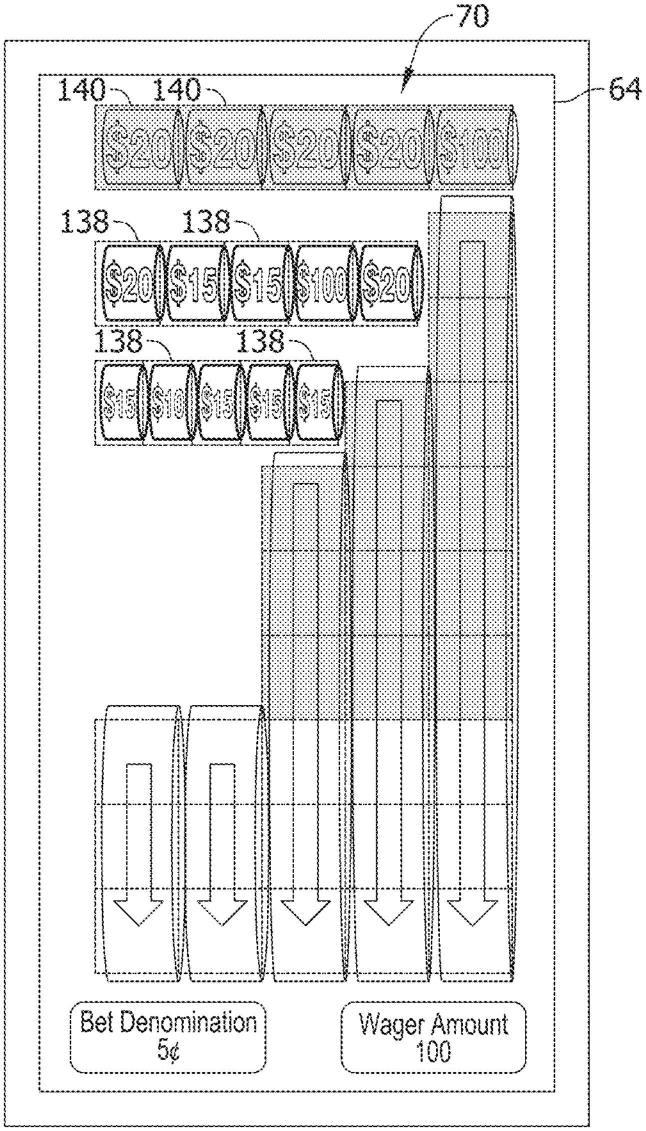
Figure 32B:
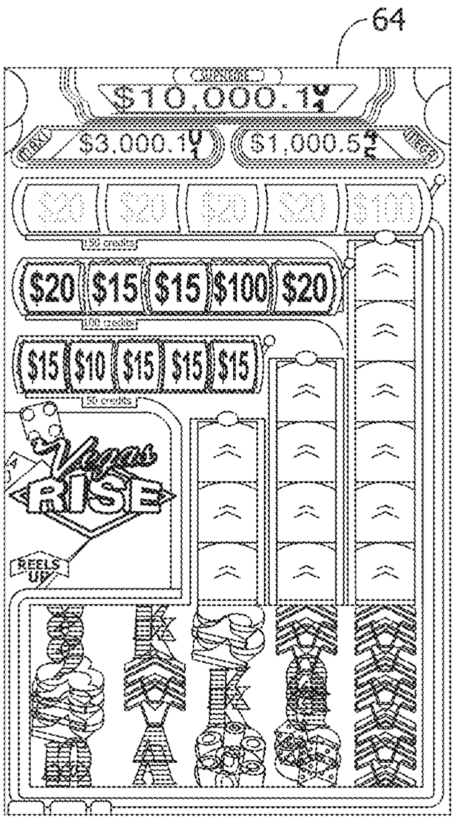
Figure 33A:
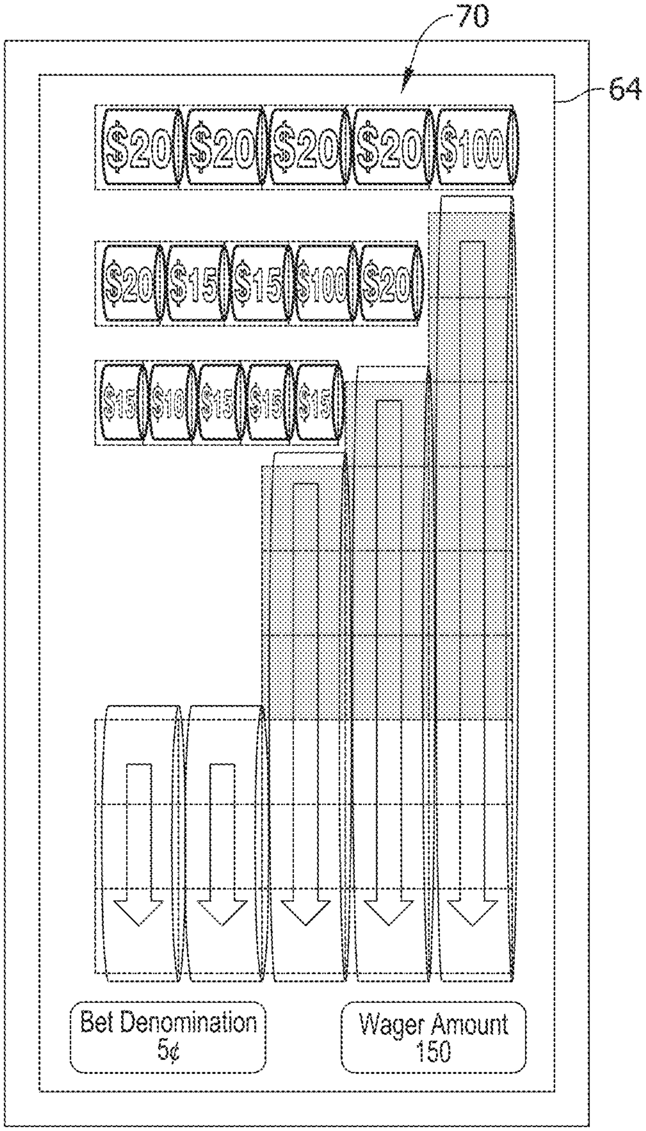
Figure 33B:
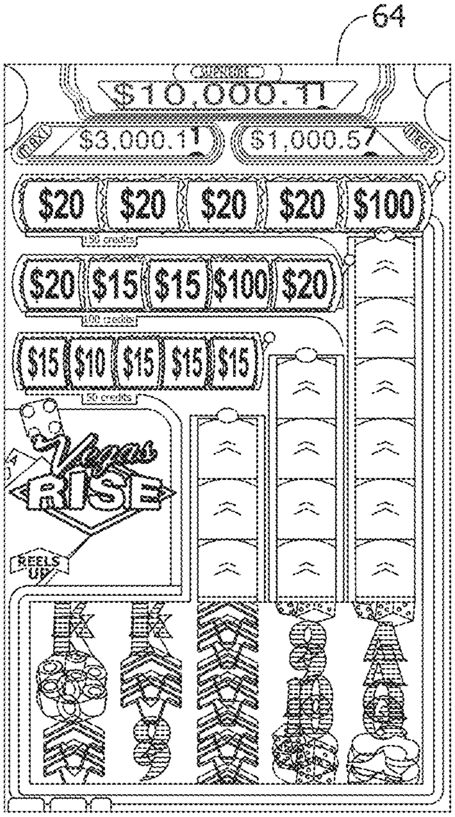

In the illustrated embodiment, the control unit 22 is programmed determine a wager amount of a wager being placed by the player on the primary game 68 and select the bonus prize cells 136 having wager amount values that are equal to or less than the wager amount of the received wager. The control unit 22 then operates each of the selected bonus prize cells 136 from an inactive bonus prize cell 140 to an active bonus prize cell 138. For example, as shown in FIGS. 30A-30B, in one embodiment, the control unit 22 may receive signal indicating a wager being placed on the primary game 68 that has a minimum wager amount 146. The control unit 22 then identifies and selects the minimum wager bonus prize cells 144 and operates each selected bonus prize cell 136 from an inactive bonus prize cell 140 to an active bonus prize cell 138. Similarly, as shown in FIGS. 32A-32B, upon receiving a signal indicating a wager being placed on the primary game 68 that has a medium wager amount 150, the control unit 22 identifies and selects the minimum wager bonus prize cells 144 and the medium wager bonus prize cells 148, and operates each selected bonus prize cell 136 from an inactive bonus prize cell 140 to an active bonus prize cell 138. Moreover, as shown in FIGS. 29 and 33A-33B, upon receiving a signal indicating a wager being placed on the primary game 68 that has a maximum wager amount 154, the control unit 22 identifies and selects the minimum wager bonus prize cells 144, the medium wager bonus prize cells 148, and the maximum wager bonus prize cells 152, and operates each selected bonus prize cell 136 from the an inactive bonus prize cell 140 to an active bonus prize cell 138.

In addition, the control unit 22 may also associate each bonus prize cell 136 with a bet denomination value associated with the primary game 68. For example, the control unit 22 may be programmed to display one or more minimum bet denomination bonus prize cells 156 having an associated bet denomination amount value equal to a minimum bet denomination (show in FIGS. 29 and 30A-30B) of the wager amount being placed on the primary game 68. In addition, the control unit 22 may be programmed to display one or more medium bet denomination bonus prize cells 158 having an associated bet denomination value equal to a medium bet denomination (shown in FIGS. 29 and 31A-31B) of the wager amount that may be bet on the primary game 68, and one or more maximum bet denomination bonus prize cells 160 having an associated bet denomination value equal to a maximum bet denomination (shown in FIGS. 29 and 32A-32B) of the wager amount that may be bet on the primary game 68. In the example illustrated in FIGS. 29-32B, the minimum, medium, and maximum bet denominations are $0.01/credit, $0.02/credit, and $0.05/credit, respectively, however, the minimum, medium, and maximum bet denomination are not limited to the denominations amounts shown, and may include any suitable denomination amount.

Figure 39A:
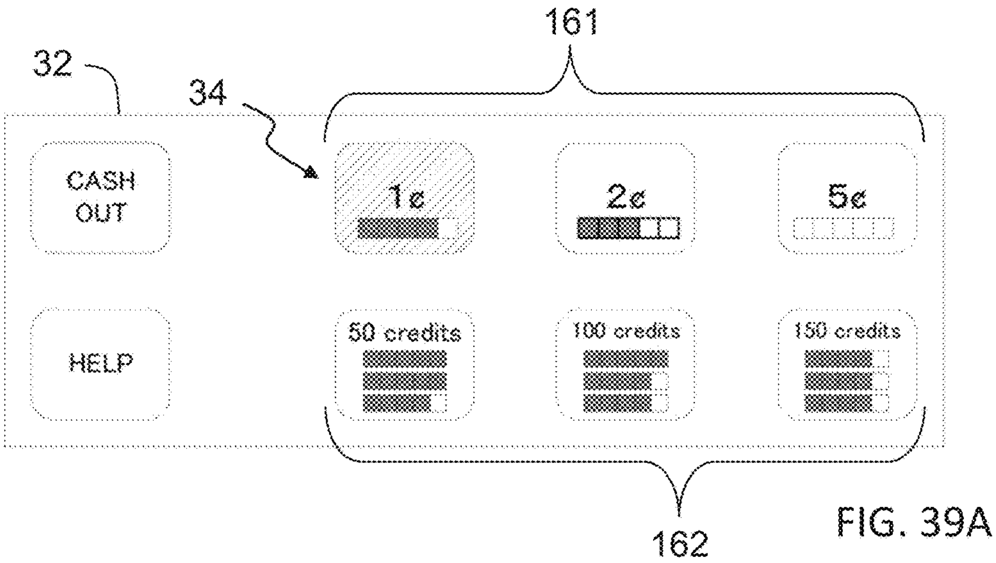
FIGS. 39A-39C are schematic illustrations of an operation unit that may be used with the gaming machine shown in FIGS. 1A-2, according to an embodiment of the present invention.
Figure 39B:
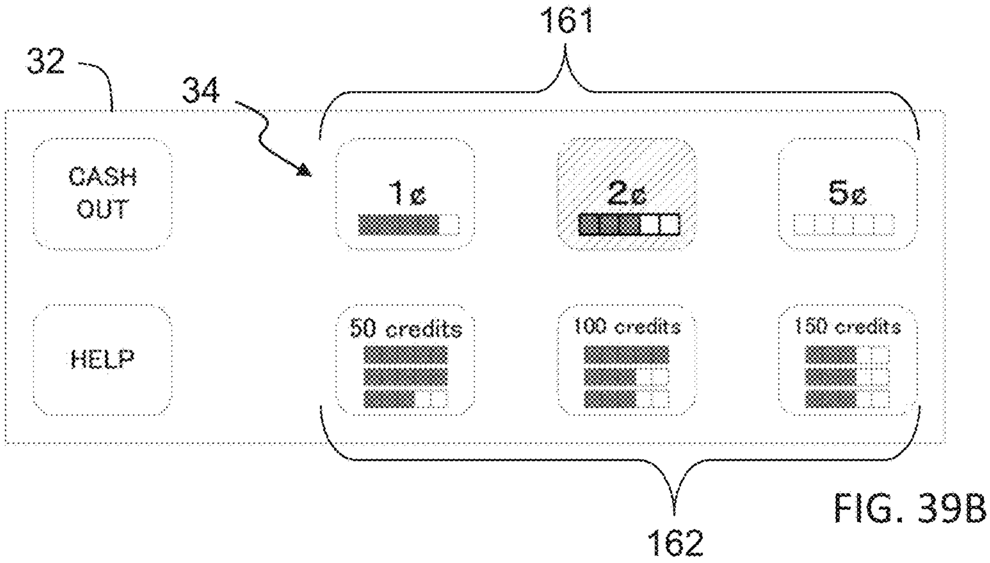
Figure 39C:
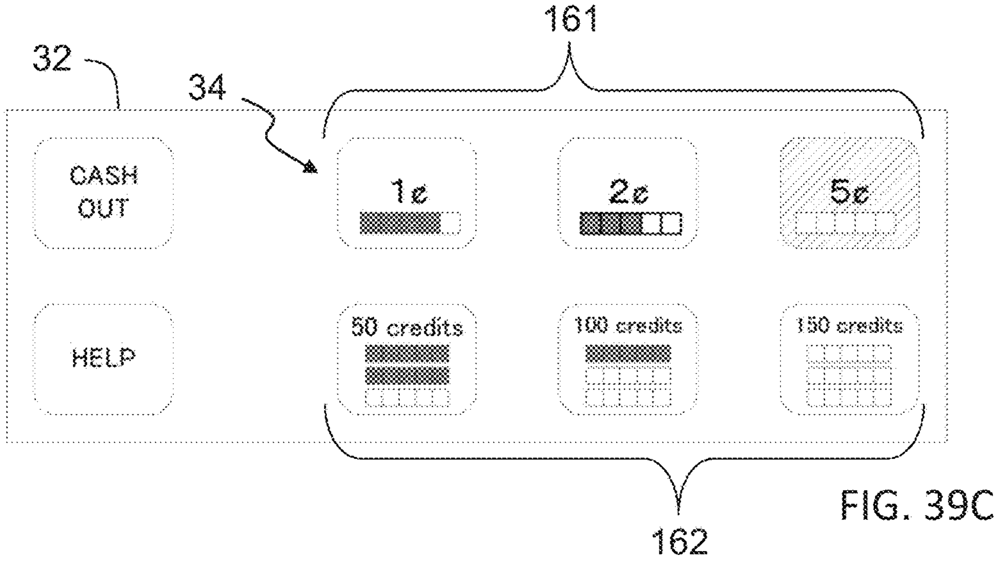
Figure 40A:
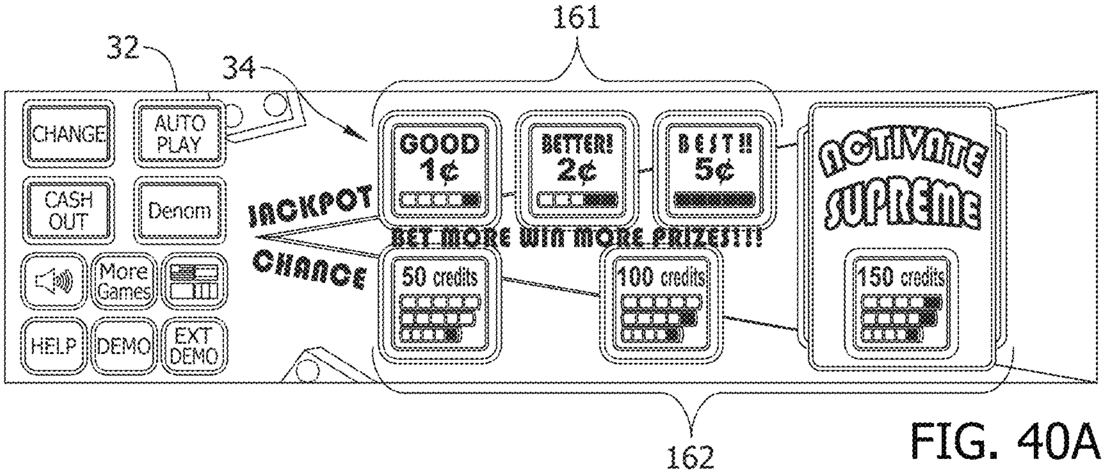
FIGS. 40A-40C are illustrations of graphical images that may be displayed on the operation unit shown in FIGS. 39A-39C, according to an embodiment of the present invention.
Figure 40B:
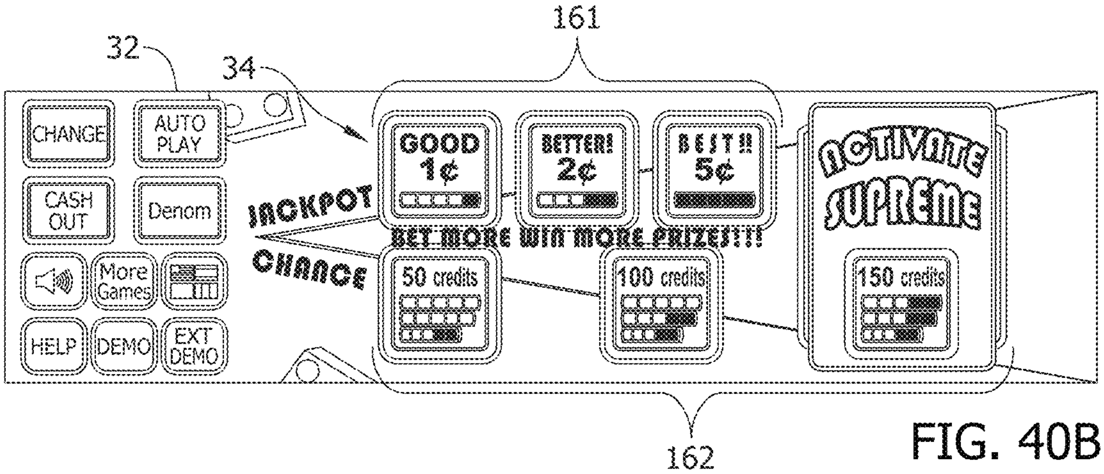
Figure 40C:
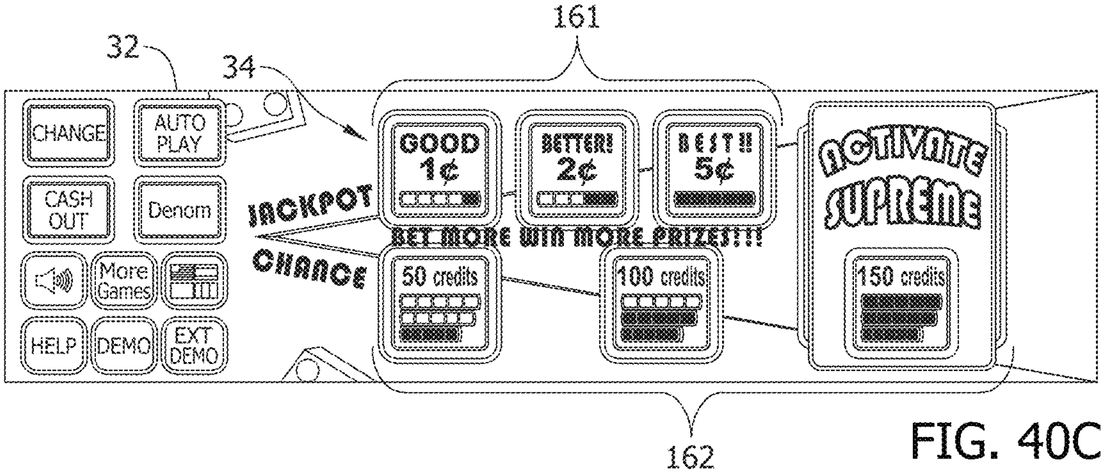

Referring to FIGS. 39A-40C, in one embodiment, a group of buttons 34 might be implemented on LCD panel with touch panel of the operation unit 32. In such a case, each denomination button and bet button might have a legend illustrating activated bonus reels upon selecting the button. The legends teach a player how the denomination and bet effect on the bonus reel activation visually and interactively. For example, in one embodiment, the game may include three denomination options [10, 20 and 50] at any game setting condition. The control unit 22 displays these denominations in plurality of denomination buttons 161 along a denomination row on the touch dash panel of the operation unit 32. The benefit of Higher denomination play is noticeable on the denomination buttons (1¢->1 prize reel; 2¢->2 prize reels; 5¢->5 prize reels). As the player presses a denomination button that increases the denomination and activates the prize reels above reels 3, 4 or 5. As the player presses a denomination button that decreases the denomination and deactivates the prize reel(s) above reels 3, 4 or 5. The game may also include has 3 bet level options [50, 100 and 150 credits]. The control unit 22 displays the bet level options in a plurality of bet level buttons 162 arranged along a bet level row. The benefit of higher bet play is noticeable on the bet level buttons (showing the images of the 3 top reels). Each bet level button is dynamic based on the denomination selected. For example, FIGS. 39A and 40A, illustrate a state of the operation unit touch panel with a 1¢ denomination was selected, with one bonus prize cell highlighted. FIGS. 39B and 40B, illustrate a state of the operation unit touch panel with a 2¢ denomination was selected, with two bonus prize cells highlighted. FIGS. 39C and 40C, illustrate a state of the operation unit touch panel with a 5¢ denomination was selected, with five bonus prize cells highlighted.

Figure 31A:
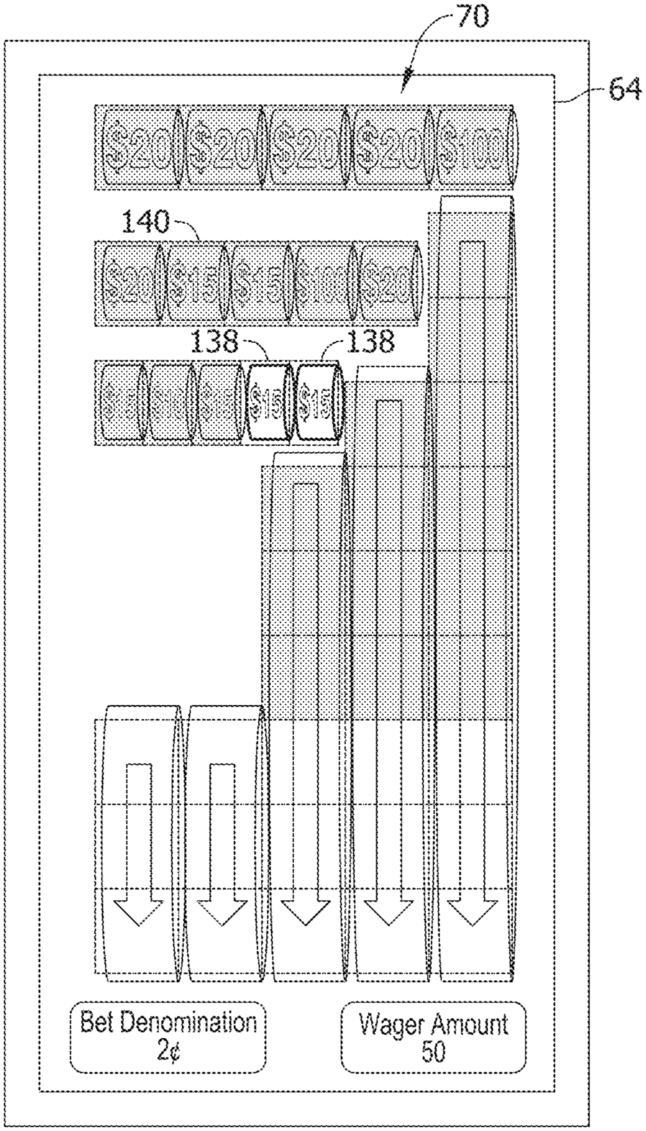
Figure 31B:
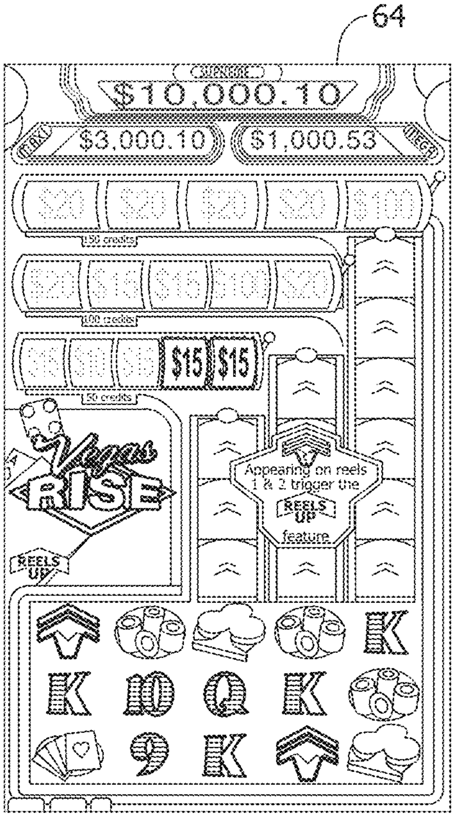

In the illustrated embodiment, the control unit 22 is programmed to determine a bet denomination associated with the wager being placed by the player on the primary game 68 and select the bonus prize cells 136 having bet denomination values that are equal to or less than the bet denomination of the received wager. The control unit 22 then operates each of the selected bonus prize cells 136 from an inactive bonus prize cell 140 to an active bonus prize cell 138. For example, as shown in FIGS. 30A-30B, in one embodiment, the control unit 22 may receive signal indicating a wager being placed on the primary game 68 that has a minimum bet denomination. The control unit 22 then identifies and selects the minimum bet denomination bonus prize cells 156 and operates each selected bonus prize cell 136 from an inactive bonus prize cell 140 to an active bonus prize cell 138. Similarly, as shown in FIGS. 31A-31B, upon receiving a signal indicating a wager being placed on the primary game 68 that has a medium bet denomination, the control unit 22 identifies and selects the minimum bet denomination bonus prize cells 156 and the medium bet denomination bonus prize cells 158, and operates each selected bonus prize cell 136 from an inactive bonus prize cell 140 to an active bonus prize cell 138. Moreover, as shown in FIGS. 32A-32B, upon receiving a signal indicating a wager being placed on the primary game 68 that has a maximum bet denomination, the control unit 22 identifies and selects the minimum bet denomination bonus prize cells 156, the medium bet denomination bonus prize cells 158, and the maximum bet denomination bonus prize cells 160, and operates each selected bonus prize cell 136 from an inactive bonus prize cell 140 to an active bonus prize cell 138.

In one embodiment, the control unit 22 may be programmed to access a prize cell selection logic table 163 (shown in FIG. 17) stored in memory 42 for use in selecting bonus prize cells 136 based on the bet denomination and/or wager amount of a received wager. As shown in FIG. 17, the prize cell selection logic table 163 includes a matrix of logic cells 164 that instructions for operating a corresponding bonus prize cell 136 as an active bonus prize cell 138 ("ACTIVE") and as an inactive bonus prize cell 140 ("INACTIVE"). Upon receiving a signal indicating a wager being placed on the primary game 68, the control unit 22 determines a bet denomination and wager amount of the received wager, accesses the prize cell selection logic table 163, and operates each bonus prize cell 136 based on the instructions included in the logic cells 164 associated with the determined bet denomination and the determined wager amount.

Referring to FIGS. 3A-3B, in the illustrated embodiment, the control unit 22 associates each bonus prize cell 136 with a corresponding bonus reel column 98. For example, the control unit 22 may be programmed to associate the first group 144 of bonus prize cells 136 with the first bonus reel column 100, associated the second group 148 of bonus prize cells 136 with the second bonus reel column 102, and associate the third group 152 of bonus prize cells 136 with the third bonus reel column 104. The control unit 22 is programmed to initiate the bonus feature event 70 upon detecting a bonus event trigger condition occurring in the outcome of the primary game 68. For example, in one embodiment, the control unit 22 is programmed to initiate the bonus feature event 70 upon detecting each modifiable cell 82 that is associated with the corresponding bonus reel column 98 being operated in the reveal mode 108. During the bonus feature event 70, the control unit 22 is programmed to randomly select a bonus prize for each active bonus prize cell 138 that is associated with the bonus event trigger condition. For example, upon detecting the bonus event trigger condition occurring in the first bonus reel column 100, i.e. each modifiable cell 82 of the first bonus reel column 100 being operated in the reveal mode 108, the control unit 22 randomly selects a bonus prize for each active bonus prize cell 138 included in the first group 144 of bonus prize cells 136 and displays the randomly selected bonus prize in each active bonus prize cell 138. Similarly, upon detecting the bonus event trigger condition occurring in the second bonus reel column 102, the control unit 22 randomly selects and displays a bonus prize in each active bonus prize cell 138 included in the second group 148 of bonus prize cells 136, and upon detecting the bonus event trigger condition occurring in the third bonus reel column 104, the control unit 22 randomly selects and displays a bonus prize in each active bonus prize cell 138 included in the third group 152 of bonus prize cells 136.

In the illustrated embodiment, the control unit 22 is programmed to generate a plurality of bonus prize reels 166 for use in randomly selecting a bonus prize for each active bonus prize cell 138. For example, the control unit 22 may generate a plurality of independent unisymbol reels 168 for use during the bonus feature event 70. Each unisymbol reel 168 is displayed in a corresponding bonus prize cell 136 and is configured to display a single prize symbol 142 when the corresponding independent unisymbol reel 168 is in a stopped position. In one embodiment, upon initiating the bonus feature event 70, the control unit generates an independent uni symbol reel 168 for each active bonus prize cell 138 that is included in the bonus feature event 70.

The control unit 22 generates each independent unisymbol reel 168 using a unisymbol reel strip data file 170 (shown in FIG. 14) and a plurality of bonus feature prize symbol weight tables 172 (shown in FIGS. 16A-16D). The unisymbol reel strip data file 170 includes a plurality of unisymbol reel strips including a first unisymbol reel strip 174, "Reel Strip A" that is associated with the first group 144 of bonus prize cells 136, a second unisymbol reel strip 176, "Reel Strip B", that is associated with the second group 148 of bonus prize cells 136, and a third unisymbol reel strip 178, "Reel Strip C", that is associated with the third group 152 of bonus prize cells 136. In one embodiment, the unisymbol reel strip data file 170 may also include a jackpot unisymbol reel strip 180, "Reel Strip D", that may be associated with one or more predefined bonus prize cells 136 that are included in the third group 152 of bonus prize cells 136. Each unisymbol reel strip 174-180 includes a plurality of sequential symbol position logic cells 182 that includes instructions for rendering the unisymbol reels with a plurality of prize symbols. Each sequential symbol position logic cell 182 is associated with a symbol position that is configured to be populated by symbols that are selected from a prize symbol image data file 184 stored in memory 42. The unisymbol reel strips 174-180 also include reel stop positions 130 associated with each symbol position.

In the illustrated embodiment, the unisymbol reel strips 174-180 include a plurality of prize symbol positions 186, "PRIZE". Each prize symbol position 186 is populated with symbols that are randomly selected from a group of prize symbols 142 based on prize symbol weights that are included in the bonus feature prize symbol weight tables 172. In addition, the unisymbol reel strips 174-180 may also include a plurality of progressive award symbol positions 188, "MAXI", "MEGA", "MINI", that displays symbols associated with various progressive awards 190 (shown in FIG. 19). In addition, the jackpot unisymbol reel strip 180 may also include a jackpot symbol position 192, "SUPREME", that displays a symbol associated with a jackpot award 194 (shown in FIG. 19). The symbol positions are arranged in a predefined order defined by each unisymbol reel strip 174-180. In the illustrated embodiment, one or more unisymbol reel strips 174-180 include a different number of symbol positions. In other embodiments, each unisymbol reel strip 174-180 includes the same number of symbol positions.

In the illustrated embodiment, the control unit 22 is programmed to randomly select prize symbols 142 using random numbers and the bonus feature prize symbol weight tables 172 and populate the symbol positions of the corresponding unisymbol reel strip with the randomly selected prize symbols 142. In one embodiment, the control unit 22 is programmed to use a different bonus feature prize symbol weight table for each of the unisymbol reel strips 174-180, with each weight table including one or more different weighted values. For example, the bonus feature prize symbol weight tables may include weight table associated with the third unisymbol reel strip 178 that has larger weights assigned to higher valued prize symbols than the bonus feature prize symbol weight tables associated with the first unisymbol reel strip 174. In one embodiments, the control unit 22 may be programmed to use the same weight table for each unisymbol reel strip. In addition, in another embodiment, each unisymbol reel strip is populated with predefined prize symbols 142 arranged in a predefined sequential order.

During the bonus feature event 70, the control unit 22 is programmed to randomly select a bonus prize for each independent unisymbol reel 168 being displayed in an active bonus prize cell 138 by randomly selecting a stop position of a corresponding independent unisymbol reel 168 using random numbers and a reel stop position data file 195 (shown in FIG. 21) stored in the memory device. The control unit 22 then sequentially spins and stops each independent unisymbol reel 168 to display a corresponding bonus prize, and provides a bonus feature award based on a value associated with each randomly selected bonus prize.

Figure 26A:
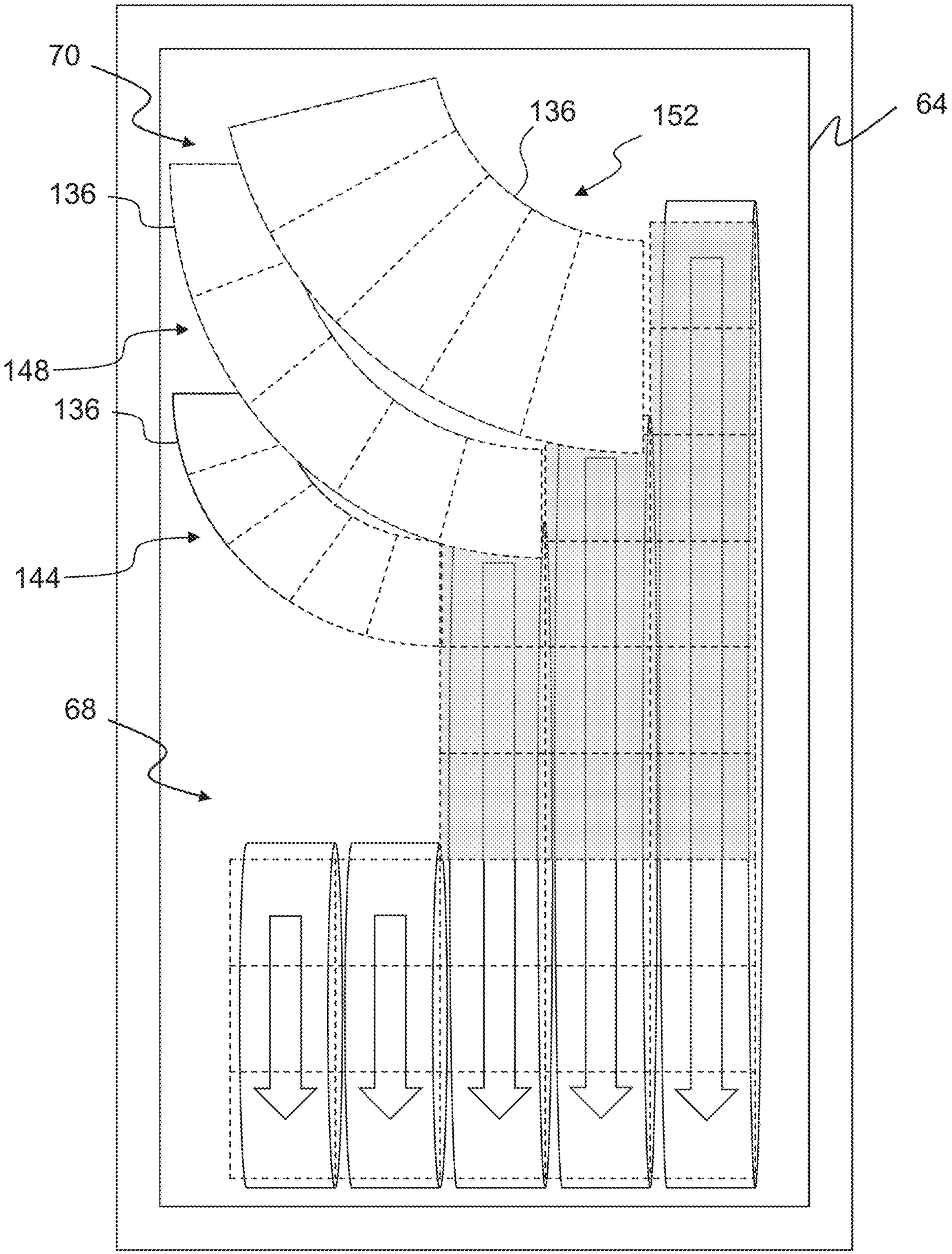
Figure 26B:
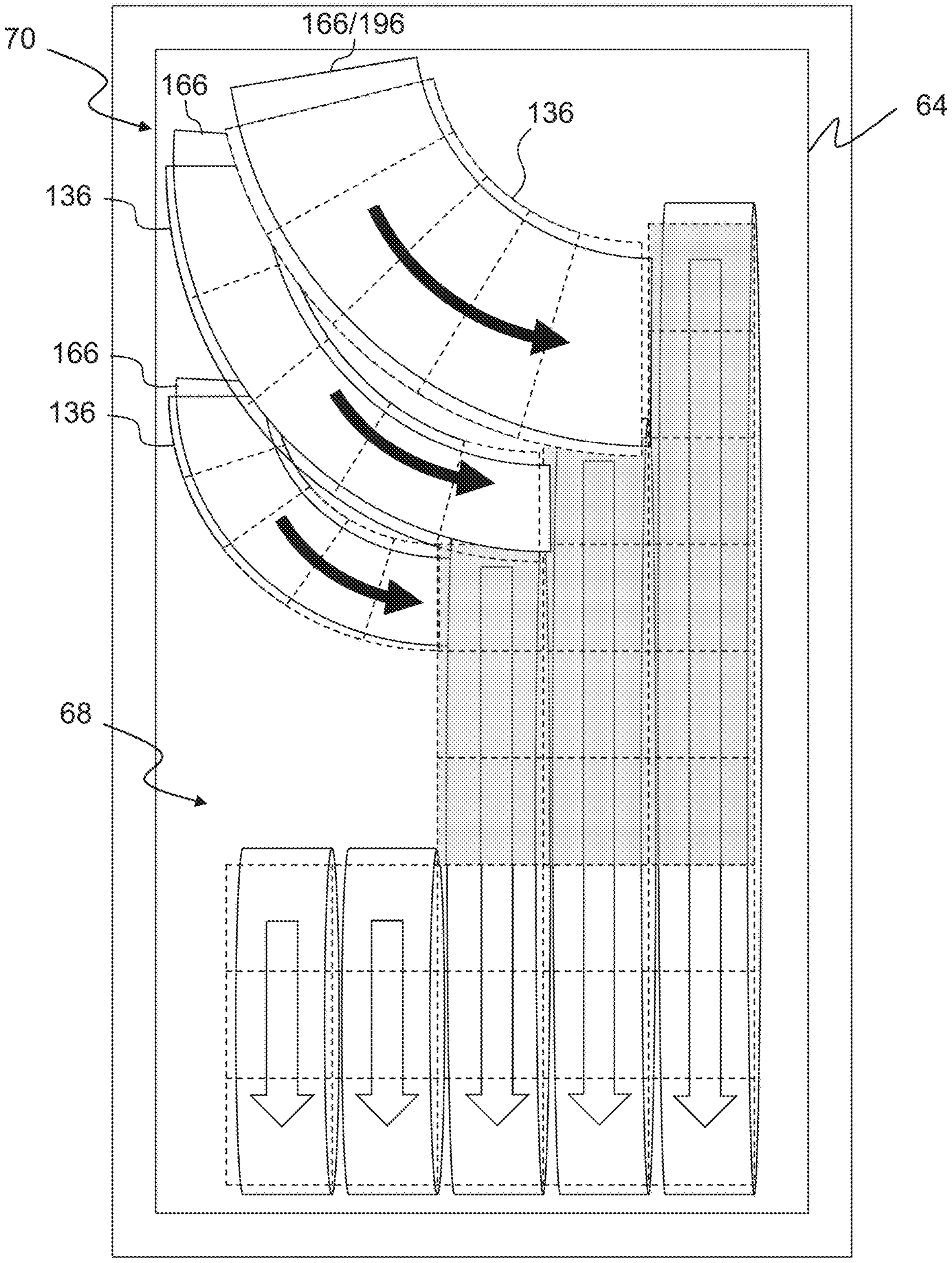
Figure 27:
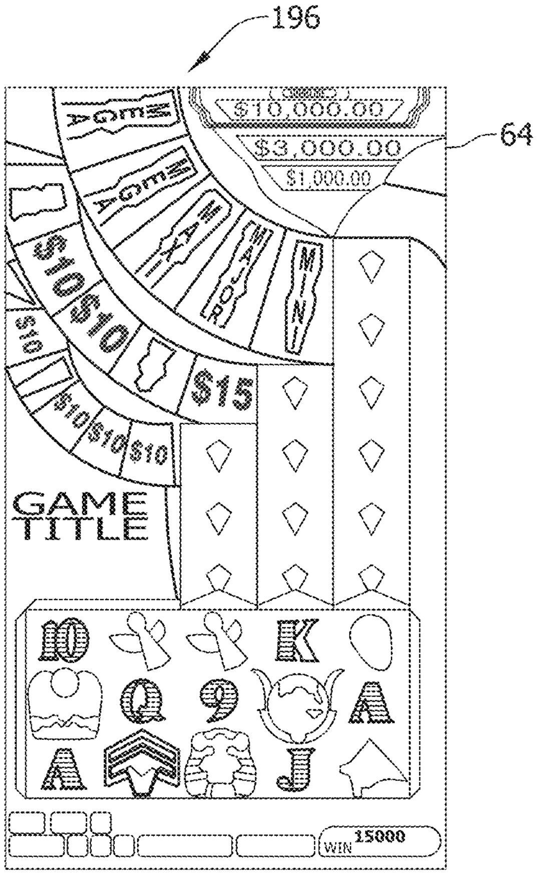
Figure 28:
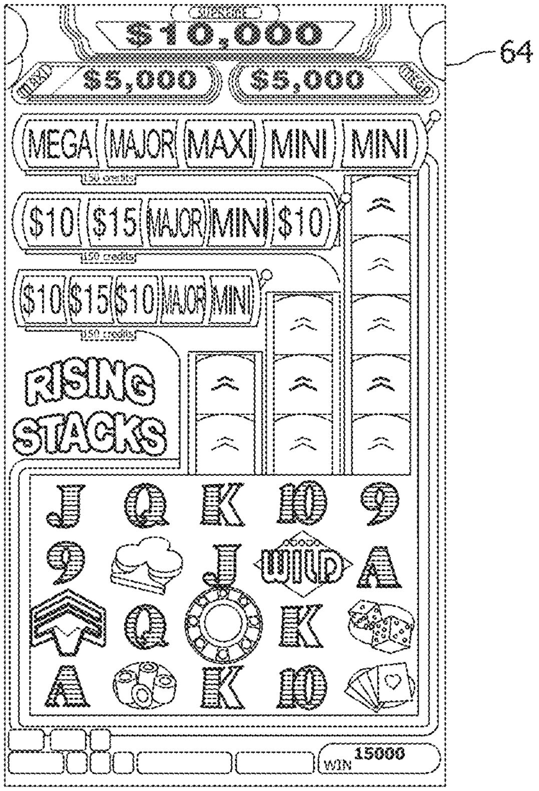

Referring to FIGS. 26A-26B, in one embodiment, the control unit 22 may be programmed to generate and display a plurality of bonus prize wheels 196 that are displayed with each group of bonus prize cells 136. Each bonus prize wheel 196 is associated with a bonus reel column 98 and may be generated using the unisymbol reel strips 174-180 and populated with prize symbols 142. Similar to the rendered to display the independent unisymbol reels 168, during the bonus feature event 70, the control unit 22 is programmed to randomly select a bonus prize for each active bonus prize cell 138 by randomly selecting a stop position of the corresponding bonus prize wheel 196 using random numbers a reel stop position data file 195. The control unit 22 then spins and stops the bonus prize wheel 196 to display the selected prize symbol 142 in each of the active bonus prize cells 136.

Figure 25A:
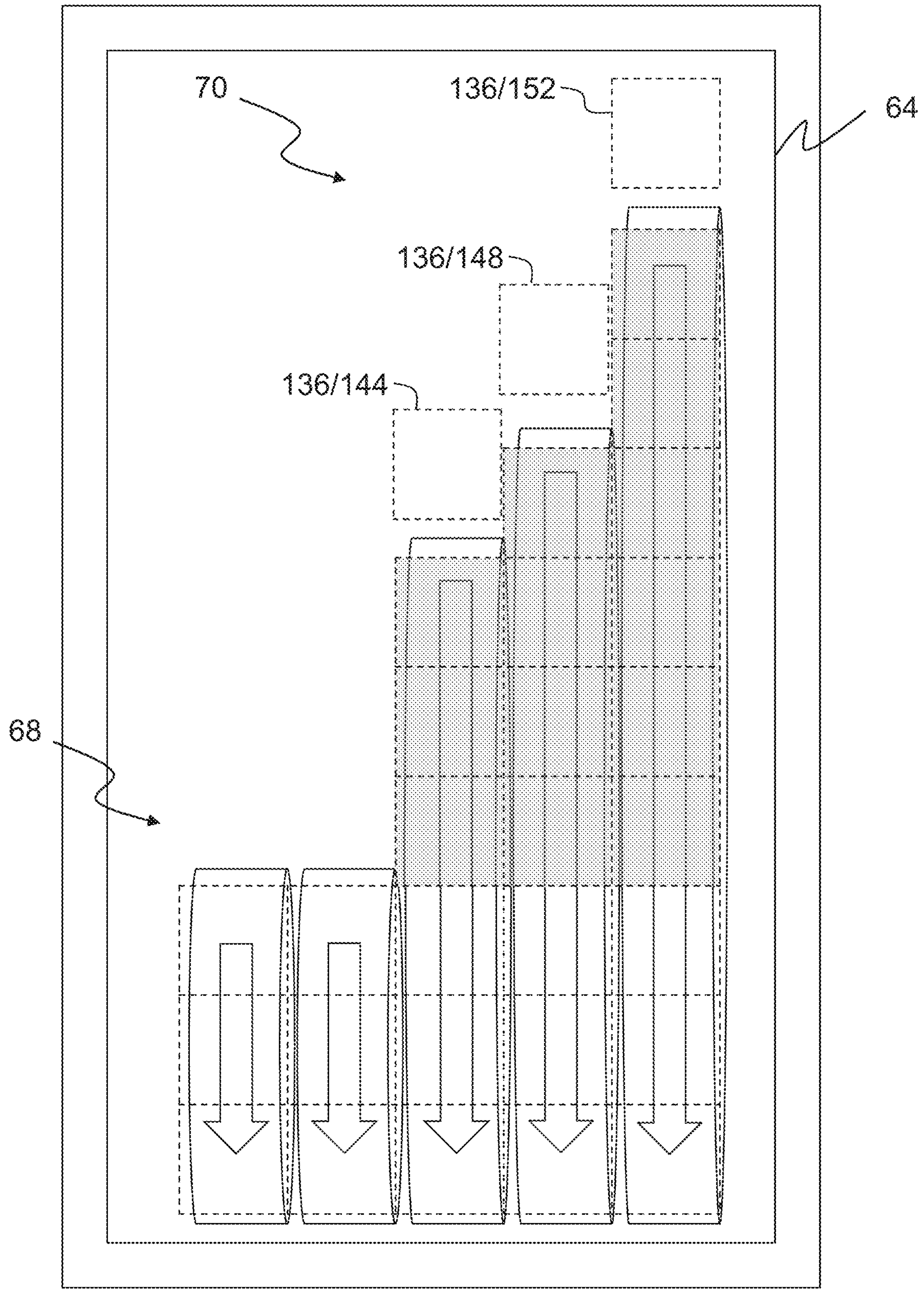
Figure 25B:
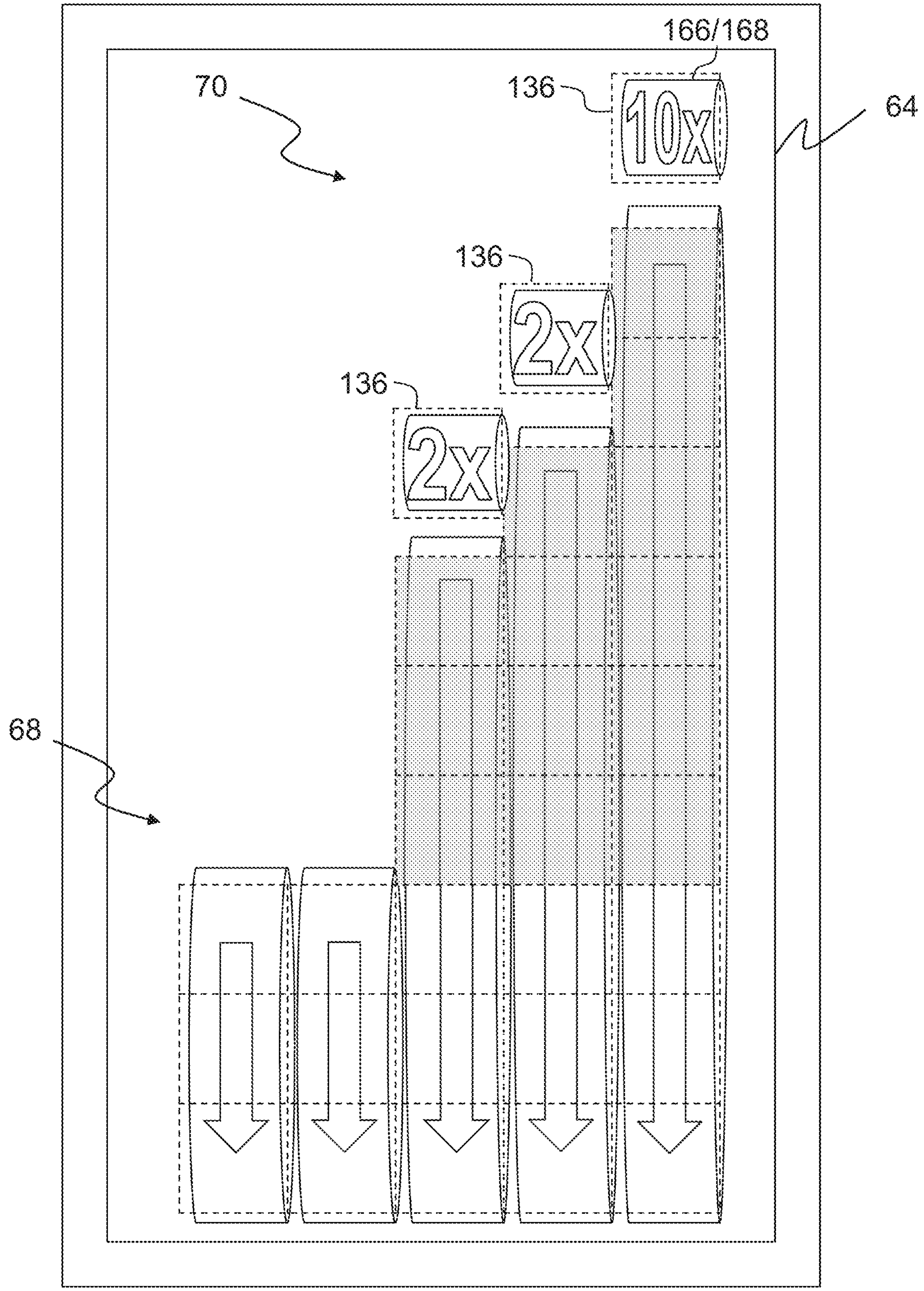

Referring to FIGS. 25A-25B, in another embodiment, the control unit 22 may associate one bonus prize cell 136 with each bonus reel column 98. In addition, the control unit 22 may use a multiplier reel strip layout file 197 (shown in FIG. 15) that includes unisymbol reel strips having a plurality of credit award multiplier values in each symbol position. One or more unisymbol reels strips included in the multiplier reel strip layout file 197 may also include one or more prize symbol positions 186, "PRIZE".

In general, the control unit 22 starts an instance of the primary game 68 and determines the stop position of each primary game reels 84 to 92 randomly using random numbers and the reel stop position data file 195 (shown in FIG. 21) stored in the memory device. The primary game reels 84 to 92 that are displayed in the display unit 24 are moved from a current position, and stopped based on a stop position to express an outcome of the primary game. Due to this, in the display or grid 76, the symbols included on the primary game reels 84 to 92 are continuously moved (scrolled or spun) in a vertical direction of the display area 64, and one symbol of one cell is aligned in an order of the symbol based on the symbol arrangement is stopped so that it is displayed.

The control unit 22 changes and stops the plurality of symbols displayed on the display unit 24 according to the operation of the player received by the operation unit 32, and a payout may be paid according to the stopped symbols inside the display area 64 and a pay line set 198 and paytable data file 199 (show in FIGS. 22-23) stored in the memory device.

In the display area 64, a pay line is set that is used when winning is determined. The pay line is set to be extended over the column on the right end from the cells of the column of the left end, and is a line that combines the plurality of cells determining a win. The number of effective lines within the set pay line is selected by the operation of a group of line designation buttons included in the group of setting buttons 34 of the operation unit 32 for the player. The control unit 22, in regards to the result of a game that is a combination of symbols, determines a win when a predetermined number of identical symbols is surpassed and aligned on a set pay line, and pays a payout to the player according to the type and number of symbols. On the gaming machine 10 of the present embodiment, a predetermined number of pay lines (LINE 1-40) of cells with three rows and five columns in the display area 64 is set (see FIGS. 3A-3B). The system for determining a win may determine a win when a predetermined number of identical symbols from cells of the column on the left end are aligned on a set pay line, may determine a win when a predetermined number of identical symbols from cells of the column on the right end are aligned on a set pay line, and may determine a win when a predetermined number of identical symbols are aligned on a continuous column on a predetermined pay line.

Figure 22:
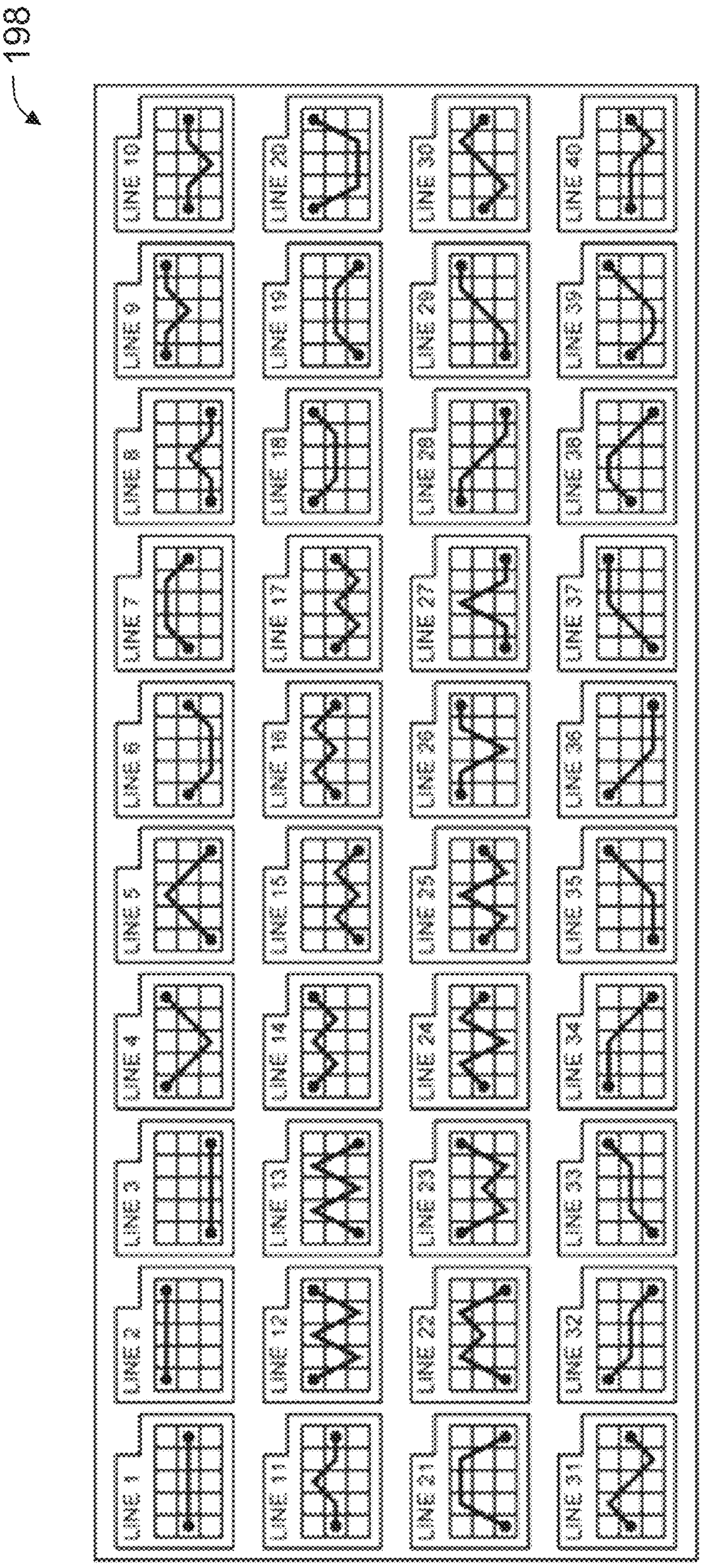
FIG. 22 is an illustration showing one example of a pay line set on the determination area of the game illustrated in FIGS. 3A-3B.
Figure 24A:
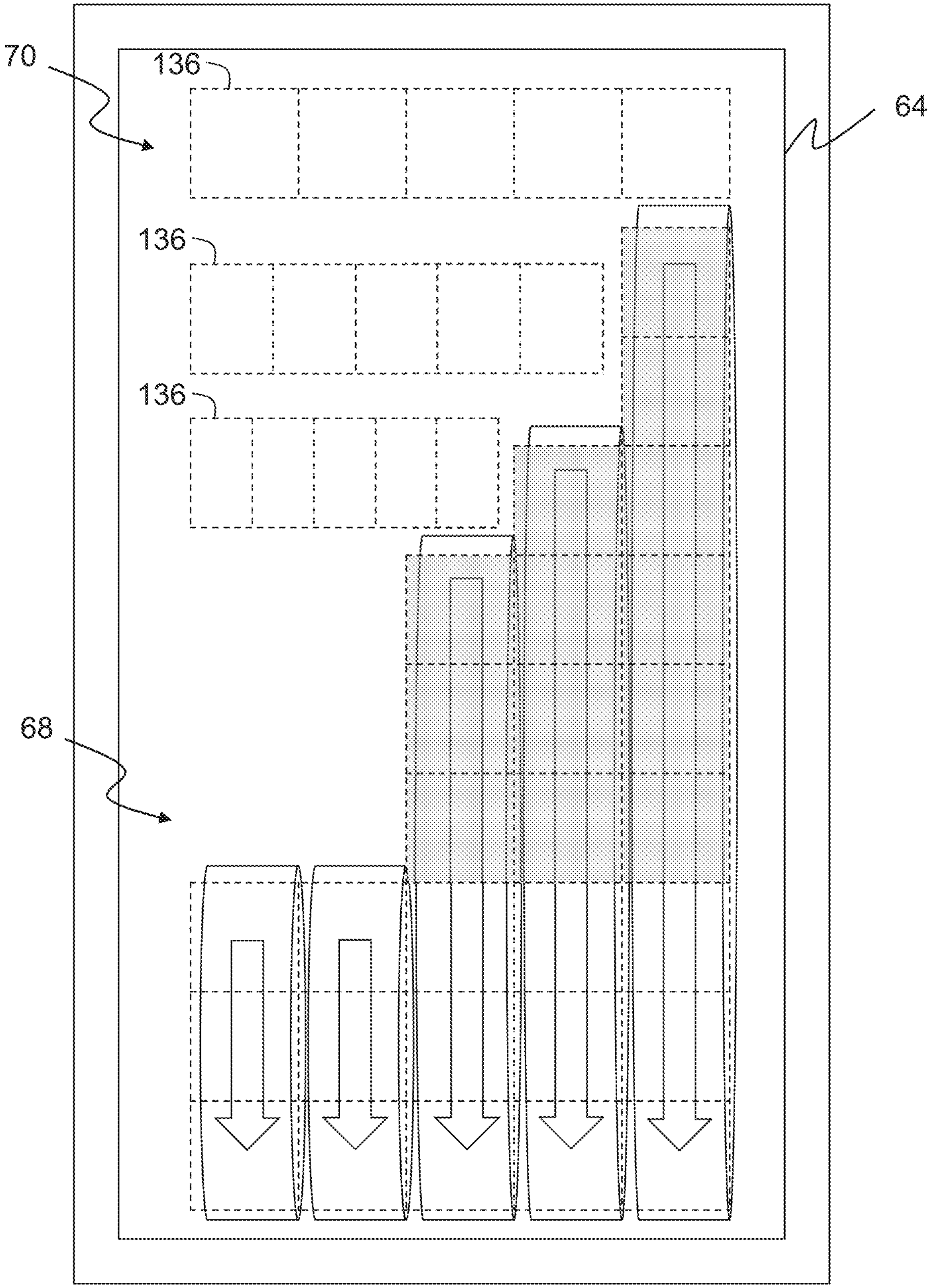
FIGS. 24A-33B are additional illustrations of the game shown in FIGS. 3A-3B, according to various embodiments of the present invention.
Figure 24B:
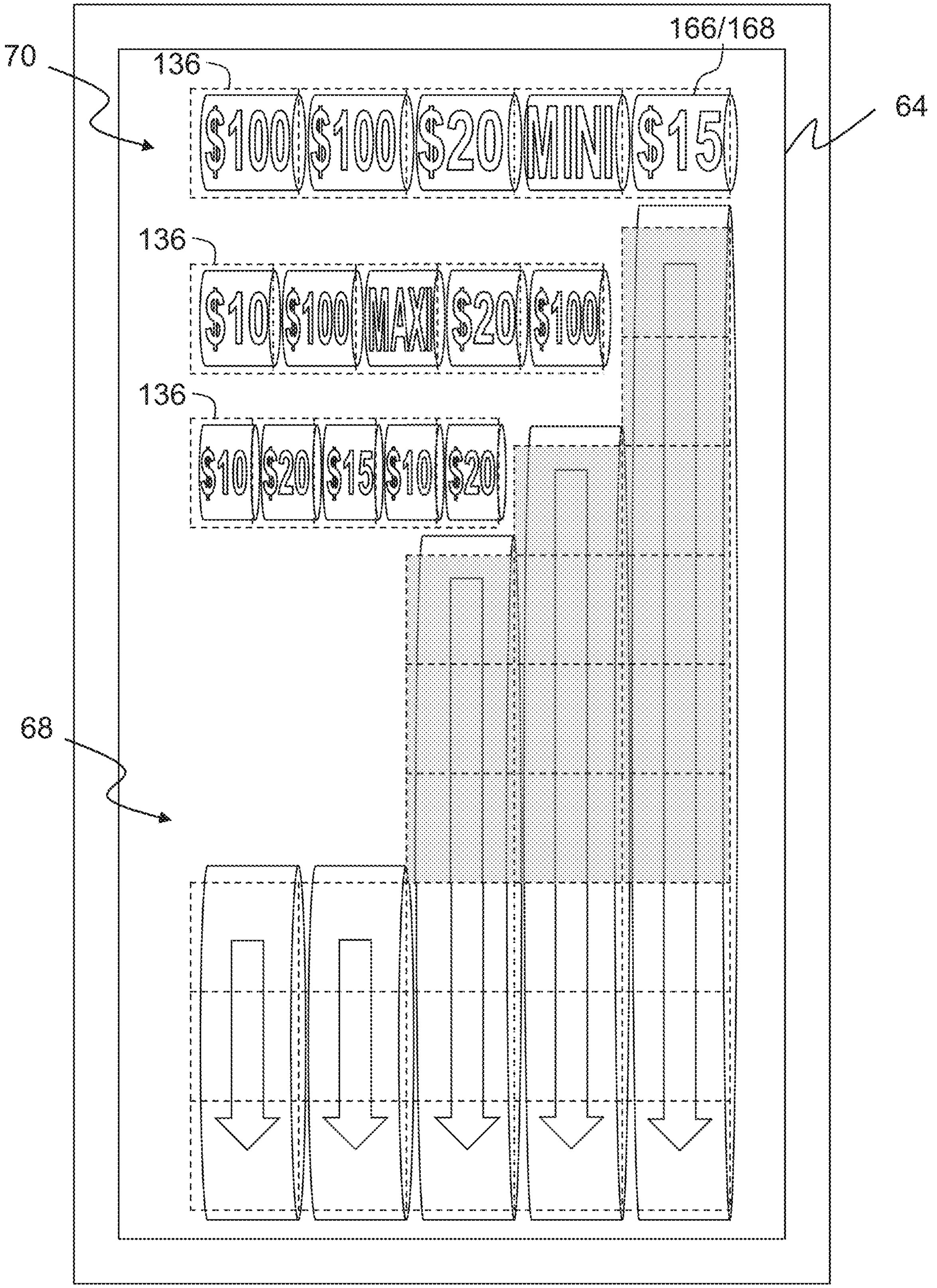

It should be noted that pay lines shown other than (or in addition to) the pay lines shown in FIG. 22 may be used. In general, the pay lines shown in FIG. 22 start in the first column and end in the last column, and include one cell per column. However, one or more pay lines could include one or more cells in the same column and may include a vertical pay line.

During the primary game 68, the control unit 22 is programmed to stop each primary game reel 84-92 in sequential order beginning with the 1$^{st}$ reel 84 to the 5$^{th}$ reel 92. As each primary game reel 84-92 is stopped, the control unit 22 is programmed to test for the occurrence of a reveal trigger condition. In the illustrated embodiment, the control unit 22 is programmed to detect a reveal trigger condition when one or more special symbols 134 is displayed by a primary game reel 84-92 with the primary game reel 84-92 in a stopped position. In addition, the control unit 22 is programmed to detect the reveal trigger condition associated with a corresponding bonus reel column 98 when the special symbol 134 appears in one or more primary game reels 84 to 92 that are adjacent to the corresponding bonus reel column with the adjacent primary game reel 84-92 in a stopped position. For example, in one embodiment, the control unit 22 is programmed to detect the reveal trigger condition associated with the first bonus reel column 100 when a special symbol 134 appears on the 1$^{st}$ primary game reel 84 and the 2$^{nd}$ primary game reel 86. Similarly, the control unit 22 is programmed to detect the reveal trigger condition associated with the second bonus reel column 102 when a special symbol 134 appears on the 3$^{rd}$ primary game reel 88, and detects the reveal trigger condition associated with the third bonus reel column 104 when a special symbol 134 appears on the 4$^{th}$ primary game reel 90.

Upon detecting the occurrence of a reveal trigger condition associated with a corresponding bonus reel column 98, the control unit 22 is programmed to randomly select a number of modifiable cells 82, and operate each of the modifiable cells 82 included in the randomly selected number of modifiable cells 82 to the reveal mode 108. For example, in one embodiment, the control unit 22 may access the symbol cell selection weight tables 191 (shown in FIG. 20) that includes selection probabilities and/or weighted number ranges associated with a different numbers of cells, retrieve one or more random numbers and randomly select a number of modifiable cells 82 using the symbol cell selection weight tables 191 and the random numbers. In addition, as shown in FIGS. 34A-35D, the control unit 22 sequentially transitions each of the modifiable cells 82 included in the randomly selected number of modifiable cells 82 from the hidden mode 106 to the reveal mode 108 beginning with the modifiable cell 82 adjacent to a primary cell 80. The control unit 22 also displays the transition from the hidden mode 106 to the reveal mode 108 as the underlying primary game reel 84-92 is spinning.

When each primary game reel 84-92 has been stopped, the control unit 22 tests for the occurrence of the bonus event trigger condition in each of the bonus reel columns 98. Upon detecting the occurrence of the bonus event trigger condition in a corresponding bonus reel column 98, i.e. each of the corresponding modifiable cells 82 being operated in the reveal mode 108, the control unit 22 imitates the bonus feature event 70 associated with the corresponding bonus reel column 98, and randomly select a bonus prize for each active bonus prize cell 138 that is associated with the corresponding bonus reel column 98.

Figure 5:
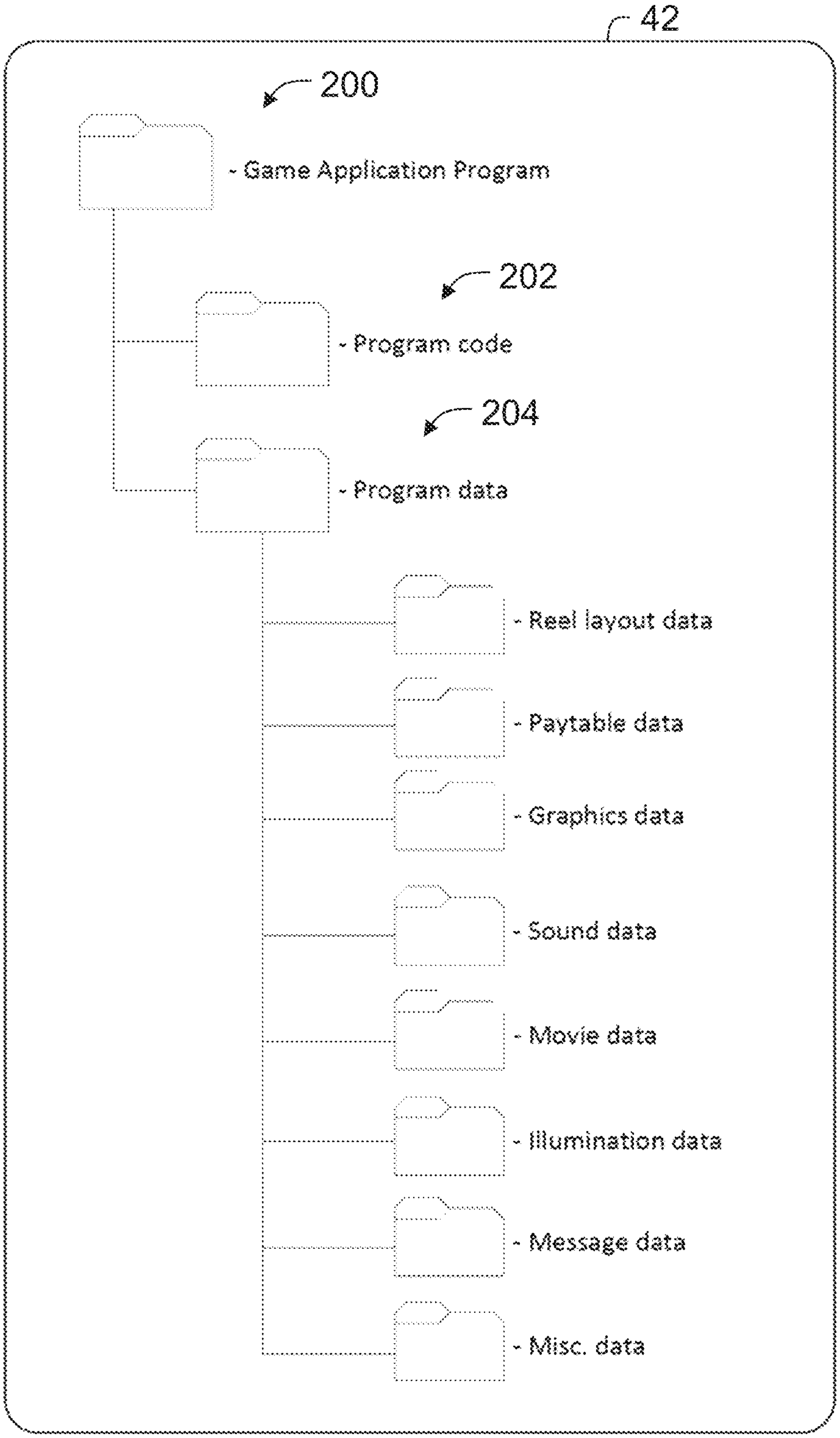
FIGS. 5-8 are block diagrams of a game control unit that may be used with to perform the function of executing a game on the gaming machine shown in FIGS. 1A-2.
Figure 6:
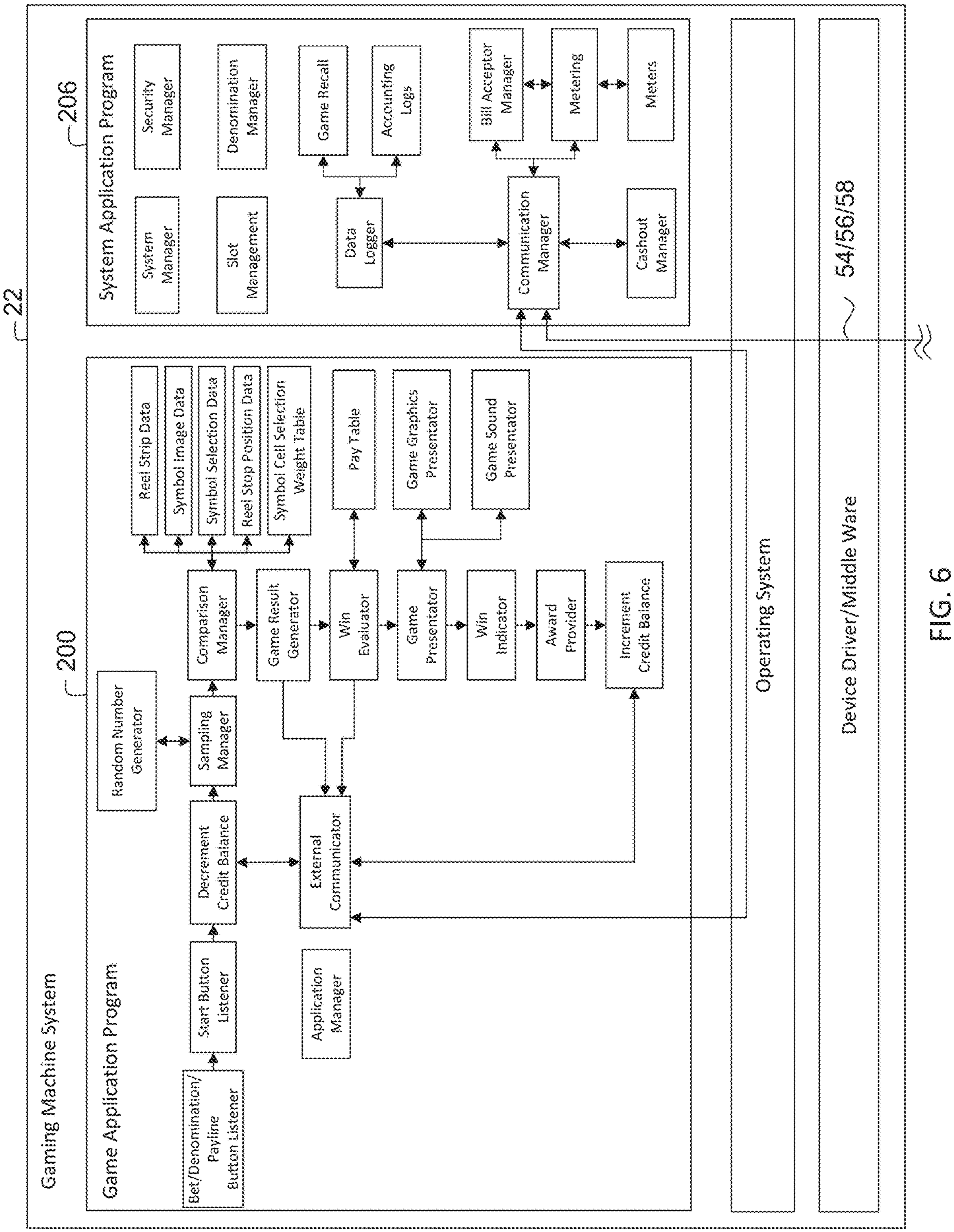
Figure 7:
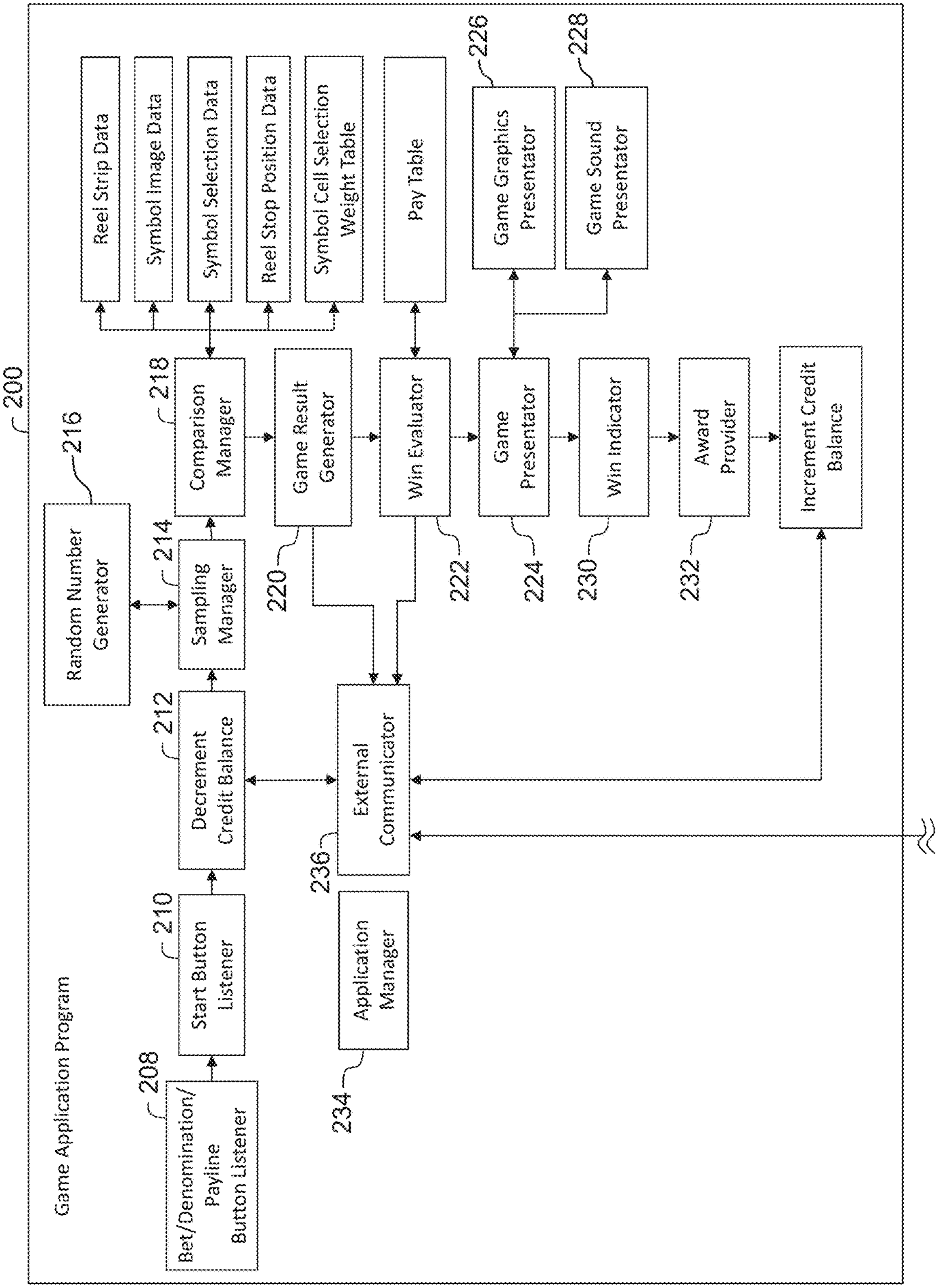
Figure 8:
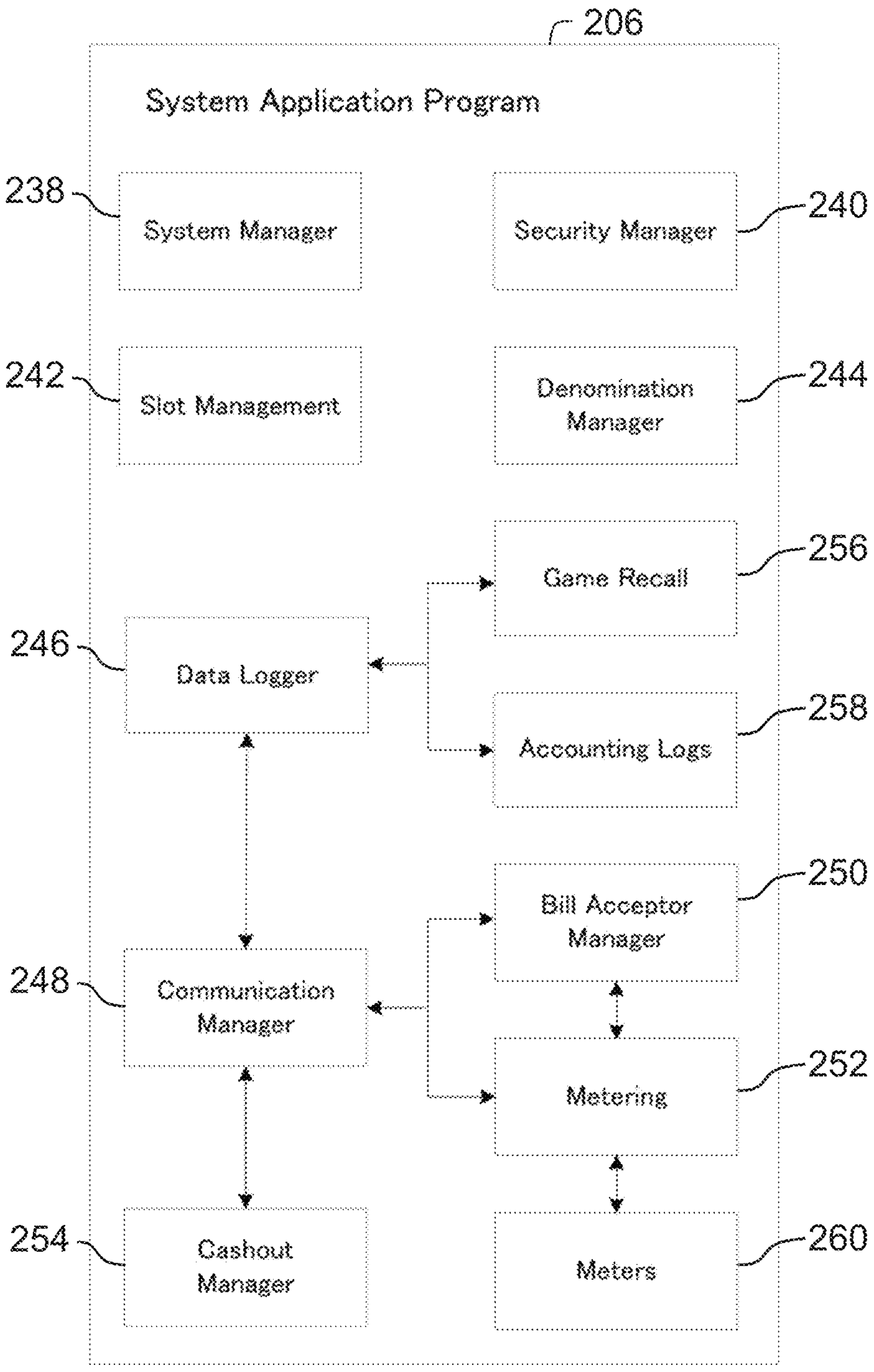
Figure 11A:
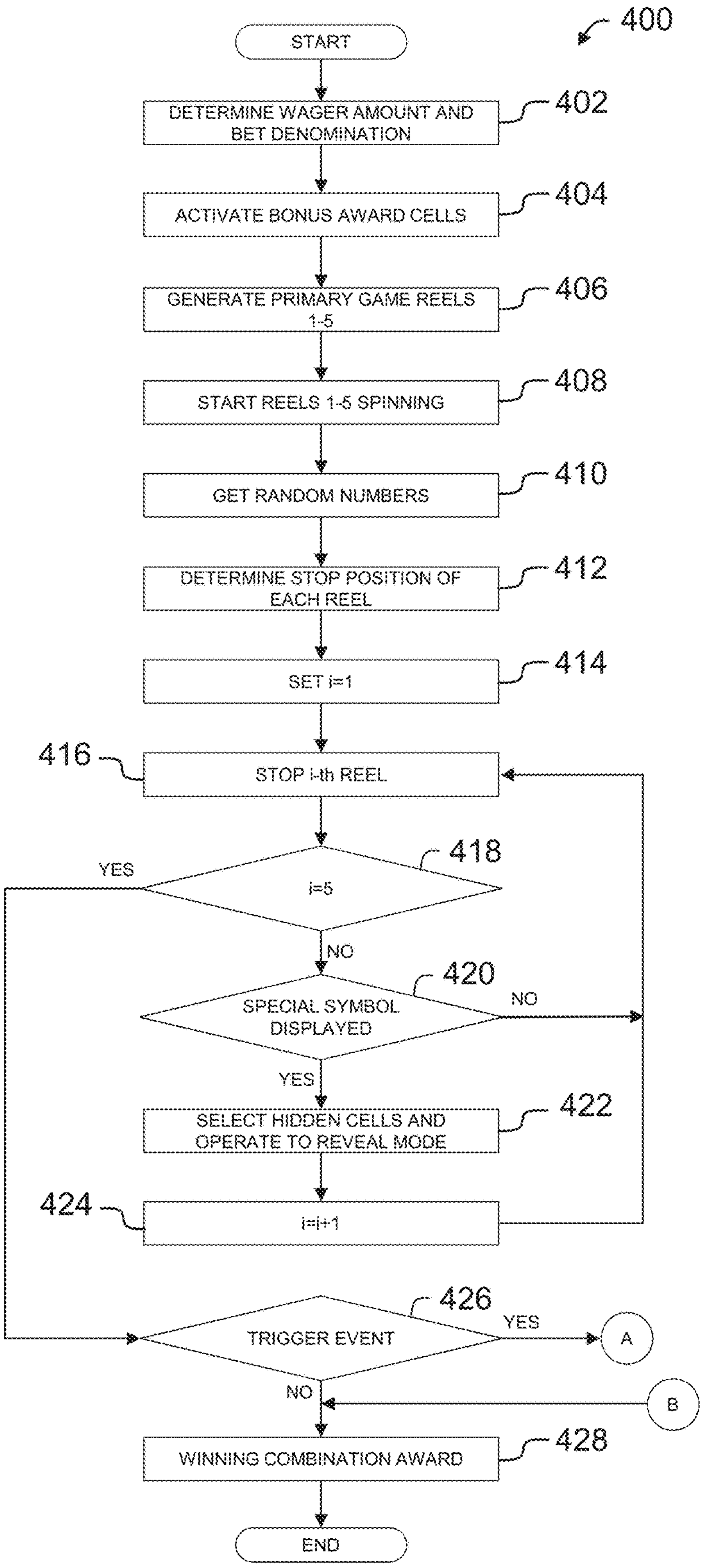
FIGS. 11A-12B are flow charts illustrating the algorithms used during operation of the gaming machine and/or the mobile computing device to execute the game shown in FIGS. 3A-3B, according to one embodiment of the present invention.

Referring to FIGS. 5-7, in the illustrated embodiment, the memory 42 stores a game application program 200 that includes computer executable instructions that, when executed by the processor 38, cause the processor 38 to generate and display the game on the display unit 24 of the gaming machine 10. In one embodiment, the game application program 200 includes program code 202 and program object data 204 that includes computer executable instructions for implementing a game using the algorithms shown in FIGS. 11-12.

In the illustrated embodiment, the memory 42 stores the game application program 200 and a system application program 206 that includes computer executable instructions that, when executed by the processor 38, cause the processor 38 to generate and display the game on the display unit 24 of the gaming machine 10. The game application program 200 provides game specific/front-end functions and the system application program 206 program provides generic/back-end functions, when executed by the processor 38. In the illustrated embodiment, the game application program 200 and the system application program 206 are implemented on the same operating system. However, it should be noted that these programs may be implemented on different operating system and/or by different processors. In one embodiment, the game application program 200 includes a plurality of software modules including a bet/denomination/payline button listener module 208, a start button listener module 210, a credit balance manager module 212, a sampling manager 214, a random number generator 216, a comparison manager 218, a game result generator 220, a win evaluator 222, a game presentator 224, a game graphics presentator 226, a game sound presentator 228, a win indicator 230, an award provider 232, an application manager 234, and an external communicator 236. The game application program 200 may also include the reel strip data files, the symbol image data files, the symbol selection data files, the reel stop position data file, the symbol cell selection weight table, the pay line set, and the paytable data file.

The bet/denomination/payline button listener module 208 is a software module for receiving a signal from the bet button, the denomination button, or the payline button which is generated by the button when a player operates the button to select number of bet, denomination, or number of paylines. In response to receiving the signal, the bet/denomination/payline button listener module 208 communicates the occurrence of the signal to application manager 234 for changing bet, denomination, or payline configuration of the game.

The start button listener module 210 is a software module for receiving a signal from the start button which is generated by the button when a player operates the button to start a game. In response to receiving the signal, the start button listener module 210 communicates the occurrence of the signal to application manager 234 for starting the game.

In response to receiving the signal from start button listener module 210, the application manager 234 requests the sampling manager 214 to obtain necessary number of random numbers from the random number generator 216.

The random number generator 216 generates random numbers based on predetermined algorithm of computational random generation method. The random number generator 216 may be a pseudorandom generator. In response to a request from sampling manager 214, the random number generator 216 returns random number. In some implementations, the random number generator 216 may be implemented in a central server. The random number generator 216 may be implemented as an integrated circuit or hard wired logic.

The comparison manager 218 compares the current state of the game or each random number with the reel strip data files, the symbol selection data files, the reel stop position data file, the pay line set, and/or the paytable data file and specifies corresponding reel layout, stop position, prize symbol, or trigger symbol based on each random number.

The game result generator 220 generates game result based on selected reel layout, stop positions of each reel, and bonus features.

The win evaluator 222 evaluates the game result with reference to the pay table.

The game presentator 224 provides game presentation process with visual and sound so as to form the predetermined game result finally.

The game graphics presentator 226 provides visual game presentation process on the display so as to form the predetermined game result finally.

The game sound presentator 228 provides sound presentation process by using sound controller and speakers.

The win indicator 230 indicates win combinations and payment condition of prize symbol formed in the game result.

The award provider 232 provides award credit to win meter based on the win evaluation.

The application manager 234 administrates activity and status of each software module. In addition, the application manager 234 administrates configuration, progress and states of the game application program 200.

The external communicator 236 communicates instruction and data with the system application program 206.

The credit balance manager module 212 executes a process for decrementing credit balance and incrementing credit balance based on win amount displayed in win meter.

In the illustrated embodiment, the system application program 206 provides back ground processing and functions other than game specific functions. The system application program 206 includes a plurality of software modules including a system manager 238, a security manager 240, a slot management module 242, a denomination manager 244, a data logger 246, a communications manager 248, a bill acceptor manager 250, a metering module 252, and a cashout manager 254.

The system application program 206 may also include a game recall file 256, accounting logs 258, and meters 260.

The system manager 238 is a software module for administrating all of the back ground processing and functions other than game specific functions conducted by the system application program 206.

The security manager 240 is a software module for administrating game verification, door security and monitoring security sensors.

The slot management module 242 is a software module for administrating data accumulation and communicating with external slot information system 62.

The denomination manager 244 is a software module for establishing denomination setting of the gaming machine 10. The denomination setting may include 1 cent, 2 cent, 5 cent, 25 cent, 1 dollar, 5 dollar and the like.

The data logger 246 is a software module for logging result of each primary game and the bonus feature to the game recall. In addition, the data logger 246 stores error events, bill log, cashout log, ticket log etc. to the accounting log.

The game recall file 256 is an accumulated data including results of each primary game and free game bonus. The game recall file 256 is stored in a non-volatile memory.

The accounting logs 258 is an accumulated data including error events, bill log, cashout log, ticket log etc. The accounting logs 258 are stored in a non-volatile memory.

The communications manager 248 is a software module for administrating communication between game application program 200 and system application program 206. The communications manager 248 also administrates network communication between system application program 206 and external network such as slot management system network, G2S network, gaming server for server based gaming network or VLT system network.

The bill acceptor manager 250 is a software module for administrating the bill acceptor and receives bill information inserted in the bill acceptor. In response to receiving the information from the bill acceptor, the bill acceptor manager 250 communicates with the metering for incrementing credit balance based on the inserted bill.

The metering module 252 is a software module for adjusting values of the meters 260 in response to communication with the game application program 200 via communications manager 248, the bill acceptor manager 250 or the cashout manager 254. The meters 260 includes a credit meter for indicating current credit balance on the gaming machine and a win meter for indicating win amount of current game session. The meters further include back ground meters such as coin-in, coin-out, total drop, attendant paid jackpots and/or bill-in. These meters might be implemented as data on the non-volatile memory or hardware meters.

The cashout manager 254 is a software module for administrating cashout procedure. In response to a player's operation on the cashout button, the cashout manager 254 is activated and the gaming machine pay total amount of the credit meter.

Figure 9:
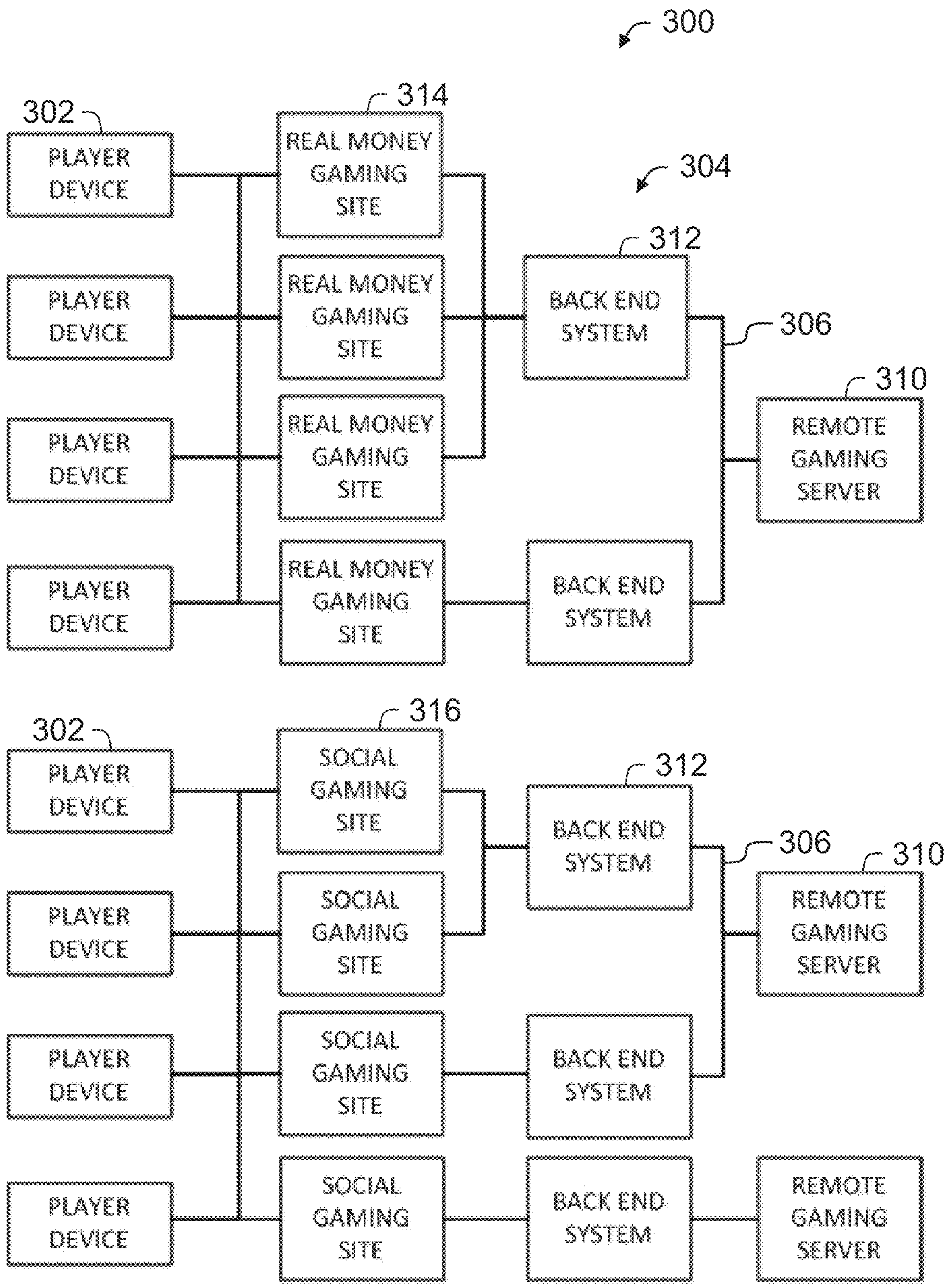
FIG. 9 is a functional block diagram of a server computer system, according to an embodiment of the present invention.
Figure 10:
FIG. 10 is a front view of a mobile computing device that may be used with the server computer system of FIG. 9.

Referring to FIGS. 9 and 10, in one embodiment, the present invention includes a networked server computer system 300 that is configured to deliver the game to one or more client computing devices 302 over the Internet. In the illustrated embodiment, the networked computer system 300 includes an iGaming server system 304 that is coupled in communication with one or more client computing devices 302 via a communications network 306. The communications network 306 may be any suitable connection, including the Internet, an Intranet, LAN, a virtual private network (VPN), cellular networks, etc. . . . , and may utilize any suitable or combination of technologies including, but not limited to wired and wireless connections, always on connections, connections made periodically, and connections made as needed.

The client computing device 302 may include any suitable device that enables a user to access and communicate with the server system 300 including sending and/or receiving information to and from the server system 300 and displaying information received from the server system 300 to a user. In the illustrated embodiment, the client computing device 302 includes a processor coupled to a memory device. The memory device stores various programs and data that are executed by the processor for operating the client computing device 302. The client computing device 302 also includes an input device configured to receive operational inputs from the user, and a display device configured to display a graphical user interface. The input device and display device enable a user to interact with the server system 300 via the client computing device 302. For example, in one embodiment, the client computing device 302 may include, but is not limited to, a desktop computer, a laptop or notebook computer, a tablet computer, smartphone/tablet computer hybrid, a personal data assistant, a handheld mobile device including a cellular telephone, and the like. In one embodiment, the processor of the client computing device 302 may be programmed to function as the control unit 22 of the gaming machine 10.

In the illustrated embodiment, the client computing device may include a web browser program stored in the memory device. The processor executes the web browser program to display web pages on the display device that includes information received from the server system 300 to enable a user to interact with and operate the server system 300.

In one embodiment, the client computing device 302 includes a mobile computing device 308 (shown in FIG. 10) such as, for example, a tablet computer, a smartphone/tablet computer hybrid, a smartphone such as an iPhone™, and the like. The mobile computing device 308 includes a processor coupled to a memory device for storing various programs and data for use in operating the mobile computing device 308. The mobile computing device 308 may also include a display unit 24 including a touchscreen, one or more video image cameras, one or more speakers, a microphone, at least one input button, and one or more sensors including, but not limited to, a touch ID fingerprint sensor coupled to an input button, a barometer, a three-axis gyro, an accelerometer, proximity sensor, and an ambient light sensor. In addition, the mobile computing device 308 may also include a Wi-Fi antenna, a cellular network antenna, a Bluetooth™ communications device, assisted GPS and GLONASS, a digital compass, and an iBeacon™ microlocation device.

The mobile computing device 308 may be programmed to store and execute mobile computer program applications that display graphical user interfaces on the touchscreen display unit 24 including display area 64 that allows the user to access the server system 300 to retrieve and store information within the server system 300 as well as interact with and operate the server system 300. In addition, in one embodiment, the server system 300 may install one or more mobile computer application programs in the memory device of the mobile computing device 308. When initiated by the processor of the mobile computing device 308, the mobile computer application program causes the processor of the mobile computing device 308 to perform some or all of the functions of the gaming machine 10.

In the illustrated embodiment, the server system 300 includes one or more remote gaming servers 310, one or more back-end servers 312, one or more real money gaming website hosting servers 314, and one or more social gaming website hosting servers 316. In the illustrated embodiment, the social gaming website hosting server 316 and the real money gaming website hosting server 314 are programmed to host a website that is accessible by a user via one or more client computing devices 302. The website hosting servers 314 and 316 execute a website application program that retrieves application code from the back-end server 312 and executes the application code to render one or more webpages on a display device of a client computing device 302 in response to requests received from the user via the client computing device 302 to allow users to interact with the website. The website hosting servers 314 and 316 are configured to generate and display webpages displaying a game. For example, the real money gaming website hosting server 314 is configured to host a real money wagering website that enables players to convert monetary funds to gaming credits that may be used to place wagers on the game. The social gaming website hosting server 316 is configure to host a social media and/or social gaming website that allows players to receive gaming credits for activities such as purchasing goods and/or services through an e-commerce website, and/or purchase gaming credits that may be used to play the game.

Each back-end server 312 is configured to perform operations to support the functions of the webpages and/or website being displayed by the website hosting servers 314 and 316. For example, in one embodiment, the back-end servers 312 may include a player account system server that is configured to generate player accounts that include data associated with a player including, but not limited to, player identification information, player financial account information, player gaming credit account information, and/or any suitable player information, that may be used to establish credit meters and allow players to place wagers on the game.

Each remote gaming server 310 includes one or more copies of the game application program 200 stored in a memory device of the remote gaming server 310. A processor of the remote gaming server 310 is programmed to retrieve and transmit the game application program 200 to one or more back-end servers 312 for use in displaying the game to the user via a webpage being displayed by the web browser program.

In one embodiment, the game application program 200 may include instructions for rendering the game and executing the game on the client computing device 302. For example, the game application program 200 may include instructions for generating rendered code, such as, for example HTML code, which may be used by the web browser program of the client computing device 302 for displaying the game. For example, the game application program 200 may include program software code including, but not limited to, HTML, JavaScript, cascade style sheets (CSS), and any suitable programming code that may be used for rendering and operating the game via a website and/or mobile computer application.

In one embodiment, upon receiving a request from the website hosting servers 314, 316 via the back-end server 312, the remote gaming server 310 may execute the game application program 200 to operate the game, and execute a render-to-string operation to generate rendered code indicative of the game, such as, for example HTML code, and transmit the rendered code to the back-end server 312. The back-end server 312 may then transmit the rendered code to the corresponding website hosting servers 314, 316 for use in displaying the game on the website. As the player plays the game, the remote gaming server 310 may execute the game application program 200 for each instance of the game, and transit rendered code to the back-end servers 312.

In another embodiment, the remote gaming server 310 may transmit the game application program 200 to the back-end server 312 and/or the website hosting servers 314, 316. The back-end server 312 and/or the website hosting servers 314, 316 may then execute the game application program 200 to initiate the instances of the game and execute render-to-string operations to generate rendered code indicative of the game.

In yet another embodiment, the back-end server 312 may receive a request to initiate the game from a mobile computing device 308 executing the mobile computer application program. Upon receiving the request, the back-end server 312 may access the game application program 200 and execute a render-to-string operation to generate rendered code indicative of the game and transmit the rendered code to the mobile computing device 308. In one embodiment, the back-end server 312 may continuously execute the game application program 200 to generated each instance of the game using a random number generator of the back-end server 312 based on input received from the mobile computing device 308 and generate and transmit rendered code for each instance of the game to the mobile computing device 308. In another embodiment, the back-end server 312 may execute a partial-render operation and generate partially-rendered code of the game using the game application program 200, and transmit the partially rendered code of the game and object data of game assets to the mobile computing device 308. The partially rendered code includes instructions for generating rendered code using the game assets and a random number generator of the mobile computing device for generating and displaying the game on the mobile computing device 308 using the mobile computer application program.

In one embodiment, the game application program 200 may be stored on several different servers. The game code on these servers is used to distribute game content to social or real money gaming websites and mobile applications. The distribution method is very flexible. For example, the game code and/or game application program 200 including game code and game object assets may be stored on a remote gaming server 310. One remote gaming server 310 may be connected to one or more back-end server 312.

Each back-end server 312 is configured to distribute the games to one or more websites or mobile applications. Players connect to these websites/mobile applications with the client devices or mobile devices and have access to the game content. A copy of game application program 200 including game code and game object assets is stored on the remote gaming server 310 for each back-end server 312 that is connected to the remote gaming server 310 and that distributes the game. For example, if one remote gaming server 310 is connected to two back-end servers 312, which is connected to three website hosting servers 314, 316 that distribute the game, the remote gaming server 310 would store two copies of the game application program 200 including game code and game object assets for the game (e.g., one copy for each back-end server 312).

For example, the server system 300 may be configured to implement the game on a mobile application such as, for example, "my KONAMI Slots™" mobile application available in Apple iOS™, Google Android™, and Amazon Kindle™ operating platforms, or on social-media websites such as the "my KONAMI Slots™" available on Facebook™. In one embodiment, the mobile application may download the game code from remote gaming server 310 via the real money gaming site 314 or the social gaming site 316 and execute the game code on the client computing device 302. In this embodiment, the game code may provide game specific/front-end function when executed by the processor of the client computing device, and the back end system 312 may provide generic/back-end function.

FIGS. 11A, 11B, 12A, and 12B are flow charts of methods 400, 500, 600, and 700 illustrating the algorithms included in the game application program 200 and performed by the processor 38 when executing the game application program 200 for operating the gaming machine 10 and/or iGaming server system 304 to implement the game. The methods include a plurality of steps. Each method step may be performed independently of, or in combination with, other method steps. Portions of the methods may be performed by any one of, or any combination of, the components of the gaming machine 10 and/or iGaming server system 304. FIGS. 34A-37F are diagrammatic illustrations of the game being displayed on the display area of the gaming machine in FIGS. 3A-3B and the mobile computer device shown in FIG. 10, according to an embodiment of the present invention. FIGS. 13-23 are exemplary illustrations of computer program data files that may be used by processor 38 when executing the game application program 200.

In the illustrated embodiment, the game execution program 200 includes computer instructions for generating the primary game 68 and the bonus feature event 70 (shown in FIGS. 3A-3B and 34A-37F). The primary game 68 is displayed in a primary game area 72 that includes the grid 76 and a plurality of primary game reels 84 to 92 being displayed within the grid 76. The grid 76 includes a plurality of cells 78 arranged in a plurality of reel columns. Each primary game reel 84-92 is displayed within a corresponding reel column. The grid 76 also includes a plurality of bonus reel columns 98 that are each displayed with a corresponding primary game reel 84-92. Each bonus reel column 98 includes a plurality of modifiable cells 82 that are configured to operate in a hidden mode in which game symbols of the corresponding primary game reel 84-92 are obscured and a reveal mode in which game symbols of the corresponding primary game reel 84-92 are visible. The bonus feature event 70 is displayed within the bonus feature event area 74 that includes a plurality of bonus prize cells 136. Each bonus prize cell 136 is operable as an active bonus prize cell 138 or an inactive bonus prize cell 140, and is configured to display a randomly selected bonus prize. In the illustrated embodiment, each bonus prize cell 136 is associated with a wager amount value and a bet denomination value.

In one embodiment, the processor 38 may be programmed to display the bonus feature event area 74 with a plurality of groups of bonus prize cells 136, with each group of bonus prize cells 136 being associated with one of the primary game reels 84 to 92. For example, as shown in FIGS. 3A-3B, the processor 38 may display a first group 144 of bonus prize cells 136 with the first bonus reel column 100, a second group 148 of bonus prize cells 136 with the second bonus reel column 102, and a third group 152 of bonus prize cells 136 with the third bonus reel column 104. The processor 38 may also assign a different wager amount value to each group of bonus prize cells. For example, the processor 38 may associated the first group 144 of bonus prize cells 136 with a minimum wager amount 146, associate the second group 148 of bonus prize cells 136 with a medium wager amount 150, and associate the third group 152 of bonus prize cells 136 with a maximum wager amount 154.

In addition, the processor 38 may be programmed to display each group of bonus prize cells including a plurality of subsets of bonus prize cells, and assign a different bet denomination value to each subset of bonus prize cells. For example, as shown in FIG. 29, the processor 38 may be programmed to display a plurality of minimum bet denomination bonus prize cells 156 that are associated with a minimum bet denomination, a plurality of medium bet denomination bonus prize cells 158 that are associated with a medium bet denomination, and a plurality of maximum bet denomination bonus prize cells 160 that are associated with a maximum bet denomination.

In method step 402, the processor 38 receives a signal indicating a wager being associated with the primary game 68. For example, the processor 38 may receive a signal from the display unit 24 and/or the operation unit 32 indicating a wager being placed on the primary game 68 by the player. Upon receiving the signal indicating a wager being placed on the primary game 68 by the player, the processor 38 determines a wager amount and a bet denomination of the wager placed by the player.

In method step 404, the processor 38 selects bonus prize cells 136 that have a wager amount values that are equal to or less than the wager amount of the received wager, and selects bonus prize cells 136 having associated bet denomination values that are equal to or less than the bet denomination and the wager amount of the received wager. The processor 38 then operates the selected bonus prize cells 136 as active bonus prize cells 138. For example, shown in FIGS. 30A-33B, prior to spinning the primary game reels 84 to 92, the processor 38 may select bonus prize cells having associated bet denomination values and wager amount values equal to or less than the bet denomination and the wager amount of the received wager, and transition the selected bonus prize cells from inactive bonus prize cells 140 to active bonus prize cells 138. In one embodiment, the processor 38 may access the prize cell selection logic table 163 (shown in FIG. 17) and operate each bonus prize cell 136 based on the instructions included in the logic cells associated with the determined bet denomination and the determined wager amount.

In method step 406, the processor 38 receives a signal to initiate an instance of the primary game 68 and generates the primary game reels 84 to 92 for use during the instance of the primary game 68. For example, the processor 38 may receive a signal from the display unit 24 and/or the operation unit 32 indicating a player's request to initiate an instance or play of the game. In one embodiment, the player may transmit a request to initiate an instance or play of game by depressing a corresponding "spin" button on the operation unit 32 by touching a corresponding button icon being displayed on a touchscreen of the display unit 24. Upon receiving a signal from the display unit 24 and/or the operation unit 32, the processor 38 initiates the instance of the game by generating the primary game reels 84-92 for use in the primary game 68.

In the illustrated embodiment, the processor 38 retrieves the reel strip data file 110 and symbol image data file 112 for use in generating the primary game reels 84-92. The processor 38 accesses each logic cell to retrieve instructions for generating each virtual reel 84-92 and to populate the corresponding symbol positions with game symbols 94. The processor 38 then renders the primary game reels 84-92 on the game screen 64 based on the populated virtual reel strips 120-128.

In method steps 408-418, the processor 38 randomly determines an outcome of an instance of the primary game 68 and spins the primary game reels 84 to 92 (as shown in FIGS. 34A-35D) and sequentially stops the primary game reels 84 to 92 to display the randomly generated outcome including a game symbol being displayed in each cell of the grid 76. In addition, each modifiable cell 82 is initially displayed in the hidden mode 106 as the spin of the primary game reels 84-92 is initiated, and as each primary game reel 84-92 is stopped, the processor 38 tests for the occurrence of a reveal trigger condition. For example, in one embodiment, the processor 38 starts spinning each virtual reel 84-92, obtains random numbers from the random number generator, and determines a stop position of each virtual reel 84-92 based on the random numbers and the reel stop position data file 195. In the illustrated embodiment the reel stop position data file 195 includes a range of random numbers associated with each symbol position in the sequence of symbol positions associated with the virtual reel. In one embodiment, the processor may obtain a random number for each simulate virtual reel 84-92, i.e., five random numbers. The processor 38 then establishes a reel stop counter, “i”, and sets the reel stop counter, i, equal to 1. The processor 38 then identifies the $i^{th}$ virtual reel associated with the stop counter, i, and stops the identified virtual reel to display the corresponding symbols in the corresponding cells associated with the identified virtual reel.

In method step 420, the processor 38 determined whether a reveal trigger condition has occurred in the identified virtual reel with the identified virtual reel in the stopped position. For example, in the illustrated embodiment, as the processor 38 stops each of the primary game reels in sequential order, the processor 38 detects the appearance of the special symbol 134 in the grid 76 with the corresponding identified virtual reel in the stopped position. In one embodiment the processor 38 detects the reveal trigger condition associated with a corresponding bonus reel column when the special symbol 134 appears in an adjacent primary game reel with the adjacent primary game reel stopped.

Figure 34A:
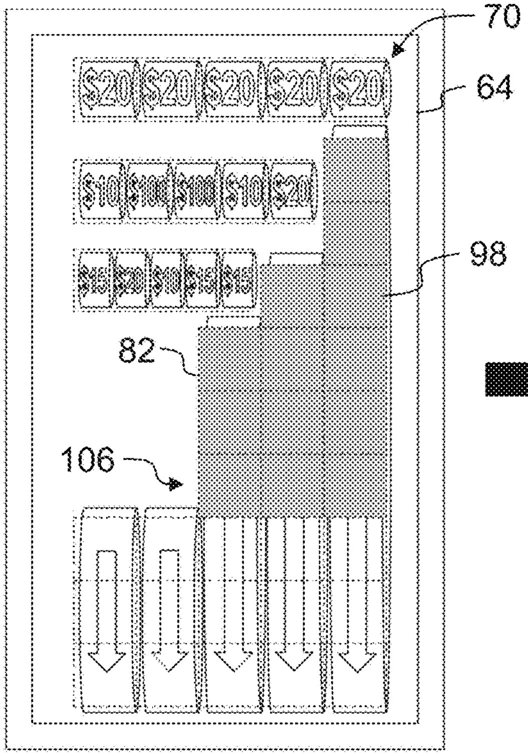
FIGS. 34A-37F are illustrations of sequences of graphic images that may be used to display the game shown in FIGS. 3A-3B on the display area of the gaming machine in FIGS. 1A-1B and the mobile computer device shown in FIG. 10, according to an embodiment of the present invention.
Figure 34B:
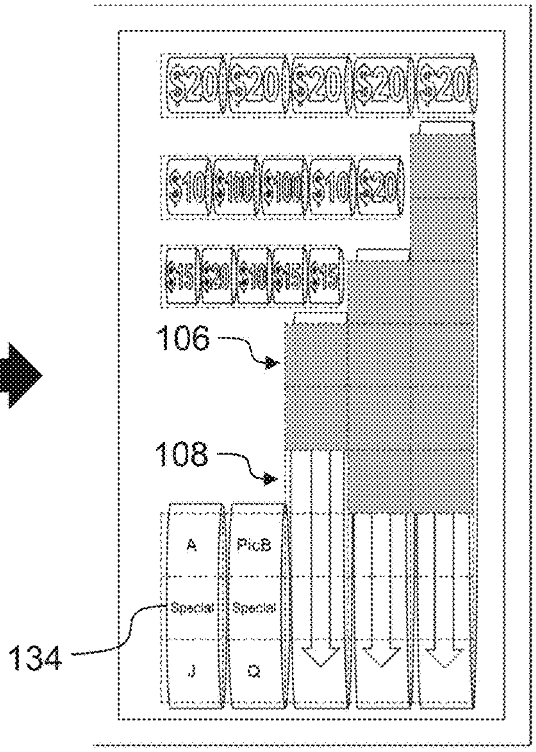
Figure 34C:
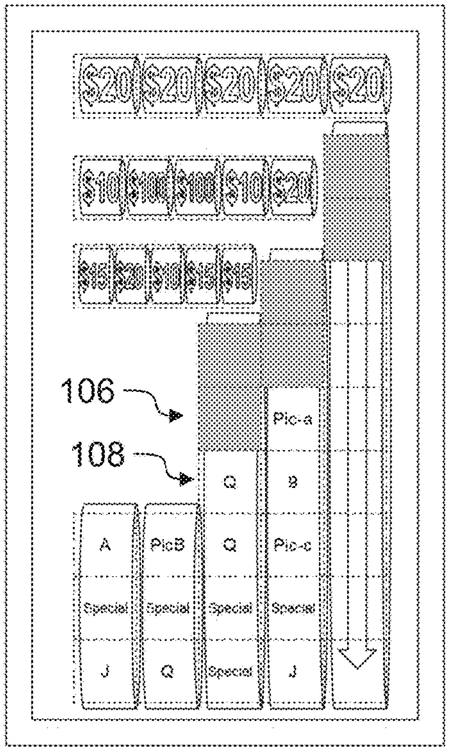
Figure 34D:
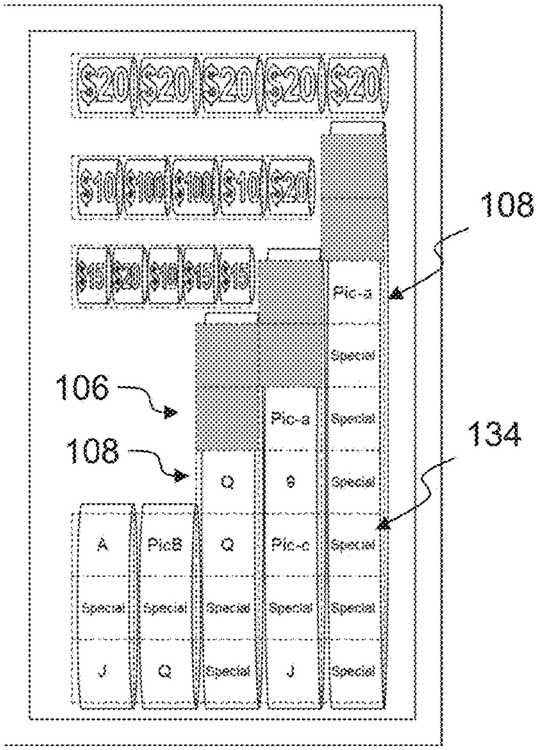
Figure 35A:
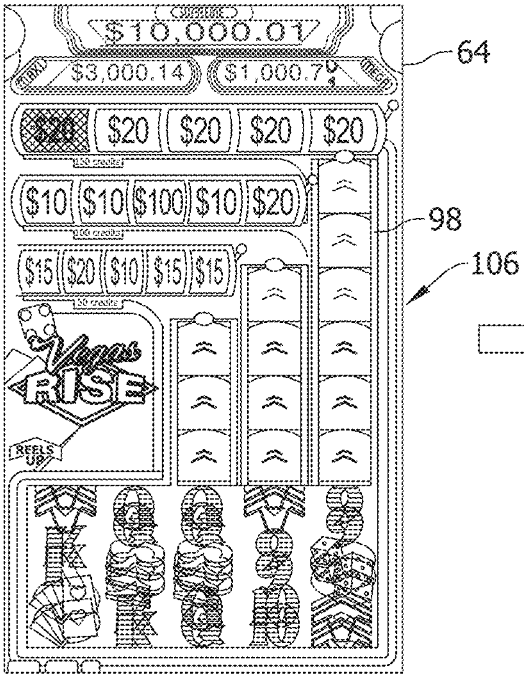
Figure 35B:
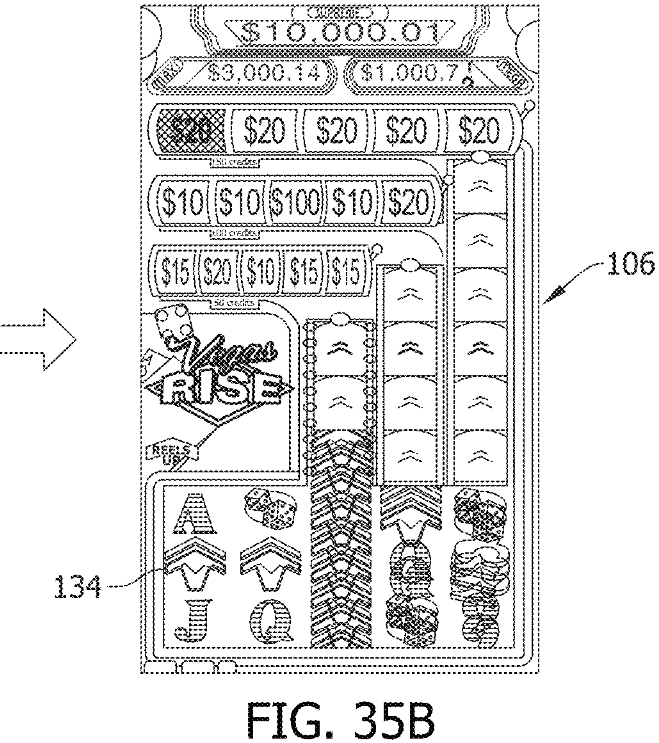
Figure 35C:
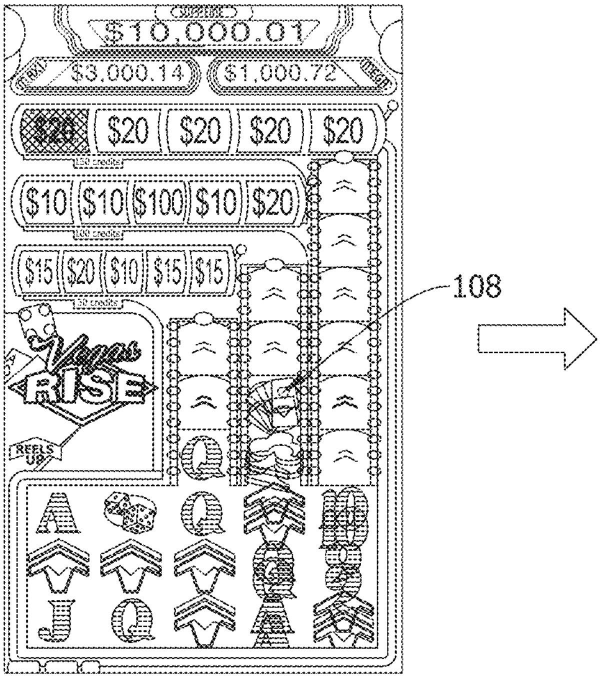
Figure 35D:
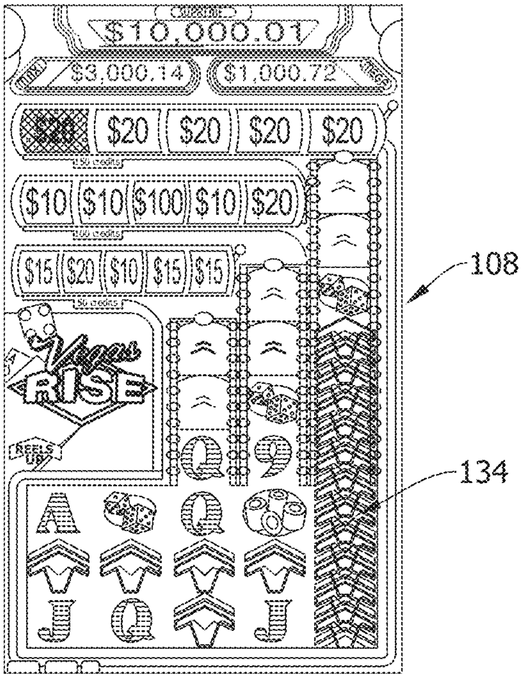
Figures 36A, 36B, 36C:
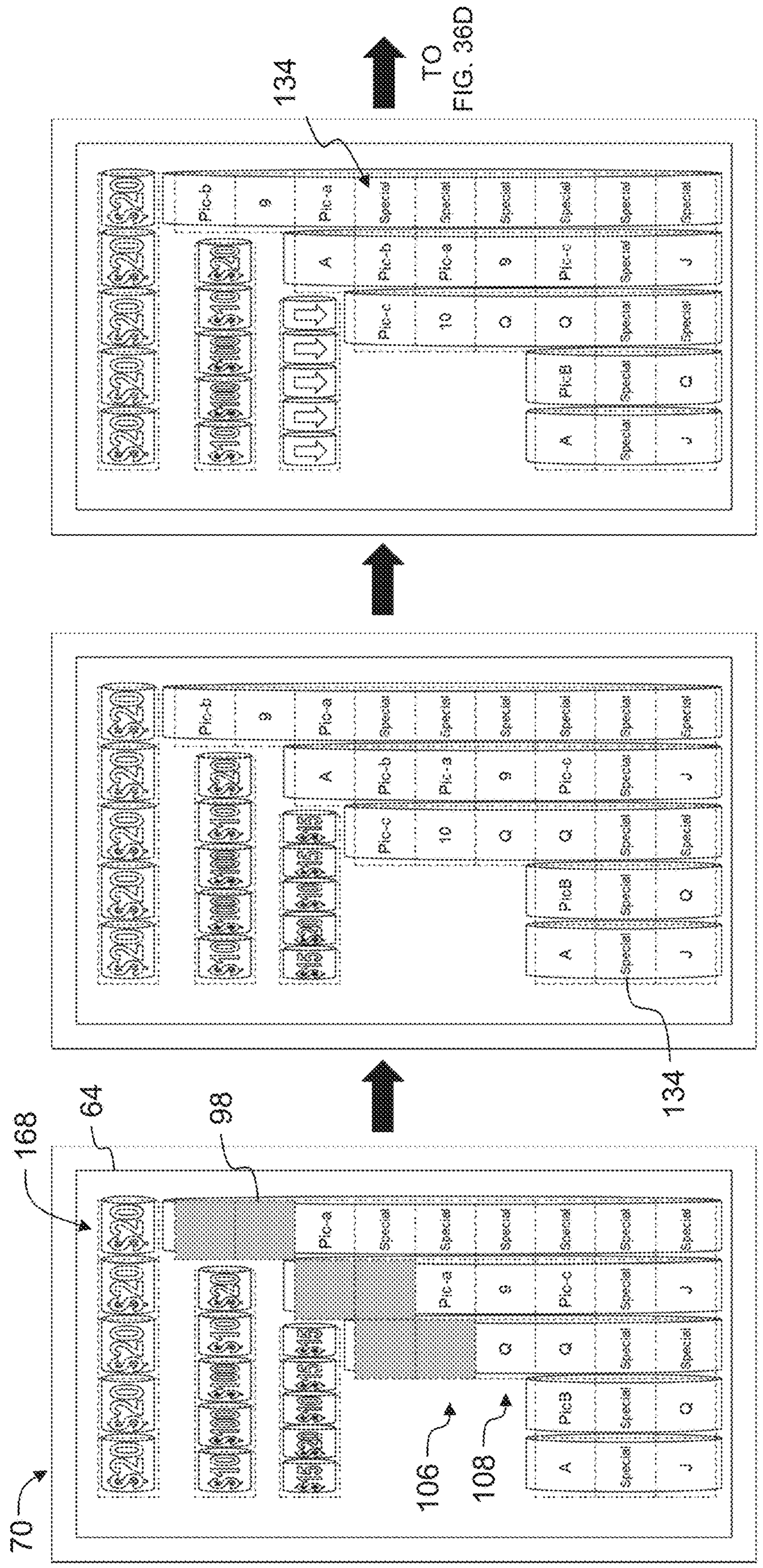
Figure 36F:
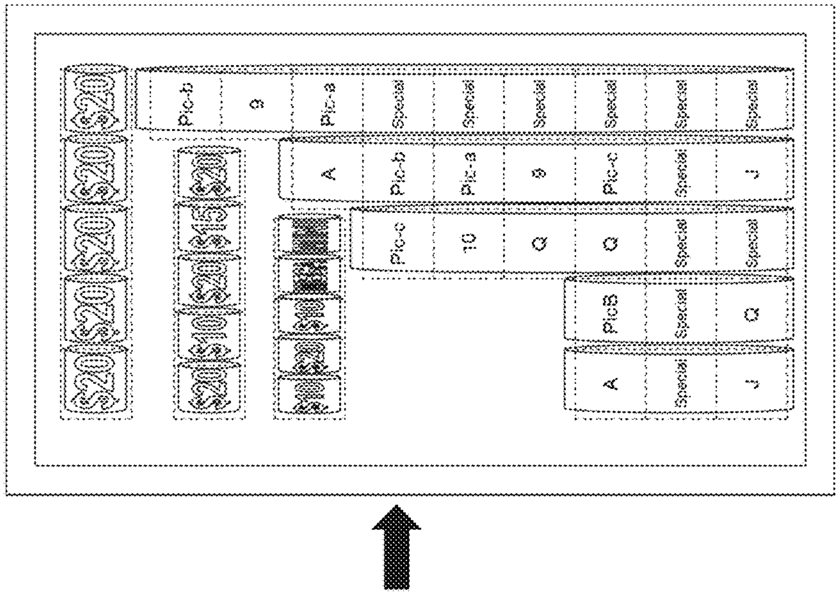
Figure 36E:
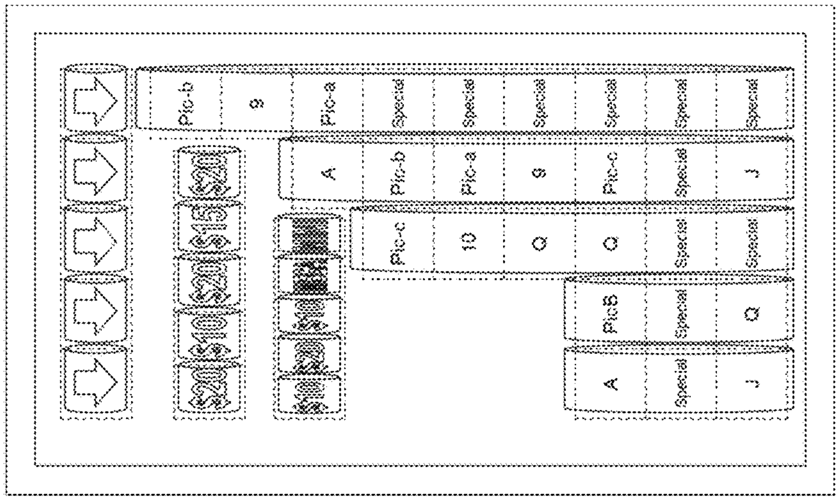
Figure 36D:
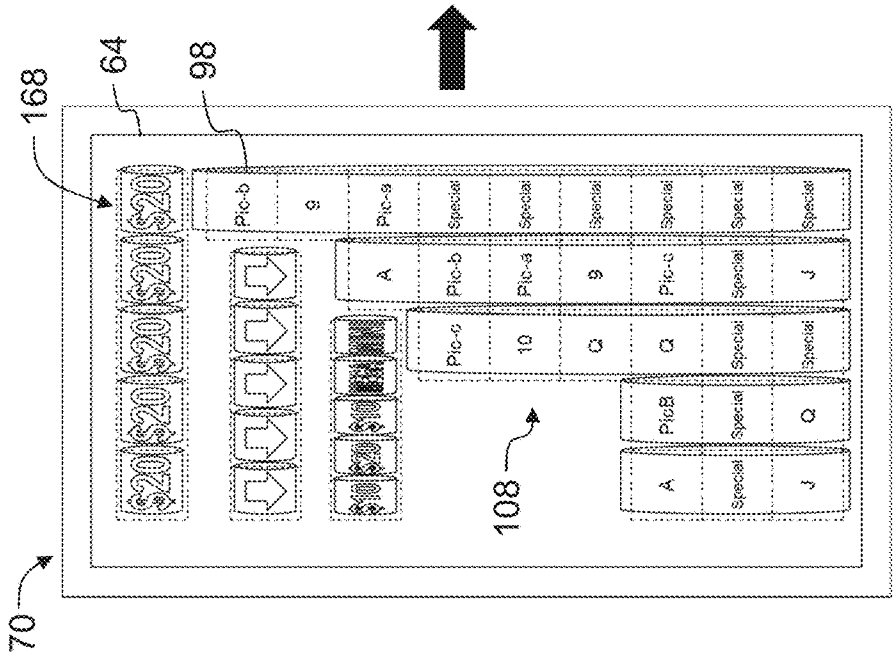

In method step 422, upon detecting the occurrence of the reveal trigger condition, the processor 38 randomly selects a number of modifiable cells 82 associated with a corresponding bonus reel column 98, and operates the randomly selected modifiable cells 82 from the hidden mode 106 to the reveal mode 108. In one embodiment, upon detecting the occurrence of the reveal trigger condition, the processor 38 may be programmed to access the symbol cell selection weight tables 191 (shown in FIG. 20), retrieve one or more random numbers, randomly select a number of modifiable cells 82 using the symbol cell selection weight tables 191 and the random numbers, and transition the randomly selected modifiable cells 82 to the reveal mode 108 as the corresponding primary game reel is spinning. For example, as shown in FIGS. 34B and 35B, upon detecting the reveal trigger condition in the $1^{st}$ primary game reel 84 and the $2^{nd}$ primary game reel 86 including the appearance of the special symbol 134 in the $1^{st}$ primary game reel 84 and the $2^{nd}$ primary game reel 86 with the $1^{st}$ primary game reel 84 and the $2^{nd}$ primary game reel 86 in the stopped position, the processor 38 randomly selects a number of modifiable cells 82 included in the first bonus reel column 100 and transitions the randomly selected modifiable cells 82 to the reveal mode 108. Upon detecting the reveal trigger condition in the $3^{rd}$ primary game reel 88 including the appearance of one or more special symbols 134 in the $3^{rd}$ primary game reel 88 with the $3^{rd}$ primary game reel in the stopped position (shown in FIGS. 34C, 35C), the processor 38 randomly selects a number of modifiable cells 82 included in the second bonus reel column 102 and transitions the randomly selected modifiable cells 82 to the reveal mode 108. Similarly, upon detecting the reveal trigger condition in the $4^{th}$ primary game reel 90 including the appearance of one or more special symbols 134 in the $4^{th}$ primary game reel 90 with the $4^{th}$ primary game reel in the stopped position (shown in FIGS. 34D, 35D), the processor 38 randomly selects a number of modifiable cells 82 included in the third bonus reel column 104 and transitions the randomly selected modifiable cells 82 to the reveal mode 108. In addition, in one embodiment, upon detecting the reveal trigger condition in the $5^{th}$ primary game reel 92 including the appearance of one or more special symbols 134 in the $5^{th}$ primary game reel 92 with the $5^{th}$ primary game reel in the stopped position (shown in FIGS. 36A-36B and 37A-37B), the processor 38 may be programmed to transition all remaining modifiable cells 82 operated in the hidden mode 106 to the reveal mode 108.

In method step 424, the processor 38 then increments the reel stop counter, i, by 1, i.e., i=i+1, and repeats the process of identifying the virtual reel associated with the incremented reel stop counter and stopping the identified virtual reel. This process continues until each virtual reel has been stopped. In this embodiment, for example, the primary game reels are numbered 1-5. In one embodiment, during the reel spin, the player may initiate the stopping of the reels by depressing the spin button, which enables the player to accelerate game play.

Figure 12A:
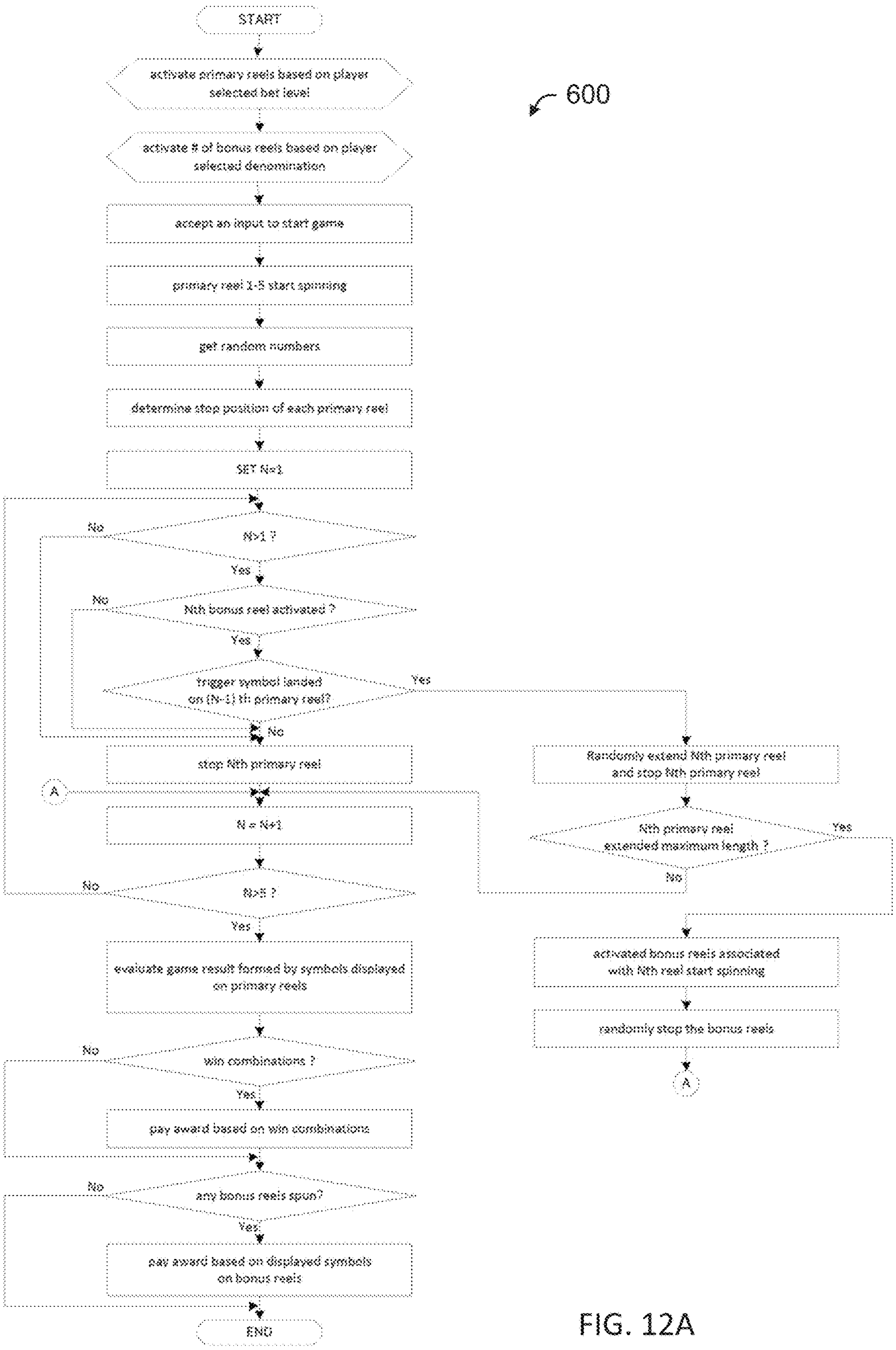
Figure 12B:
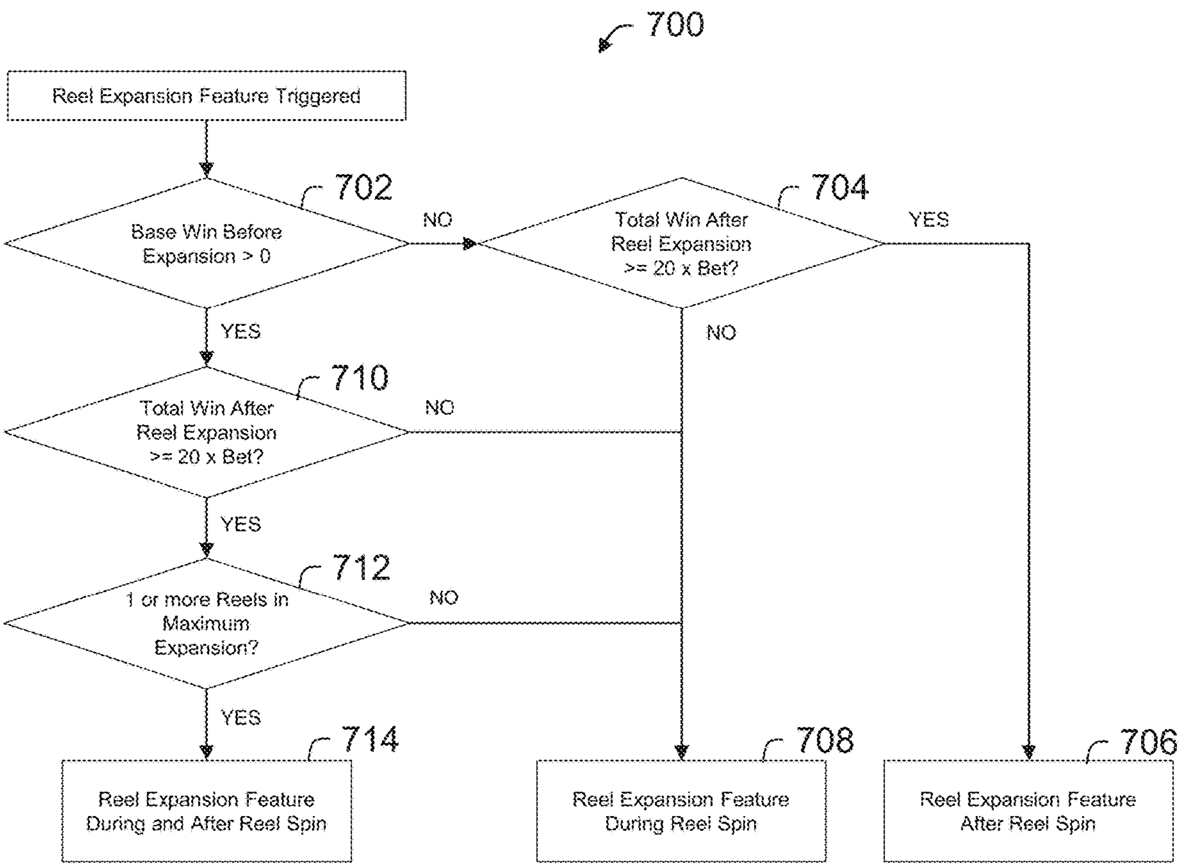

In one embodiment, upon detecting the occurrence of the reveal trigger condition, the processor 38 may be programmed to execute the algorithm illustrated in method 700 to initiate the reel expansion feature. For example, as shown in FIG. 12B, the processor 38 may execute method 700 to determine whether to transition the selected modifiable cells 82 to the reveal mode 108 during the reel spin, after the reel spin, or reveal some of the modifiable cells 82 during the reel spin and transition the remaining modifiable cells 82 to the reveal mode after the reel spin. In method step 702, upon detecting the reveal trigger condition, the processor 38 initially determines whether a combination of symbols in the primary cells 80 of primary game results in main base win equal to a credit award. If the combination of symbols in the primary cells 80 does not include a credit award, the processor 38 initiates method step 704 and determines whether a combination of symbols included in the primary cells 80 and those symbols associated with the selected modifiable cells 82 results in total win that includes a credit award that is greater than, or equal to 20× the amount bet on the primary game. If the total win is determined to be greater than, or equal to 20× the amount bet, the processor 38 executes method step 706 and initiates the reel expansion feature to transition the selected modifiable cells 82 to the reveal mode 108 after the reels are spun and stopped. If the total win is determined to be less than 20× the amount bet, the processor 38 executes method step 708 and initiates the reel expansion feature to transition the selected modifiable cells 82 to the reveal mode 108 during the reel spin, i.e. as each corresponding reels is spinning (as shown in FIGS. 34A-35D). Referring again to method step 702, if the combination of symbols in the primary cells 80 does not include a credit award, the processor 38 initiates method step 710 and determines whether a combination of symbols included in the primary cells 80 and those symbols associated with the selected modifiable cells 82 results in total win that includes a credit award that is greater than, or equal to 20× the amount bet on the primary game. If the total win is determined to be less than 20× the amount bet, the processor 38 executes method step 708 and initiates the reel expansion feature during the reel spin.

Figure 37A:
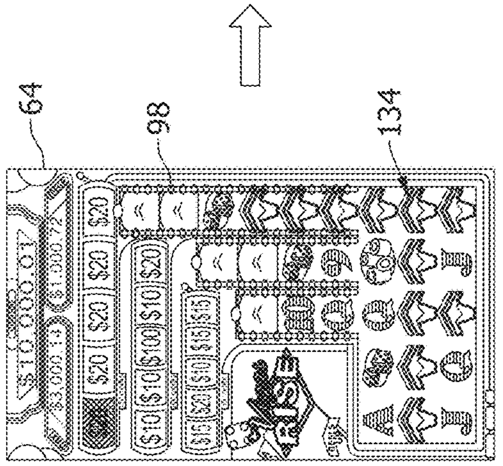
Figure 37B:
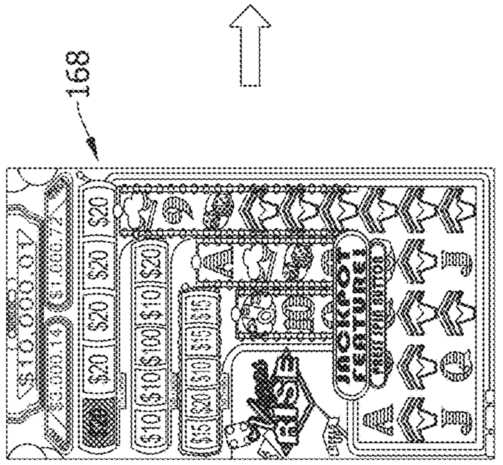
Figure 37C:
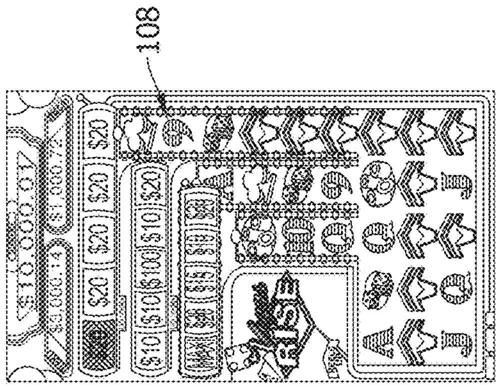
Figure 37D:
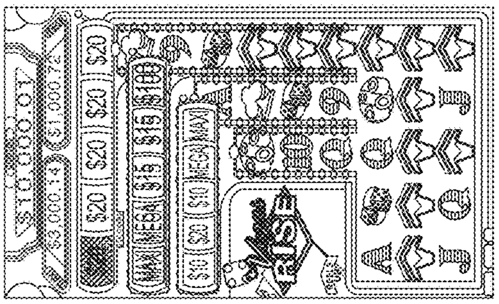
Figure 37E:
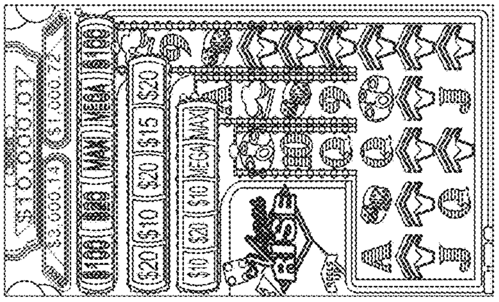

If the total win is determined to be greater than, or equal to 20× the amount bet, the processor 38 executes method step 712 and determines whether one or more bonus reel columns 98 reaches maximum expansion, i.e. each modifiable cells 82 of the corresponding bonus reel column 98 has been selected to transition to the reveal mode. If one or more bonus reel columns 98 are determined to reach maximum expansion, the processor 38 executes method step 714 and initiates the reel expansion feature during and after the reel spin. For example, as shown in FIGS. 37A to 37B, the processor 38 may transition a portion of the selected modifiable cells 82 to the reveal mode as each corresponding primary reel is stopped, and transition all remaining modifiable cells 82 to the reveal mode after the remaining primary reel is stopped.

Referring again to FIG. 11A, upon completing the reel spin and reel expansion feature, the processor 38 executes method step 426 and determines whether a bonus event trigger condition has been detected in the outcome of the primary game 68. If a bonus event trigger condition is detected during the primary game 68, the processor 38 initiates the bonus feature event 70 by executing the algorithm illustrated in method 500 (shown in FIG. 11B). In the illustrated embodiment, upon stopping each of the primary game reels 84 to 92, the processor 38 detects whether a bonus event trigger condition has occurred in the outcome of the primary game, and initiates a bonus feature event 70 upon detecting the bonus event trigger condition. For example, in the illustrated embodiment, the processor 38 is programmed to detect the bonus feature event trigger condition appearing in a corresponding bonus reel column 98 when each modifiable cell 82 of the corresponding bonus reel column 98 is operated in the reveal mode 108. Upon detecting the occurrence of the bonus event trigger condition, the processor 38 executes the algorithms illustrated in method 500.

Figure 11B:
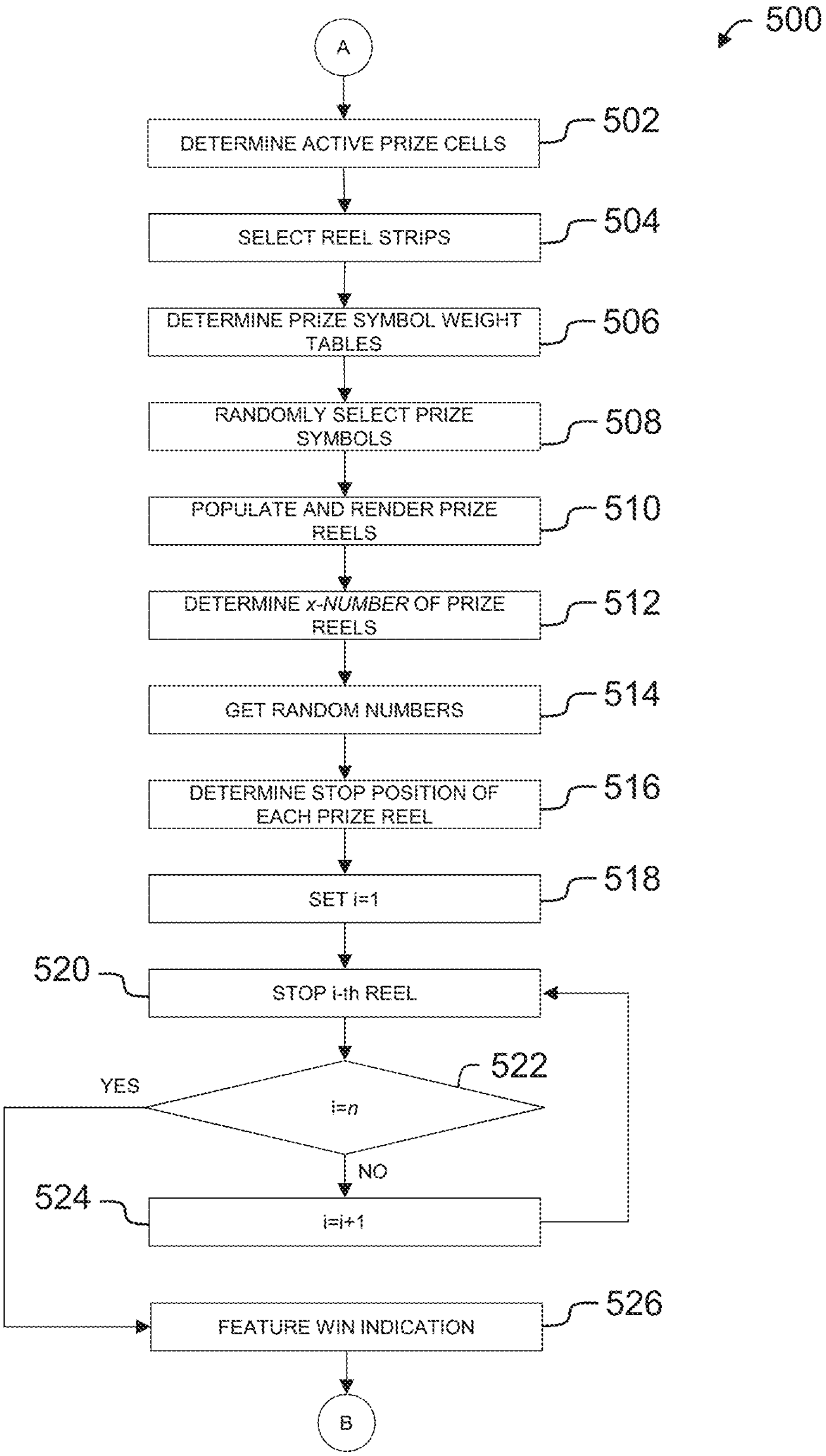

Referring to FIG. 11B, in the illustrated embodiment, in method step 502, the processor 38 identifies the active bonus prize cells 138 that are associated with the bonus event trigger condition.

In method steps 504-510, the processor 38 generates bonus prize reels 166 for use in randomly selecting a bonus prize for each of the active bonus prize cells 138. For example, in method step 504, the processor 38 selects reel strips for use in generating the bonus prize reels 166. In one embodiment, the processor 38 generates a plurality of independent unisymbol reels 168 for use during the bonus feature event 70. For each independent unisymbol reels 168, the processor 38 accesses unisymbol reel strip data file 170 and selects one of the unisymbol reel strips 174-180 for each of the active bonus prize cells 138.

In method step 506, the processor 38 selects a bonus feature prize symbol weight table 172 for each unisymbol reel strip.

In method step 508, the processor 38 accesses the instructions in each sequential symbol position logic cells of a corresponding unisymbol reel strip 174-180 and randomly selects prize symbols 142 using random numbers and the bonus feature prize symbol weight tables 172 based on the instructions included in each sequential symbol position logic cells.

In method step 510, the processor 38 populates the symbol positions of the unisymbol reel strips with the randomly selects prize symbols 142 and renders the independent unisymbol reels 168 in each active bonus prize cell 138.

In one embodiment, the processor 38 may be programmed to use a multiplier reel strip layout file 197 (shown in FIG. 15) that includes unisymbol reel strips having a plurality of credit award multiplier values in each symbol position. The processor 38 may also be programmed to generate and display a plurality of bonus prize wheels 196 (shown in FIGS. 26A-26B) that are displayed with each group of bonus prize cells. Each bonus prize wheel 196 is associated with a bonus reel column 98 and may be generated using the unisymbol reel strips 174-180 and populated with prize symbols.

In method steps 512-524, the processor 38 randomly selects a bonus prize for each active bonus prize cell associated with the trigger condition and displays each randomly selected bonus prize in a corresponding active bonus prize cell. For example, in one embodiment, the processor 38 determines a number, n, of independent unisymbol reels 168 that will be spun during the instance of the bonus feature event 70, and determines a sequential stopping order of the independent unisymbol reels 168. The processor 38 initiates a spin of the independent unisymbol reels 168, obtains random numbers from the random number generator, and determines a stop position of each independent unisymbol reels 168 based on the random numbers and the reel stop position data file 195. The processor 38 then establishes a reel stop counter, "i", and sets the reel stop counter, i, equal to 1. The processor 38 then identifies the $i^{th}$ independent unisymbol reel associated with the stop counter, i, and stops the identified independent unisymbol reel 168 to display the corresponding symbols in the corresponding active bonus prize cell 138. The processor 38 then increments the reel stop counter, i, by 1, i.e., i=i+1, and repeats the process of identifying the independent unisymbol reel associated with the incremented reel stop counter and stopping the identified independent unisymbol reel. This process continues until n-number of independent unisymbol reels has been stopped. In one embodiment, during the reel spin, the player may initiate the stopping of the reels by depressing the spin button, which enables the player to accelerate game play.

In the illustrated embodiment, as shown in FIGS. 36A-37F) the processor 38 spins and stops each of the unisymbol reels 168 to display a corresponding randomly selected bonus prize in each active bonus prize cell. In another embodiment, the processor 38 spins and stops each of the displayed prize wheels 196 to display a corresponding randomly selected bonus prize in each active bonus prize cell.

Figure 37F:
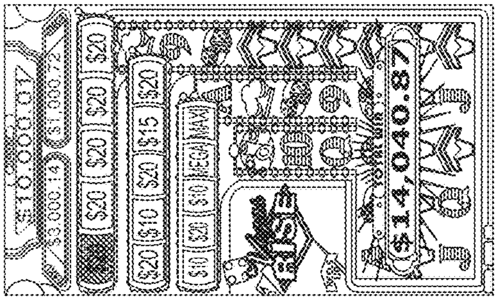

In method step 526, the processor 38 determines a bonus feature award based on a value associated with each randomly selected bonus prize being displayed in each active bonus prize cell and displays a feature win indication (shown in FIG. 37F).

The processor 38 then returns to method step 428 and determines whether a winning combination appears in the primary game 68 based on the symbols being displayed on the primary game reels 84-92, and provides a payout according to a winning combination of symbols displayed on the display area 64, the pay table data file and the paylines. In one embodiment, each modifiable cell 82 operating in the reveal mode 108 may also form an additional pay line that may be used to determine a winning combination of game symbols 94 in the outcome of the primary game 68.

In one embodiment, the processor 38 may be programmed to execute the algorithm shown in method 600 (shown in FIG. 12) when displaying the primary game 68 and bonus feature event 70.

In the illustrated embodiment, the processor 38 is programmed to generate and display a game that executes a symbol driven method of expanding the reels, that awards jackpots via independent reel spins upon full expansion of the reels, and activates independent reels by a combination of minimum bet and denomination. The game is initially played on a 3-3-3-3-3 set of reels. The game includes five independent reels, each of size 1, above each of reels 3, 4 and 5. (Note, this means there are 15 total independent reels above the main 3×5 reel set.) The independent reels are 3, 4 and 6 spaces above reels 3, 4 and 5 respectively. The independent reels are activated by a combination of the player's minimum bet and denomination. For example, at a minimum bet of 50 credits, only the independent reels above reel 3 can be activated, at a minimum bet of 100 credits, only the independent reels above reels 3 and 4 can be activated, and at a minimum bet of 150 credits, all of the independent reels can be activated. In addition, at 1 cent denomination, only one of the independent reels above each reel can be activated, at 2 cent denomination, only two of the independent reels above each reel can be activated, and at 5 cent denomination, all five of the independent reels above each reel can be activated. For example, a player betting 100 credits at 5 cent denomination would activate all 5 reels above reel 3 and all 5 reels above reel 4. None of the reels above reel 5 would be activated. When a specific symbol (e.g. PIC-x) lands on reels 1 and 2, reel 3 will expand a random number of positions. If PIC-x again lands on reel 3, reel 4 will then expand a random number of positions. If PIC-x again lands on reel 4, then reel 5 expands a random number of positions. If any of the expanding reels reach the maximum possible expansion, then the activated independent reels above that reel are spun. Each independent reel will result in either a progressive award (Supreme, Maxi, Mega), a bonus jackpot amount (Major, Mini) or a fixed monetary amount. The player is awarded the shown prize.

In another embodiment, the processor 38 is programmed to generate and display the game including one independent reel above each of reel 3, 4 and 5 (shown in FIG. 25B). Only multiplier values (2×, 3×, 5× and 10×) are on these independent reels. When a base game reel reaches full expansion, the player is awarded the multiplier on the independent reel. All wins are multiplied by the multiplier value. The independent reels are activated with different wagers. For example, at a minimum bet of 50 credits, only the independent reel above reel 3 is activated, at a minimum bet of 75 credits, only the independent reels above reels 3 and 4 is activated, at a minimum bet of 100 credits, all of the independent reels are be activated, and at a minimum bet of 150 credits.

In one embodiment, the processor 38 is programmed to generate the primary game including a 3-3-3-3-3 set of reels. The symbols are SCATTER, WILD, PIC-X, PIC-A, PIC-B, PIC-C, PIC-D, A, K, Q, J, 10 and 9. WILD substitutes for PIC-X, PIC-A, PIC-B, PIC-C, PIC-D, A, K, Q, J, 10 and 9. All the symbols have the possibility to appear on every reel except WILD which appears only on reels 2, 3 and 4. All wins pay from the left most reel to the right in any position on adjacent reels. Any 3, 4, and 5 SCATTER awards 10, 15 and 20 free games respectively.

In one embodiment, the processor 38 is programmed to generate the real expansion feature if PIC-X or WILD land on 2 (or 3 or 4) consecutive reels from left to right, then reel 3 (or 4 or 5) will expand. During the Primary Game, reel 3 can expand randomly between 1 and 3 additional spaces, reel 4 can expand randomly between 1 and 4 additional spaces and reel 5 can expand randomly between 1 and 6 additional spaces.

The processor 38 may also be programmed to initiate a jackpot game feature that includes three sets of 5 independent reels, each of size 1, appear above reels 3, reel 4 and reel 5. During the jackpot game feature, the minimum bet and denomination played determine which reels are activated. The possible symbols on these reels are $10, $15, MINI, MAJOR, MEGA and MAXI. $10 and $15 appear only above reels 3 and 4. MINI, MAJOR, MEGA and MAXI appear above reels 3, 4 and 5. If, during the Reel Expansion Feature, the reel below the independent reels reaches maximum expansion and the activated reels above that reel reveal $10, $15, MINI, MAJOR, MEGA and/or MAXI, then the player is awarded the shown monetary prize(s), progressive and/or bonus jackpot prize(s). The progressive values increment regardless of the player's bet level. A random selection of symbols will appear in a FRAME above reel 5. SUPREME is awarded when reel 5 reaches full expansion and at least one of the activated reels above reel 5 is FRAMED In one embodiment, the processor 38 is programmed to display a free game feature on a 4-4-4-4-4 set of reels. During the free game feature, all the symbols have the possibility to appear on every reel except WILD which appears only on reels 2, 3 and 4. During the Free Games, reel 3 can expand randomly up between 1 and 2 additional spaces, reel 4 can expand randomly between 1 and 3 additional spaces and reel 5 can expand randomly between 1 and 5 additional spaces. Additional free games can be won during the free games. Different reels are used during the free games. Credits bet and lines played are the same as the game that triggered the feature. Bonus jackpot values can also appear on the reels. If a reel reaches full expansion and a jackpot value is showing, the player receives the jackpot prize.

Further, in the embodiment, a bill/ticket is displayed as game value, and received by these bill/ticket identification devices, and a form where a ticket is output by a printer device is described, but the present invention is not limited to this. The game value is a concept including tangible objects such as a coin, bill, medal, ticket, and the like, or electronic data that has a value equivalent to these. For example, a coin is received by the coin accepter, and there may be a form where a coin is paid by a coin hopper. A player is identified and credit that is accumulated in an account on a server is used, there may be a form where credit is paid to an account, information of credit stored in a storage medium of a magnetic card, IC card and the like is read and used, and there may be a form where credit is paid by writing to the storage medium.

Further, in the embodiment when showing a free game provided as a bonus game, a bonus game that uses a different virtual reel strips from a regular game may be provided. Further, there could be a provided a feature game according to a value of the random number acquired during a regular game.

Further, set conditions providing a bonus or feature game are not limited to trigger determination or line determination, for example there may be a configuration providing a bonus game when the bet number surpasses a predetermined value. There could be a configuration providing a bonus game according to a value of the random number acquired during a regular game.

Exemplary embodiments of a gaming device, a gaming system, and a method of providing an award to a player are described above in detail. The gaming device, system, and method are not limited to the specific embodiments described herein, but rather, components of the gaming device and/or system and/or steps of the method may be utilized independently and separately from other components and/or steps described herein. For example, the gaming device may also be used in combination with other gaming systems and methods, and is not limited to practice with only the gaming device as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine, comprising:

a gaming cabinet;

a display device mounted to the gaming cabinet and configured to display computer-generated images of game screens;

a game control unit operably coupled to the display device, the game control unit including a processor programmed to execute an algorithm to display an animated sequence of computer-generated images on the display device including the steps of:

rendering a game screen on the display device including:

a plurality of primary columns displaying a plurality of primary reels therein; and a plurality of bonus columns positioned above the primary columns, each bonus column including modifiable cells displayable in a hidden mode in which game symbols of a corresponding primary reel are obscured and a reveal mode in which game symbols of the corresponding primary reel are visible;

rendering a bonus prize cell above each bonus column; and animating an instance of a game by:

displaying each modifiable cell in the hidden mode prior to spinning the primary reels;

animating the primary reels to spin and stop to display the plurality of game symbols;

selecting modifiable cells to be displayed in the reveal mode in each bonus column;

transforming the selected modifiable cells from the hidden mode to the reveal mode such that the game symbols of the corresponding primary reels are visible within the bonus columns; and animating a corresponding bonus prize cell to display a bonus prize symbol upon determining each modifiable cell of a corresponding bonus column are displayed in the reveal mode.

2. The gaming machine of claim 1, wherein the processor is programmed to execute the algorithm including the steps of:

displaying a first group of primary columns and a second group of primary columns; and displaying the plurality of bonus columns positioned above the second group of primary columns.

3. The gaming machine of claim 1, wherein the processor is programmed to execute the algorithm including the steps of:

animating the plurality of primary reels to spin and stop sequentially; and transforming the selected modifiable cells from the hidden mode to the reveal mode as at least one primary reel is spinning.

4. The gaming machine of claim 1, wherein the processor is programmed to execute the algorithm including the steps of:

displaying a bonus unisymbol reel within the corresponding bonus prize cell; and animating the bonus unisymbol reel to spin and stop to display the bonus prize symbol in the corresponding bonus prize cell after each modifiable cell of the corresponding bonus column is displayed in the reveal mode.

5. The gaming machine of claim 1, wherein the processor is programmed to execute the algorithm including the steps of:

displaying a prize wheel with the corresponding bonus prize cell; and animating the prize wheel to spin and stop to display the bonus prize symbol in the corresponding bonus prize cell after each modifiable cell of the corresponding bonus column is displayed in the reveal mode.

6. The gaming machine of claim 1, wherein the processor is programmed to execute the algorithm including the steps of:

displaying each bonus prize cell as one of an active bonus prize cell and an inactive bonus prize cell; and animating the corresponding bonus prize cell to display the bonus prize symbol upon determining the corresponding bonus prize cell is displayed as an active bonus prize cell.

7. The gaming machine of claim 6, wherein the processor is programmed to execute the algorithm including the steps of:

displaying each bonus prize cell as one of an active bonus prize cell and an inactive bonus prize cell based on a wager amount.

8. A method of operating a gaming machine including a gaming cabinet, a display device mounted to the gaming cabinet and configured to display computer-generated images of game screens, and a game control unit including a processor operably coupled to the display device, the method including the processor executing an algorithm to display an animated sequence of computer-generated images on the display device including the steps of:

rendering a game screen on the display device including:

a plurality of primary columns displaying a plurality of primary reels therein; and a plurality of bonus columns positioned above the primary columns, each bonus column including modifiable cells displayable in a hidden mode in which game symbols of a corresponding primary reel are obscured and a reveal mode in which game symbols of the corresponding primary reel are visible;

rendering a bonus prize cell above each bonus column; and animating an instance of a game by:

displaying each modifiable cell in the hidden mode prior to spinning the primary reels;

animating the primary reels to spin and stop to display the plurality of game symbols;

selecting modifiable cells to be displayed in the reveal mode in each bonus column;

transforming the selected modifiable cells from the hidden mode to the reveal mode such that the game symbols of the corresponding primary reels are visible within the bonus columns; and animating a corresponding bonus prize cell to display a bonus prize symbol upon determining each modifiable cell of a corresponding bonus column are displayed in the reveal mode.

9. The method of claim 8, including the processor executing the algorithm including the steps of:

displaying a first group of primary columns and a second group of primary columns; and displaying the plurality of bonus columns positioned above the second group of primary columns.

10. The method of claim 8, including the processor executing the algorithm including the steps of:

animating the plurality of primary reels to spin and stop sequentially; and transforming the selected modifiable cells from the hidden mode to the reveal mode as at least one primary reel is spinning.

11. The method of claim 8, including the processor executing the algorithm including the steps of:

displaying a bonus unisymbol reel within the corresponding bonus prize cell; and animating the bonus unisymbol reel to spin and stop to display the bonus prize symbol in the corresponding bonus prize cell after each modifiable cell of the corresponding bonus column is displayed in the reveal mode.

12. The method of claim 8, including the processor executing the algorithm including the steps of:

displaying a prize wheel with the corresponding bonus prize cell; and animating the prize wheel to spin and stop to display the bonus prize symbol in the corresponding bonus prize cell after each modifiable cell of the corresponding bonus column is displayed in the reveal mode.

13. The method of claim 8, including the processor executing the algorithm including the steps of:

displaying each bonus prize cell as one of an active bonus prize cell and an inactive bonus prize cell; and animating the corresponding bonus prize cell to display the bonus prize symbol upon determining the corresponding bonus prize cell is displayed as an active bonus prize cell.

14. The method of claim 13, including the processor executing the algorithm including the steps of:

displaying each bonus prize cell as one of an active bonus prize cell and an inactive bonus prize cell based on a wager amount.

15. A non-transitory computer-readable storage media having computer-executable instructions embodied thereon to operate a gaming machine including a gaming cabinet, a display device mounted to the gaming cabinet and configured to display computer-generated images of game screens, and a game control unit including a processor operably coupled to the display device, when executed by the processor the computer-executable instructions cause the processor to execute an algorithm to display an animated sequence of computer-generated images on the display device including the steps of:

rendering a game screen on the display device including:

a plurality of primary columns displaying a plurality of primary reels therein; and a plurality of bonus columns positioned above the primary columns, each bonus column including modifiable cells displayable in a hidden mode in which game symbols of a corresponding primary reel are obscured and a reveal mode in which game symbols of the corresponding primary reel are visible;

rendering a bonus prize cell above each bonus column; and animating an instance of a game by:

displaying each modifiable cell in the hidden mode prior to spinning the primary reels;

animating the primary reels to spin and stop to display the plurality of game symbols;

selecting modifiable cells to be displayed in the reveal mode in each bonus column;

transforming the selected modifiable cells from the hidden mode to the reveal mode such that the game symbols of the corresponding primary reels are visible within the bonus columns; and animating a corresponding bonus prize cell to display a bonus prize symbol upon determining each modifiable cell of a corresponding bonus column are displayed in the reveal mode.

16. The non-transitory computer-readable storage media of claim 15, wherein the computer-executable instructions cause the processor to execute the algorithm including the steps of:

displaying a first group of primary columns and a second group of primary columns; and displaying the plurality of bonus columns positioned above the second group of primary columns.

17. The non-transitory computer-readable storage media of claim 15, wherein the computer-executable instructions cause the processor to execute the algorithm including the steps of:

animating the plurality of primary reels to spin and stop sequentially; and transforming the selected modifiable cells from the hidden mode to the reveal mode as at least one primary reel is spinning.

18. The non-transitory computer-readable storage media of claim 15, wherein the computer-executable instructions cause the processor to execute the algorithm including the steps of:

displaying a bonus unisymbol reel within the corresponding bonus prize cell; and animating the bonus unisymbol reel to spin and stop to display the bonus prize symbol in the corresponding bonus prize cell after each modifiable cell of the corresponding bonus column is displayed in the reveal mode.

19. The non-transitory computer-readable storage media of claim 15, wherein the computer-executable instructions cause the processor to execute the algorithm including the steps of:

displaying a prize wheel with the corresponding bonus prize cell; and animating the prize wheel to spin and stop to display the bonus prize symbol in the corresponding bonus prize cell after each modifiable cell of the corresponding bonus column is displayed in the reveal mode.

20. The non-transitory computer-readable storage media of claim 15, wherein the computer-executable instructions cause the processor to execute the algorithm including the steps of:

displaying each bonus prize cell as one of an active bonus prize cell and an inactive bonus prize cell; and animating the corresponding bonus prize cell to display the bonus prize symbol upon determining the corresponding bonus prize cell is displayed as an active bonus prize cell.

* * * * *